United States Patent
Miki et al.

(10) Patent No.: US 6,732,252 B2
(45) Date of Patent: May 4, 2004

(54) MEMORY INTERFACE DEVICE AND MEMORY ADDRESS GENERATION DEVICE

(75) Inventors: Yoichiro Miki, Kawachinagano (JP); Masahiro Tani, Muko (JP); Kazuki Ninomiya, Kadoma (JP); Naoya Tokunaga, Moriguchi (JP); Kenta Sokawa, Hirakata (JP); Hiroshi Miyaguchi, Tokyo (JP); Yuji Yaguchi, Ibaragi-ken (JP); Tsuyoshi Akiyama, Tsuchiura (JP); Kenya Adachi, Tsuchiura (JP)

(73) Assignees: Matsushita Electric Industrial Co., Ltd., Osaka (JP); Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/195,975

(22) Filed: Jul. 16, 2002

(65) Prior Publication Data

US 2002/0184464 A1 Dec. 5, 2002

Related U.S. Application Data

(62) Division of application No. 09/165,785, filed on Oct. 2, 1998, now Pat. No. 6,453,394.

(30) Foreign Application Priority Data

Oct. 3, 1997 (JP) .............................. 9-271751
Dec. 25, 1997 (JP) .............................. 9-358528

(51) Int. Cl.[7] .............................. G06F 12/00
(52) U.S. Cl. ................ 711/219; 711/220; 345/572
(58) Field of Search .................. 711/201, 203, 711/206, 207, 209–211, 214, 217–220; 345/511, 516, 564–566, 572–574; 365/189.04, 220, 230.01; 712/221, 236

(56) References Cited

U.S. PATENT DOCUMENTS

| | | | | |
|---|---|---|---|---|
| 5,010,421 A | * | 4/1991 | Arai | 360/32 |
| 5,040,150 A | | 8/1991 | Naitoh et al. | 365/201 |
| 5,247,627 A | * | 9/1993 | Murakami et al. | 712/236 |
| 5,269,012 A | * | 12/1993 | Nakajima | 711/200 |

(List continued on next page.)

FOREIGN PATENT DOCUMENTS

| | | |
|---|---|---|
| EP | 0 550 241 | 7/1993 |
| GB | 2 202 978 | 10/1988 |
| GB | 2311 153 | 9/1997 |
| GB | 2311153 | 9/1997 |
| JP | 09-055869 | 2/1997 |
| JP | 10-326342 | 12/1998 |

OTHER PUBLICATIONS

European Search Report dated Mar. 21, 2000 for EP 98 11 86 41.

*Primary Examiner*—Mano Padmanabhan
*Assistant Examiner*—Pierre M. Vital
(74) *Attorney, Agent, or Firm*—RatnerPrestia

(57) ABSTRACT

A memory interface device of the present invention includes: an input buffer including a plurality of input areas; an output buffer including a plurality of output areas; and a control section for controlling the input buffer, the output buffer and a single port memory. The control section controls the input buffer and the single port memory so as to transfer a signal stored in one of the input areas of the input buffer to the single port memory while storing an input signal in another one of the input areas of the input buffer. The control section controls the output buffer and the single port memory so as to output as an output signal a signal stored in one of the output areas of the output buffer while transferring a signal stored in the single port memory to another one of the output areas of the output buffer.

5 Claims, 37 Drawing Sheets

U.S. PATENT DOCUMENTS

| | | | | |
|---|---|---|---|---|
| 5,408,626 A | * | 4/1995 | Dixit | 711/220 |
| 5,546,137 A | * | 8/1996 | Takeuchi | 348/714 |
| 5,602,565 A | * | 2/1997 | Takeuchi | 345/634 |
| 5,663,910 A | | 9/1997 | Ko et al. | 365/189.05 |
| 5,724,540 A | * | 3/1998 | Kametani | 711/220 |
| 5,909,225 A | | 6/1999 | Schinnerer et al. | 345/545 |
| 5,909,704 A | * | 6/1999 | Ireland | 711/149 |
| 5,996,019 A | | 11/1999 | Hauser et al. | 709/235 |
| 6,166,747 A | * | 12/2000 | Mizutani | 345/501 |

\* cited by examiner

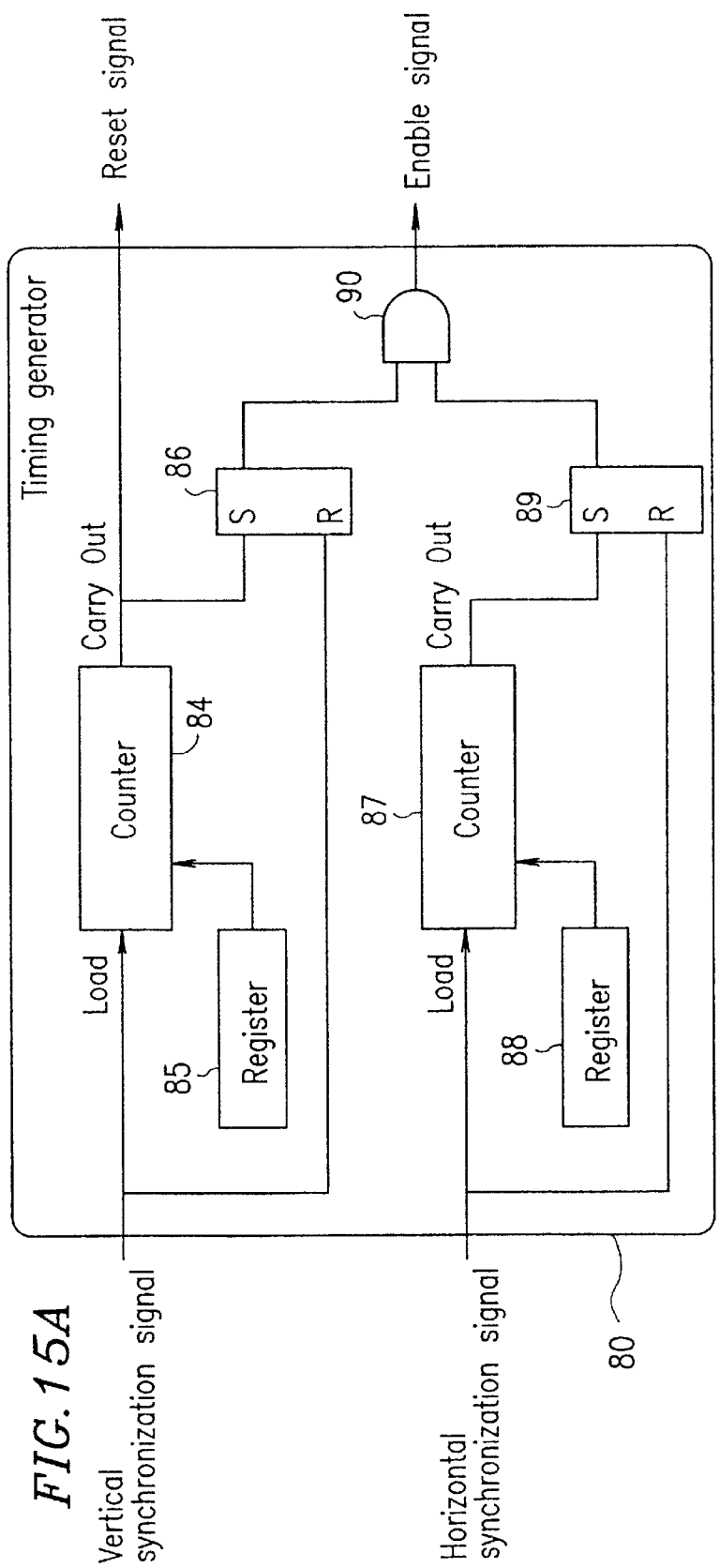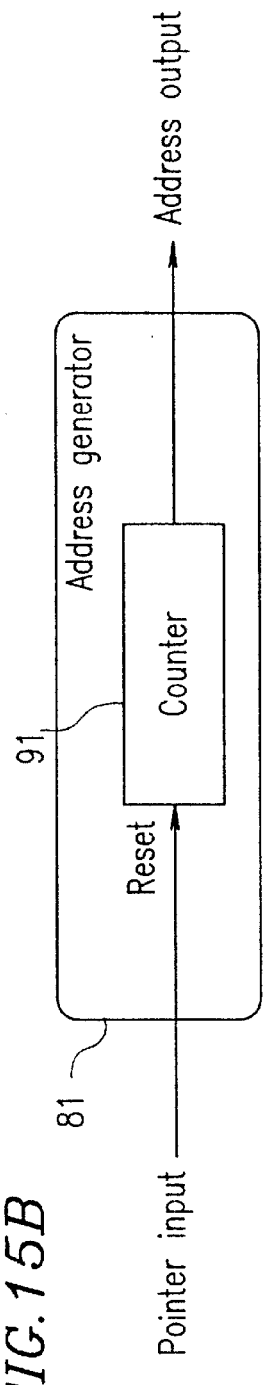
FIG. 15A
FIG. 15B

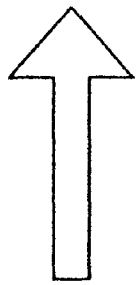
FIG.16A Memory contents before write operation
FIG.16B Memory contents after write operation

FIG.17A

| Address | Memory |
|---|---|
| 0 | empty |
| 1 | empty |
| 2 | empty |
| 3 | empty |
| ... | ... |

Memory contents before write operation

FIG.17B

| Address | Memory |
|---|---|
| 0 | Data in col.add.0 |
| 1 | empty |
| 2 | empty |
| 3 | empty |
| ... | ... |

Memory contents after 1st write operation

FIG.17C

| Address | Memory |
|---|---|
| 0 | Data in col.add.0 |
| 1 | Data in col.add.1 |
| 2 | empty |
| 3 | empty |
| ... | ... |

Memory contents after 2nd write operation

FIG.17D

| Address | Memory |
|---|---|
| 0 | Data in col.add.0 |
| 1 | empty |
| 2 | empty |
| 3 | empty |
| 8 | Data in col.add.1 |
| 9 | empty |
| ... | ... |

Memory contents after 2nd write operation

FIG.19

| No. | Priority Input ||||| Mode Output ||||
|---|---|---|---|---|---|---|---|---|---|
| | Write |||Read || Write || Read ||
| | Write REQA | Write REQB | Read REQA | Read REQB | | Mode A | Mode B | Mode A | Mode B |
| 1 | (11) | (xx) | (xx) | (xx) | | 1 | 0 | 0 | 0 |
| 2 | V(10) | (11) | (xx) | (xx) | | 0 | 1 | 0 | 0 |
| 3 | V(10) | VII(10) | (11) | (xx) | | 0 | 0 | 1 | 0 |
| 4 | V(10) | VII(10) | V(10) | (11) | | 0 | 0 | 0 | 1 |
| 5 | (10) | VII(10) | V(10) | VII(10) | | 1 | 0 | 0 | 0 |
| 6 | VI(01) | (10) | V(10) | VII(10) | | 0 | 1 | 0 | 0 |
| 7 | V(01) | VII(01) | (10) | VII(10) | | 0 | 0 | 1 | 0 |
| 8 | V(01) | VII(01) | V(01) | (10) | | 0 | 0 | 0 | 1 |
| 9 | (01) | VII(01) | V(01) | VII(01) | | 1 | 0 | 0 | 0 |
| 10 | (00) | (01) | V(01) | VII(01) | | 0 | 1 | 0 | 0 |
| 11 | (00) | (00) | (01) | VII(01) | | 0 | 0 | 1 | 0 |
| 12 | (00) | (00) | (00) | (01) | | 0 | 0 | 0 | 1 |

Overflow in update

Underflow in update

Overflow in update

Underflow in update

Updated address exceeding boundary address

Updated address negative

Updated address exceeding end address

Updated address exceeding boundary address

*FIG.36A*             *FIG.36B*
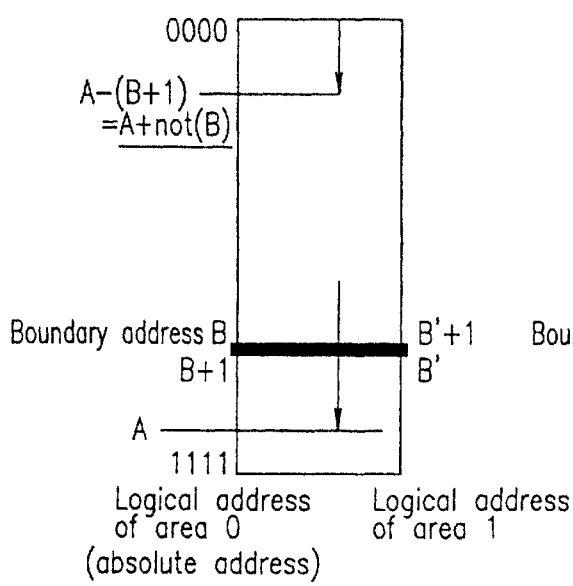 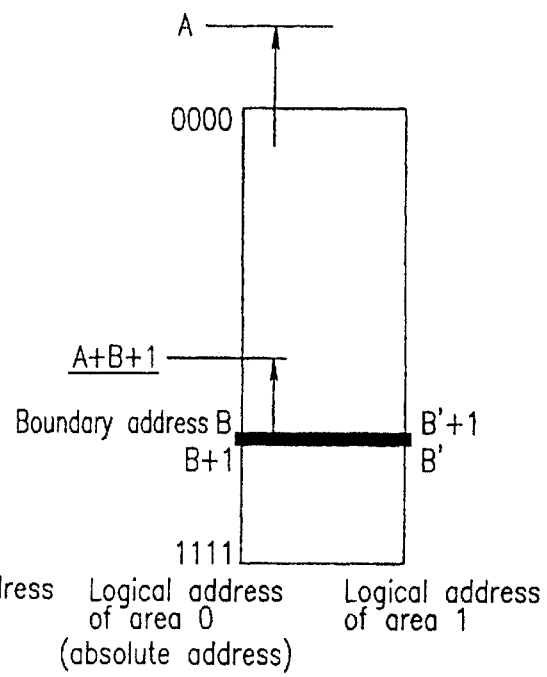
Updated address exceeding boundary address   Updated address negative Updated address exceeding end address Updated address exceeding boundary address

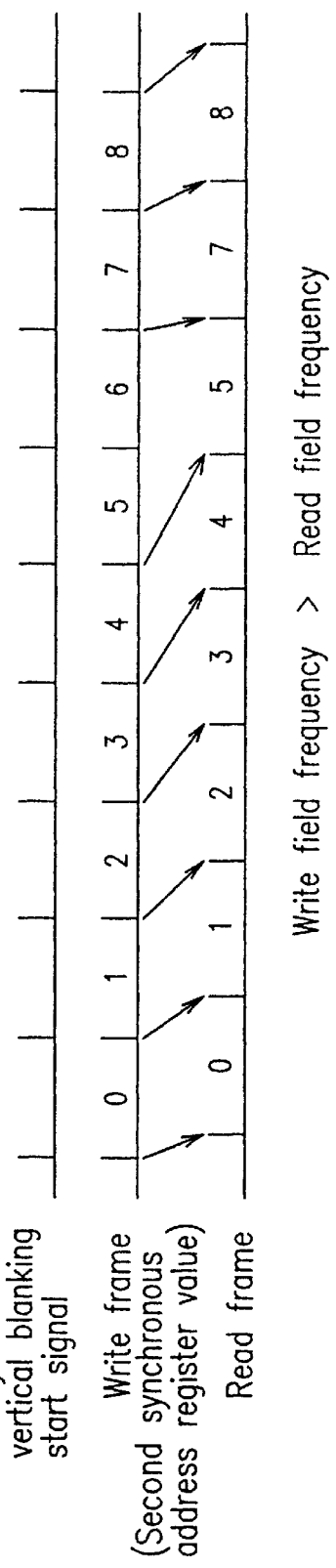
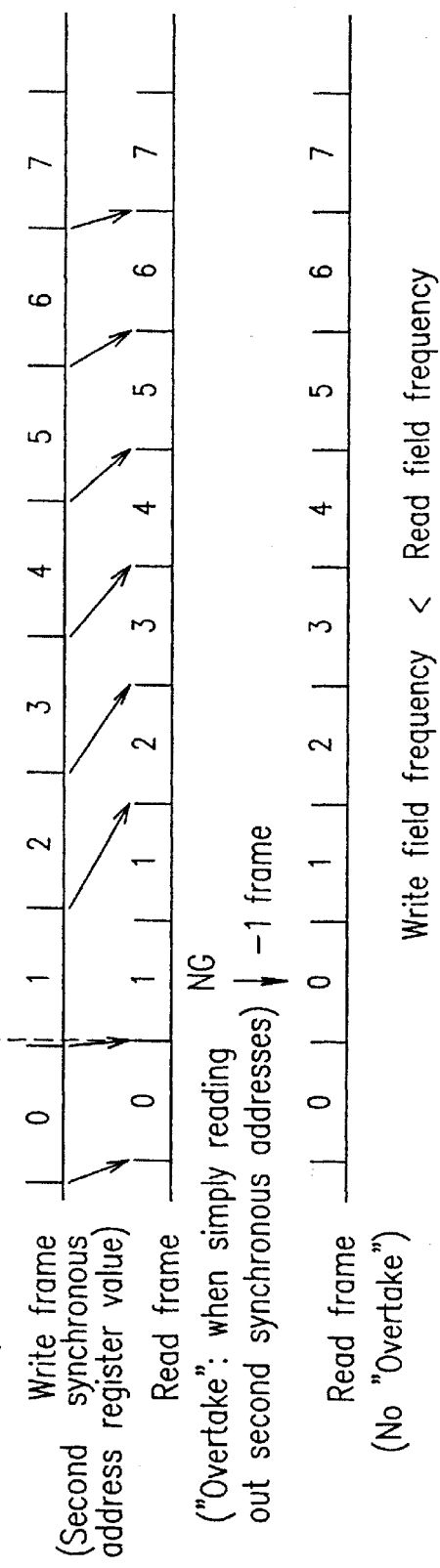

MEMORY INTERFACE DEVICE AND MEMORY ADDRESS GENERATION DEVICE

This application is a divisional of U.S. patent application Ser. No. 09/165,785 filed Oct. 2, 1998 now U.S. Pat. No. 6,453,394.

BACKGROUND OF THE INVENTION

1. Field of the Invention

The present invention relates to a memory interface device for writing and reading a digital signal to/from a single port memory. The present invention also relates to a memory address generation device used in such a memory interface device for generating an address in a memory.

2. Description of the Related Art

In recent years, in the field of video and sound signal processing, a great amount of data has been digitalized and digitally processed. More and more source data has been made available in multimedia formats, thereby demanding for a more sophisticated digital signal processing method. For developing such a method, improving memory-related processes is considered to be a key.

There are various video signal formats, or standards, including NTSC, PAL, HDTV, VGA and SVGA, and, at the same time, there are various types of display devices including a CRT, an LCD (liquid crystal display) and a plasma display. It is required to process digital video signals of the various formats in a single display (television) system.

A digital signal processing system using a memory is essential for converting one video signal format to another, and/or for synthesizing two or more non-synchronous video signals together. In such processes, a high-speed, real-time data processing method is required for writing and reading the video signals without a break.

Conventionally, a dual port memory such as a FIFO is used for writing and reading the video signals to/from a memory in real time. Alternatively, two single port memories are used, and the real time processing is achieved by alternately controlling the write and read operations to/from the two single port memories. In addition, special purpose memory control devices are provided for converting the video signal format and for processing a plurality of non-synchronous video signals, respectively.

Thus, processing video signals in real time requires at least two single port memories or a single dual port memory, thereby making the entire system expensive. Moreover, since usable bit width and clock frequency of the video signal are limited even when such a memory arrangement is provided, a flexible system may not be realized.

Processing video signals of different formats requires a digital signal processing system capable of processing each video signal in real time using a memory at a rate associated with the signal format. Accordingly, address control methods are also becoming more complicated.

A conventional memory control device uses special purpose hardware for calculating the memory address for each of a plurality of address pointers.

However, a conventional display (television) system which processes different video signal formats needs a number of special purpose hardwares for controlling the memory addresses in different manners in accordance with the different video signal formats, thereby tending to have a large scale circuit.

Moreover, conventionally, an additional special purpose memory is needed for a frame synchronization process for converting a video signal in a synchronous system to another video signal in a different synchronous system.

SUMMARY OF THE INVENTION

According to one aspect of this invention, a memory interface device includes: an input buffer including a plurality of input areas; an output buffer including a plurality of output areas; and a control section for controlling the input buffer, the output buffer and a single port memory. The control section controls the input buffer and the single port memory so as to transfer a signal stored in one of the input areas of the input buffer to the single port memory while storing an input signal in another one of the input areas of the input buffer. The control section controls the output buffer and the single port memory so as to output as an output signal a signal stored in one of the output areas of the output buffer while transferring a signal stored in the single port memory to another one of the output areas of the output buffer.

In one embodiment of the invention, the memory interface device further includes a bus width conversion circuit for converting an output bus width of the input buffer to an input bus width of the single port memory, and converting an output bus width of the single port memory to an input bus width of the output buffer.

In one embodiment of the invention, the input buffer is divided along a bit line direction and along a word line direction of the input buffer into a plurality of input areas, and the output buffer is divided along a bit line direction and along a word line direction of the output buffer into a plurality of output areas.

In one embodiment of the invention, each of the input buffer and the output buffer outputs to the control section a request signal for accessing the single port memory. The control section has an arbitration circuit for prioritizing access request signals based on a predetermined priority sequence.

In one embodiment of the invention, the memory interface device further includes a circuit for writing a signal from the input buffer directly to the output buffer.

According to another aspect of this invention, a memory address generation device for generating a plurality of addresses for accessing a memory is provided. The device includes: an address update section for updating N addresses (where N is a natural number) at a predetermined timing based on a predetermined relationship among the N addresses. The updated addresses are incremented.

In one embodiment of the invention, the predetermined relationship among the N addresses is represented by K predetermined values (where K is a natural number). The address update section updates at least one of the N addresses using the K predetermined values.

In one embodiment of the invention, the K predetermined values are offset values. The address update section selectively updates one of the N addresses to obtain a reference address, and updates each remaining one of the N addresses through a calculation based on the reference address and one of the offset values.

In one embodiment of the invention, the address update section updates the one of the N addresses to be the reference address in one direction and updates each remaining one of the N addresses in an opposite direction.

In one embodiment of the invention, a first synchronous signal and a second synchronous signal which have different frequencies are provided. The address update section updates the N addresses by selectively using the first synchronous signal or the second synchronous signal.

In one embodiment of the invention, the address update section logically divides a memory address space into a plurality of areas. The address update section generates an address by independently incrementing an address pointer in each of the areas.

In one embodiment of the invention, the memory address space starts from a start address and ends with an end address. The address update section logically divides the memory address space by a boundary into a first area including the start address and a second area including the end address. The address update section calculates an address using a logical address based on the start address either in the first area or in the second area. The address update section inverts the calculated address for the second area, thereby providing an actual address in the second area.

In one embodiment of the invention, M first synchronous system signals and K second synchronous system signals which are not synchronized with the M first synchronous signals are provided. The address update section provides a special memory area in the memory address space for storing the second synchronous system signals. The address update section calculates a read address of the second synchronous system signal based on a write address of the second synchronous system signal and the second synchronous system signal.

Thus, it is not necessary to provide a number of arithmetic units corresponding to the number of address pointers used. Rather, the address pointers can be updated using only one arithmetic unit, thereby realizing a small-scale memory address generation device.

Moreover, a plurality of addresses are updated based on a predetermined relationship among the addresses. Thus, it is possible to allocate the addresses within the memory space while maintaining the relationship of the address pointers with respect to one another.

Furthermore, a plurality of addresses are updated through a relative calculation based on a reference address. Therefore, even when a calculation error occurs while updating an address, the address may be back in proper relationship with the others after the address is updated again.

The update direction for the reference address is opposite to the update direction for the other addresses. Thus, it is not necessary to provide an additional bit to indicate the sign of the updated address, thereby reducing the number of bits required for the register. In addition, the number of bits required for the arithmetic unit is also reduced.

Moreover, some of the address pointers may be updated each time the horizontal blanking start signal is input, for example, thereby providing the address with a horizontal offset, and thus making it possible to, for example, provide a small screen in the memory.

Furthermore, write and read operations are performed for video signals which are different in the number of bits or the number of fields required. In order to achieve this, a plurality of memory areas are provided in one memory space, and the address pointers are moved at different rates in different memory areas, respectively. Thus, it is possible to effectively utilize the memory space.

The memory space is divided into two memory areas by a single boundary. The two areas can be addressed in substantially the same manner by using logical addresses. Thus, it is possible to reduce the circuit scale of the device.

Moreover, write and read operations are performed for different video signals which are not synchronized with each other. A signal in a synchronous system can be properly read out in synchronization with a signal in a different synchronous system by using only one memory address generation device for generating addresses and only one memory.

Thus, the invention described herein makes possible at least one of the advantages of: (1) providing a memory interface device capable of processing a video signal in real time using one single port memory; (2) providing a memory interface device capable of processing a video signal in real time using one single port memory, and realizing a system which is independent of a bit number of an input/output signal or a bus width of the single port memory; (3) providing a memory interface device capable of processing a video signal in real time using one single port memory, which enables signal processing of a plurality of non-synchronous video signals; and (4) providing a memory address generation device having a simple structure and capable of generating a plurality of addresses used in a memory, which enables signal processing of a plurality of non-synchronous video signals using only one memory.

These and other advantages of the present invention will become apparent to those skilled in the art upon reading and understanding the following detailed description with reference to the accompanying figures.

BRIEF DESCRIPTION OF THE DRAWINGS

FIG. 15A is a diagram illustrating a timing generator;

FIG. 15B is a diagram illustrating an address generator;

FIGS. 16A and 16B each shows an exemplary memory map of a single port memory;

FIGS. 17A to 17D each shows an exemplary memory map of a single port memory;

FIG. 19 is a chart illustrating various values output from an arbitrator for various register settings;

FIGS. 36A and 36B illustrate an operation of a limiter according to Example 7 of the present invention;

FIGS. 39A and 39B illustrate a frame synchronization operation according to Example 8 of the present invention.

The entire disclosure of U.S. patent application Ser. No. 09/165,785, filed Oct. 2, 1998, is expressly incorporated by reference herein.

DESCRIPTION OF THE PREFERRED EMBODIMENTS

EXAMPLE 1

Figure 1:
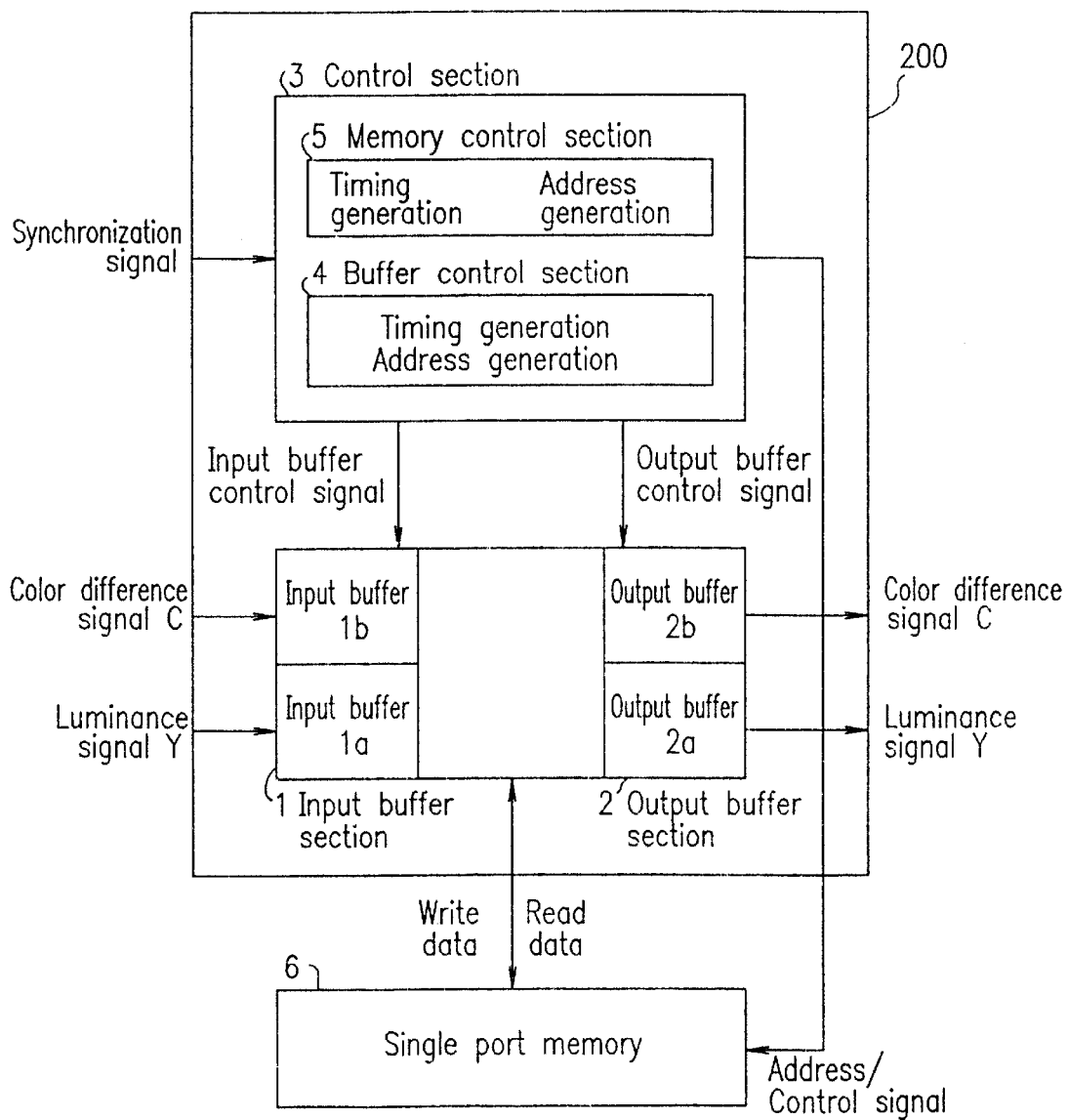
FIG. 1 is a block diagram illustrating a memory interface device according to Example 1 of the present invention.

FIG. 1 illustrates a memory interface device 200 according to Example 1 of the present invention. Referring to FIG. 1, the memory interface device 200 includes an input buffer section 1, an output buffer section 2 and a control section 3. The control section 3 controls the input buffer section 1, the output buffer section 2 and a single port memory 6.

The control section 3 outputs an input buffer control signal to the input buffer section 1 and an output buffer control signal to the output buffer section 2 in response to a synchronization signal. The control section 3 receives request signals from the input buffer section 1 and the output buffer section 2 for accessing the single port memory 6, and outputs an address, a control signal, or the like, to the single port memory 6 in response to the access request signal.

It is assumed in the present example that the signal input to the memory interface device 200 is a video signal which includes a luminance signal Y and a color difference signal C.

The input buffer section 1 includes an input buffer 1a for receiving the luminance signal Y and another input buffer 1b for receiving the color difference signal C. Similarly, the output buffer section 2 includes an output buffer 2a for outputting the luminance signal Y and another output buffer 2b for outputting the color difference signal C. The luminance signal Y is stored in the single port memory 6 via the input buffer 1a, and the luminance signal Y read out from the single port memory 6 is output via the output buffer 2a. The color difference signal C is stored in the single port memory 6 via the input buffer 1b, and the color difference signal C read out from the single port memory 6 is output via the output buffer 2b.

Although the input buffer section 1 and the output buffer section 2 are preferably divided into two subsections for different signals in the present example, such division is not necessary for the present invention. Alternatively, the input buffer section 1 may include only one input buffer, and the output buffer section 2 may include only one output buffer. Such an embodiment is within the scope of the present invention.

Figure 2:
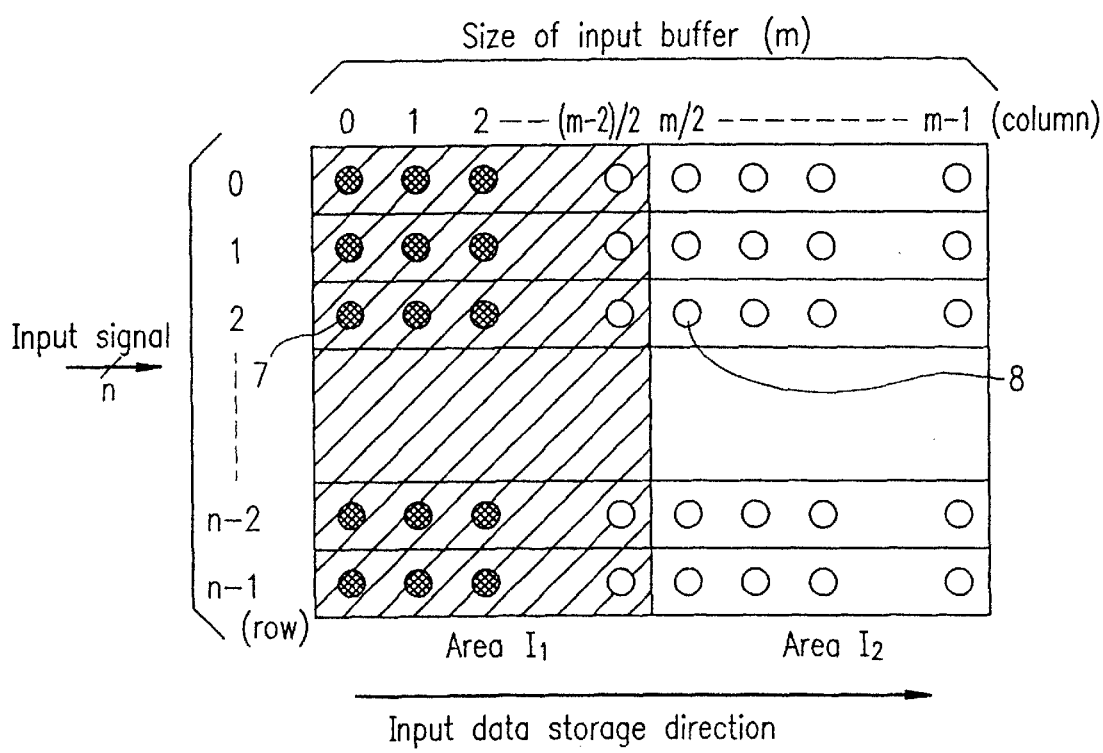
FIG. 2 is a diagram illustrating an input buffer.

FIG. 2 illustrates the input buffer 1a. The input buffer 1b preferably has the same structure as that of the input buffer 1a.

Referring to FIG. 2, a black dot 7 and a white dot 8 each represent a memory cell for storing one bit of data. The black dot 7 represents a memory cell storing one bit of data, and the white dot 8 represents an empty memory cell storing no data. The bit width of the signal (the luminance signal Y) input to the input buffer 1a is n bits, and the total size of the input buffer 1a is m×n bits, where n is a positive integer and m is n×2.

The input signal is stored in one or more columns of memory cells, starting from the $0^{th}$ column. In FIG. 2, the input signal is stored in the $0^{th}$ to $2^{nd}$ columns of memory cells.

The input buffer 1a is logically divided into two areas $I_1$ and $I_2$. The area $I_1$ includes the $0^{th}$ to $(m-2)/2^{th}$ columns of memory cells, and the area $I_2$ includes the $m/2^{th}$ to $(m-1)$th columns of memory cells. A write operation (transfer) of data from the input buffer 1a to the single port memory 6 occurs when one of the areas $I_1$ and $I_2$ is filled with data.

Figure 3:
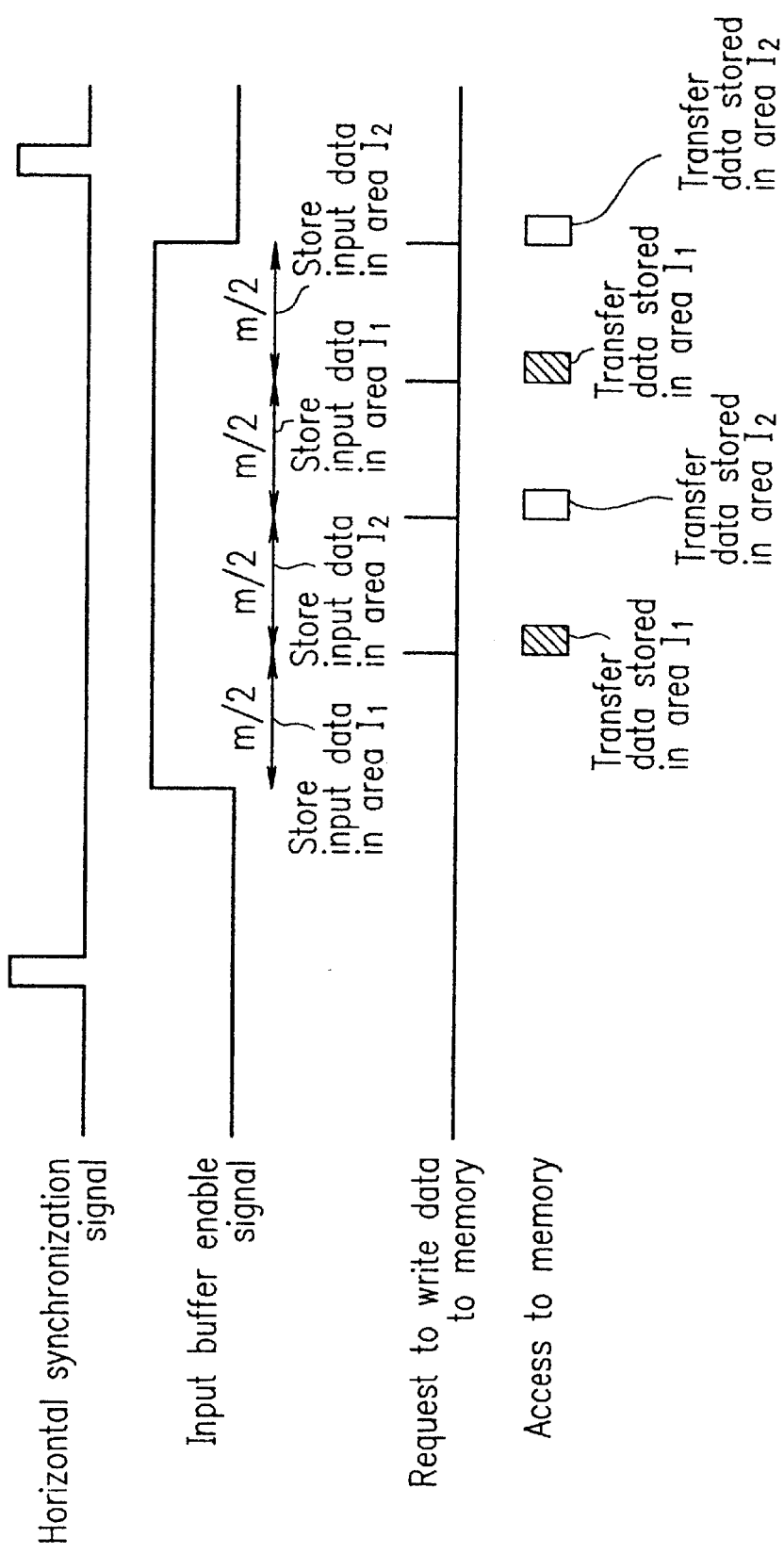
FIG. 3 shows timing diagrams illustrating an operation for writing data to a single port memory.

FIG. 3 shows timing diagrams illustrating an operation for writing the input signal to the single port memory 6 after the input signal is temporarily stored in the input buffer 1a. The timing of writing the input signal to the single port memory 6 after the input signal is temporarily stored in the input buffer 1b is substantially the same as that illustrated in FIG. 3.

In the example illustrated in FIG. 3, a horizontal synchronization signal is used as a reference signal, though any other signal may alternatively be used as the reference signal.

An input buffer enable signal indicates whether or not to enable a write operation to the input buffer 1a. In the example illustrated in FIG. 3, a high level input buffer enable signal indicates an enabling state, and a low level input buffer enable signal indicates a disabling state. In response to the horizontal synchronization signal, the control section 3 outputs the input buffer enable signal to the input buffer 1a. The input buffer enable signal is a type of input buffer control signal.

A request for writing data to the single port memory 6 is generated when one of the areas $I_1$ and $I_2$ is filled with data. Therefore, while the input buffer enable signal is at the high level, the request for writing data to the single port memory 6 is generated for each cycle of m/2.

In response to the first request for writing data to the single port memory 6, data stored in the area $I_1$ of the input buffer 1a is transferred to and written in the single port memory 6. While the data stored in the area $I_1$ of the input buffer 1a is being transferred to the single port memory 6, another input signal is stored in the area $I_2$ of the input buffer 1a.

In response to the next request for writing data to the single port memory 6, data stored in the area $I_2$ of the input buffer 1a is transferred to and written in the single port memory 6. While the data stored in the area $I_2$ of the input buffer 1a is being transferred to the single port memory 6, another input signal is stored in the area $I_1$ of the input buffer 1a. Subsequently, the same process is repeated.

By dividing the input buffer 1a into two areas, as described above, it is possible to transfer data stored in one of the areas of the input buffer 1a to the single port memory 6 while storing the next input signal in the other area. Thus, it is possible to transfer data from the input buffer 1a to the single port memory 6 without discontinuing the storing of the input signal in the input buffer 1a.

Although the input buffer 1a is divided into two areas in the example illustrated in FIG. 2, the input buffer 1a may generally be divided into L areas (L is a natural number greater than or equal to 2). The input signal may have any number of bite, as long as the number of bits is equal to or less than the row address size of the input buffer 1a. The same applies to the input buffer 1b.

Figure 4:
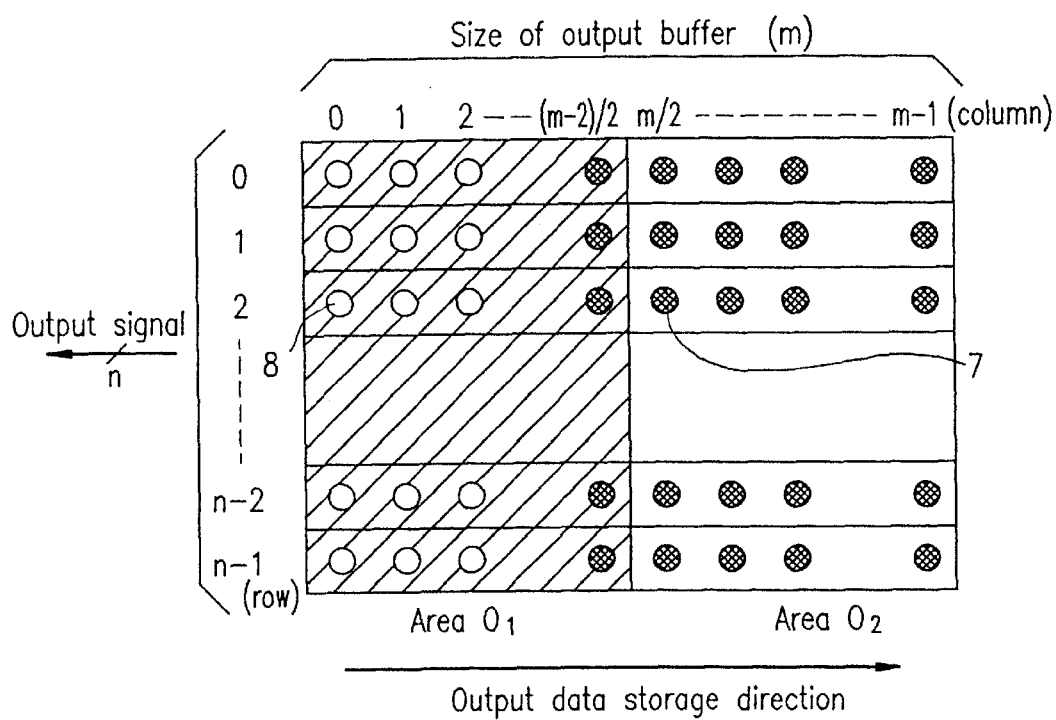
FIG. 4 is a diagram illustrating an output buffer.

FIG. 4 illustrates the output buffer 2a. The output buffer 2b has the same structure as that of the output buffer 2a.

Referring to FIG. 4, a black dot 7 and a white dot 8 each represent a memory cell for storing one bit of data. The black dot 7 represents a memory cell storing one bit of data, and the white dot 8 represents an empty memory cell storing no data. The bit width of the signal (the luminance signal Y) output from the output buffer 28 is n bits, and the total size of the output buffer 2a is m×n bits, where n and m are each a positive integer.

The output signal is output from one or more columns of memory cells, starting from the $0^{th}$ column. In FIG. 4, the data has been output from the $0^{th}$ to $2^{nd}$ columns of memory cells.

The output buffer 2a is logically divided into two areas $O_1$ and $O_2$. The area $O_1$ includes the $0^{th}$ to $(m-2)/2^{th}$ columns of memory cells, and the area $O_2$ includes the $m/2^{th}$ to $(m-1)^{th}$ columns of memory cells. A read operation (transfer) of data from the single port memory 6 to the output buffer 2a occurs when one of the areas $O_1$ and $O_2$ becomes empty.

Figure 5:
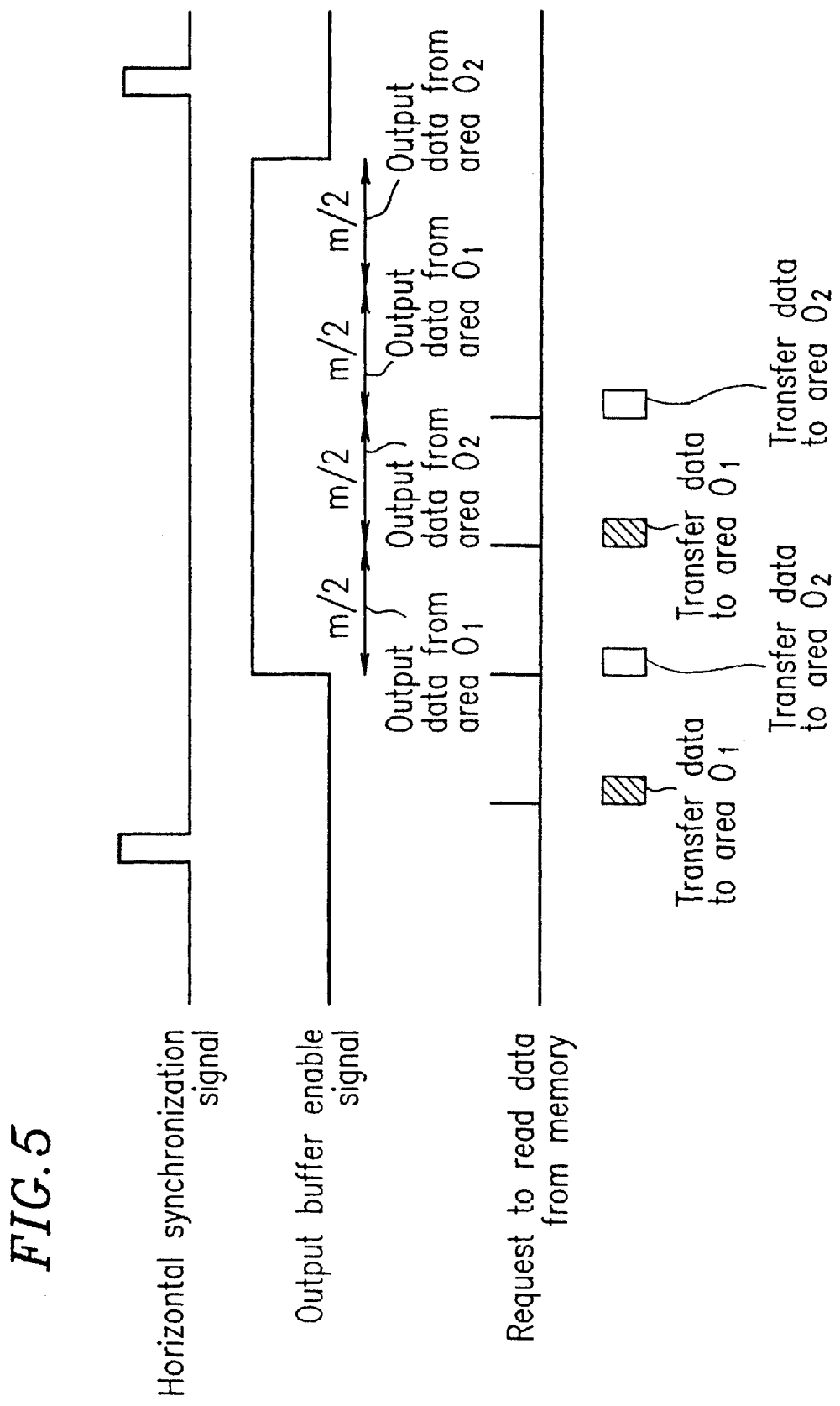
FIG. 5 shows timing diagrams illustrating an operation for reading out data from a single port memory.

FIG. 5 shows timing diagrams illustrating an operation for externally outputting data from the memory interface device 200 after the data is read out from the single port memory 6 and temporarily stored in the output buffer 2a. The timing of externally outputting data from the memory interface device 200 after the data is read out from the single port memory 6 and temporarily stored in the output buffer 2b is substantially the same as that illustrated in FIG. 5.

In the example illustrated in FIG. 5, a horizontal synchronization signal is used as a reference signal, though any other signal may alternatively be used as the reference signal.

An output buffer enable signal indicates whether or not to enable a read operation from the output buffer 2a. In the example illustrated in FIG. 5, a high level output buffer enable signal indicates an enabling state, and a low level output buffer enable signal indicates a disabling state. In response to the horizontal synchronization signal, the control section 3 outputs the output buffer enable signal to the output buffer 2a. The output buffer enable signal is a type of output buffer control signal.

A request for reading out data from the single port memory 6 is generated when one of the areas $O_1$ and $O_2$ becomes empty. Therefore, while the output buffer enable signal is at the high level, the request for reading out data from the single port memory 6 is generated for each cycle of m/2 (a period for accessing m/2 columns of memory cells).

It is assumed that the output buffer 2a is empty when the horizontal synchronization signal goes high. In the example illustrated in FIG. 5, in response to the first request for reading out data from the single port memory 6, data read out from the single port memory 6 is transferred to and written in the area $O_1$ of the output buffer 2a.

In response to the output buffer enable signal going high, the data stored in the area $O_1$ of the output buffer 2a starts to be output. While the data stored in the area $O_1$ of the output buffer 2a is being output, another output signal is read out from the single port memory 6, and transferred to and written in the area $O_2$ of the output buffer 2a. Subsequently, the same process is repeated.

By dividing the output buffer 2a into two areas, as described above, it is possible to output data stored in one of the areas of the output buffer 2a as an output signal while storing the next signal read out from the single port memory 6 in the other area. Thus, it is possible to transfer data from the single port memory 6 to the output buffer 2a without discontinuing the outputting of the output signal from the output buffer 2a.

Although the output buffer 2a is divided into two areas in the example illustrated in FIG. 4, the output buffer 2a may generally be divided into N areas (N is a natural number greater than or equal to 2). The output signal may have any number of bits, as long as the number of bits is equal to or less than the row address size of the output buffer 2a. The same applies to the output buffer 2b.

When the control section 3 receives a write request from the input buffers 1a and 1b, the control section 3 controls the input buffers 1a and 1b so as to transfer data from the input buffers 1a and 1b to the single port memory 6, and outputs an address and a control signal to the single port memory 6. The transferred data is stored in the address in the single port memory 6.

When the control section 3 receives a read request from the output buffers 2a and 2b, the control section 3 outputs an address and a control signal to the single port memory 6. The single port memory 6 reads out data from the address in the single port memory 6, and transfers the data to the output buffers 2a and 2b. The control section 3 controls the output buffers 2a and 2b so as to store the data in the output buffers 2a and 2b.

Figure 6:
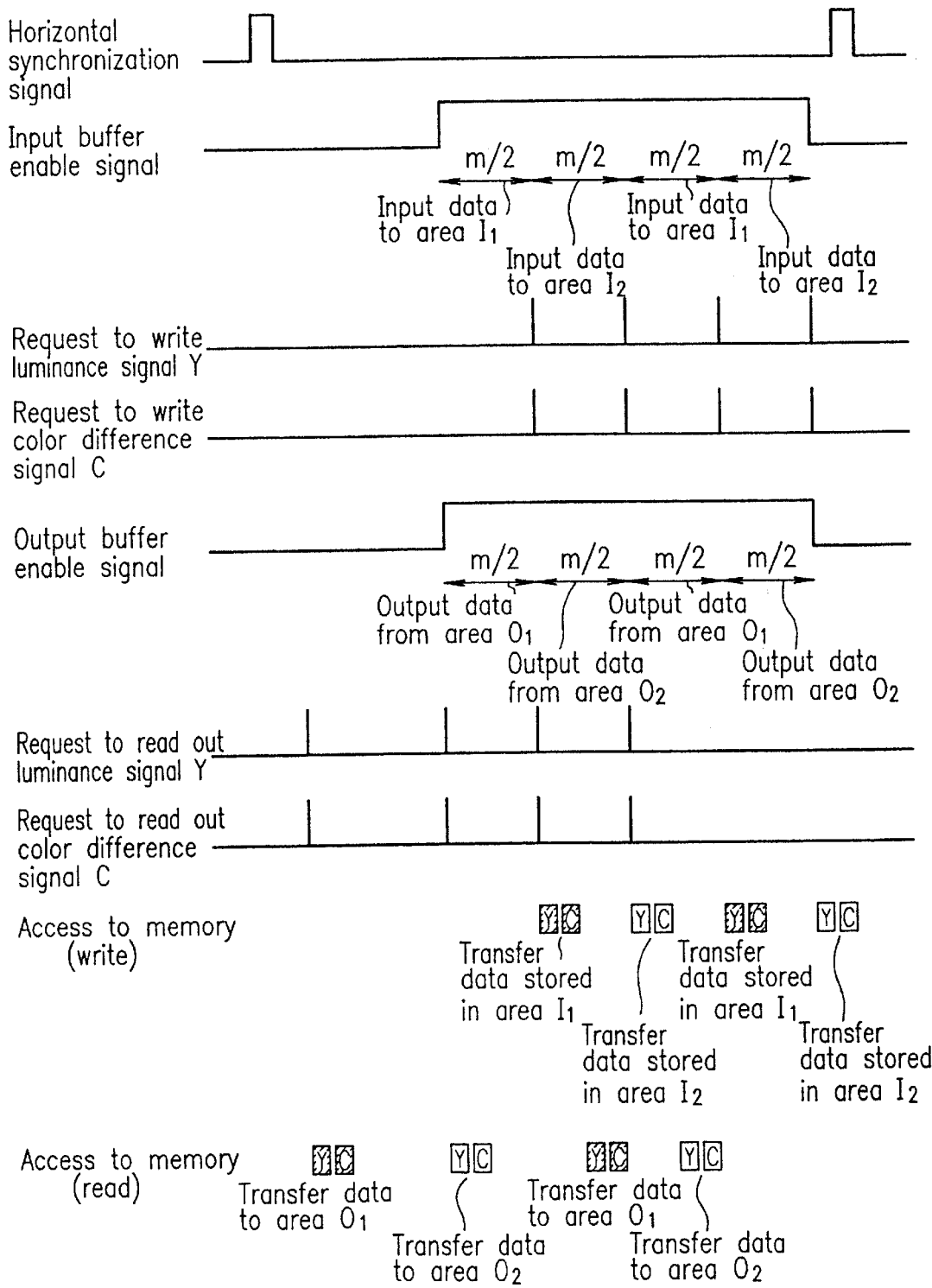
FIG. 6 shows timing diagrams illustrating an operation for writing and reading data to/from a single port memory in real time.

FIG. 6 shows timing diagrams illustrating an operation for performing a write operation (for writing a video signal to the single port memory 6 while storing the video signal in the input buffers 1a and 1b) and a read operation (for reading out a video signal from the single port memory 6 while storing the video signal in the output buffers 2a and 2b) in parallel using the memory interface device 200 having the structure Illustrated in FIG. 1.

In the example illustrated in FIG. 6, a horizontal synchronization signal is used as a reference signal, though any other signal may alternatively be used as the reference signal.

It is assumed that the output buffers 2a and 2b are empty when the horizontal synchronization signal goes high. In the example illustrated in FIG. 6, a first set of requests for reading out data from the single port memory 6 (including a request for reading out the luminance signal Y and a request for reading out the color difference signal C) are sent to the control section 3. In response to these requests, the control section 3 reads out the luminance signal Y and the color difference signal C from the single port memory 6 in this order, and transfers the luminance signal Y to the area $O_1$ of the output buffer 2a and the color difference signal C to the area $O_1$ of the output buffer 2b.

The input buffer enable signal and the output buffer enable signal go high at the same time.

In response to the input buffer enable signal going high, data starts to be input to the respective areas $I_1$ of the input buffers 1a and 1b.

In response to the output buffer enable signal going high, data which has been stored in the respective areas $O_1$ of the output buffers 2a and 2b starts to be output.

The next set of requests for reading out data from the single port memory 6 (including a request for reading out the luminance signal Y and a request for reading out the color difference signal C) are sent to the control section 3. In response to these requests, the control section 3 reads out the luminance signal Y and the color difference signal C from the single port memory 6 in this order, and transfers the luminance signal Y to the area $O_2$ of the output buffer 2a and the color difference signal C to the area $O_2$ of the output buffer 2b.

One cycle (m/2) after the set of requests for reading out date from the single port memory 6 (including the request for reading out the luminance signal Y and the request for reading out the color difference signal C) are issued, a set of requests for writing data to the single port memory 6 (including a request for writing the luminance signal Y and a request for writing the color difference signal C) and a set of requests for reading out data from the single port memory 6 (including a request for reading out the luminance signal Y and a request for reading out the color difference signal C) are generated at the same time.

In response to the write and read requests, the control section 3 transfers and writes the luminance signal Y (stored in the area $I_1$ of the input buffer 1a) and the color difference signal C (stored in the area $I_1$ of the input buffer 1b) to the single port memory 6 in this order. Then, the luminance signal Y and the color difference signal C are read out in this order from the single port memory 6. The luminance signal Y is transferred to and written in the areas $O_1$ of the output buffer 2a, and the color difference signal C to the area $O_1$ of the output buffer 2b. The write and read operations of data to/from the single port memory 6 are each performed within one cycle (m/2).

The signals stored in the respective areas $I_1$ of the input buffers 1a and 1b are transferred to the single port memory 6, while the next input signals are stored in the respective areas $I_2$ of the input buffers 1a and 1b. The signals stored in the respective areas $O_2$ of the output buffers 2a and 2b are externally output, while the next signals are transferred from the single port memory 6 to the respective areas $O_1$ of the output buffers 2a and 2b. Subsequently, the same process is repeated.

Figure 7:
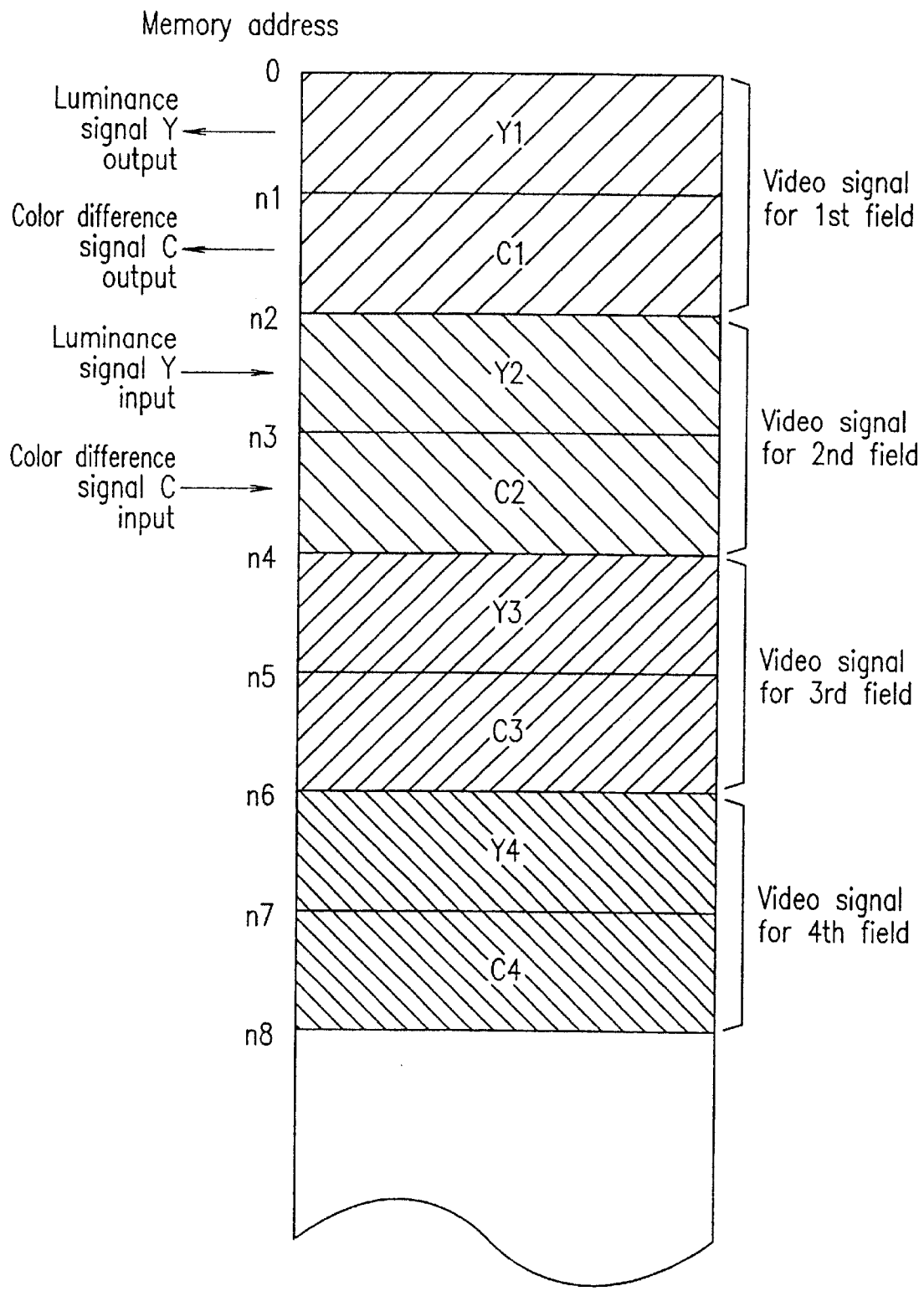
FIG. 7 shows an exemplary memory map of a single port memory.

FIG. 7 illustrates an exemplary memory map of the single port memory 6. A luminance signal Y1 and a color difference signal C1 for the first field are stored in addresses from 0 to n1−1 and in addresses from n1 to n2−1, respectively, of the single port memory 6. Luminance signals Y2 to Y4 and color difference signals C2 to C4 for the second to fourth fields are stored similarly in addresses from n2 to n8−1. When the luminance signal Y2 and the color difference signal C2 for the second field are being input to the input buffer 1a and 1b, respectively, the luminance signal Y1 and the color difference signal C1 for the first field are being read out to the output buffers 2a and 2b, respectively.

Figure 8:
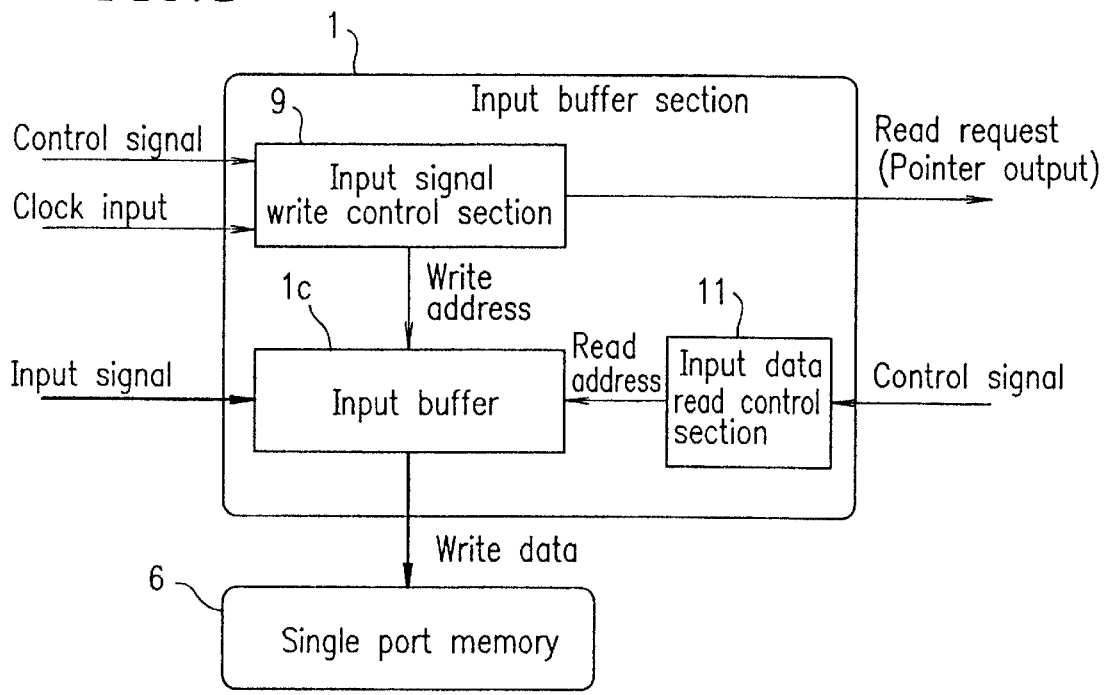
FIG. 8 is a block diagram illustrating an input buffer section.

FIG. 8 illustrates the input buffer section 1. For simplicity, the input buffer section 1 is assumed to have only one input buffer 1c. The following description also applies to the case where the input buffer section 1 includes the two input buffers 1a and 1b, as in the example illustrated in FIG. 1. It is also assumed that each input signal has 2 or 4 bits and that each word within the single port memory 6 also has 2 or 4 bits.

The input buffer section 1 includes an input signal write control section 9, the input buffer 1c and an input data read control section 11. The input signal write control section 9 controls writing of an input signal. The input buffer 1c temporarily stores the input signal. The input data read control section 11 reads out the data stored in the input buffer 1c to the single port memory 6.

Figure 9:
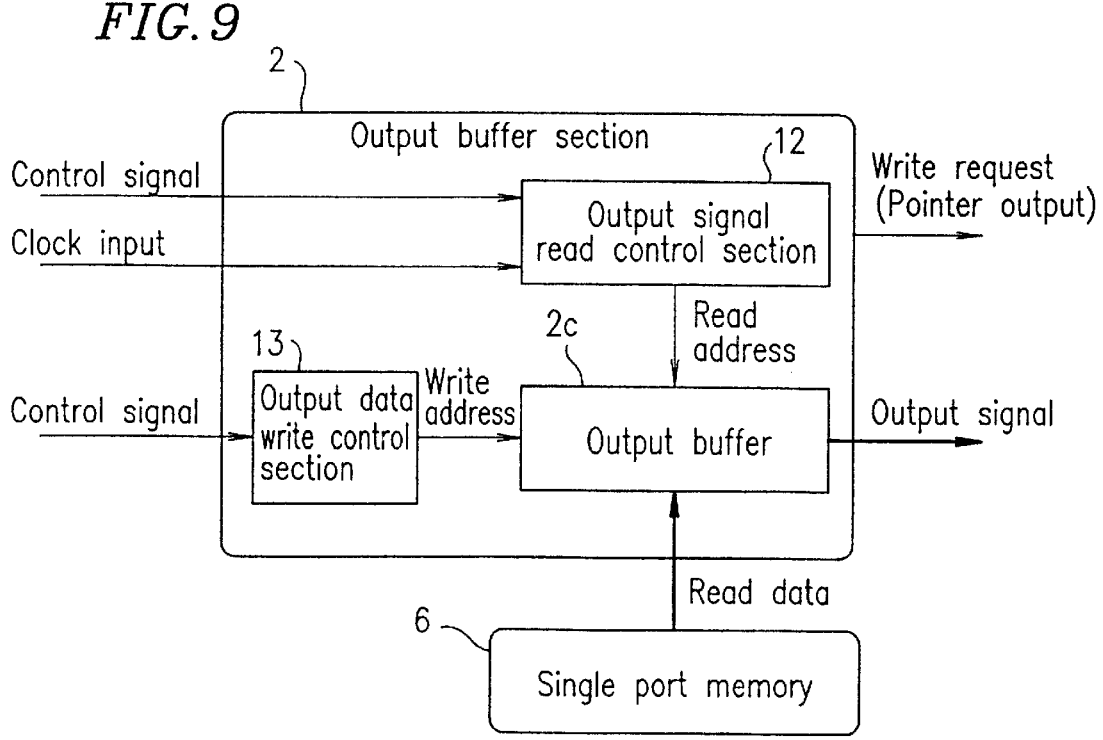
FIG. 9 is a block diagram illustrating an output buffer section.

FIG. 9 illustrates the output buffer section 2. For simplicity, the output buffer section 2 is assumed to have only one output buffer 2c. The following description also applies to the case where the output buffer section 2 includes the two input buffers 2a and 2b, as in the example illustrated in FIG. 1.

The output buffer section 2 includes an output signal read control section 12, the output buffer 2c and an output data write control section 13. The output signal read control section 12 controls reading out of an output signal. The output buffer 2c temporarily stores the output signal. The output data write control section 13 stores the data read out from the single port memory 6 in the output buffer 2c.

Figure 10:
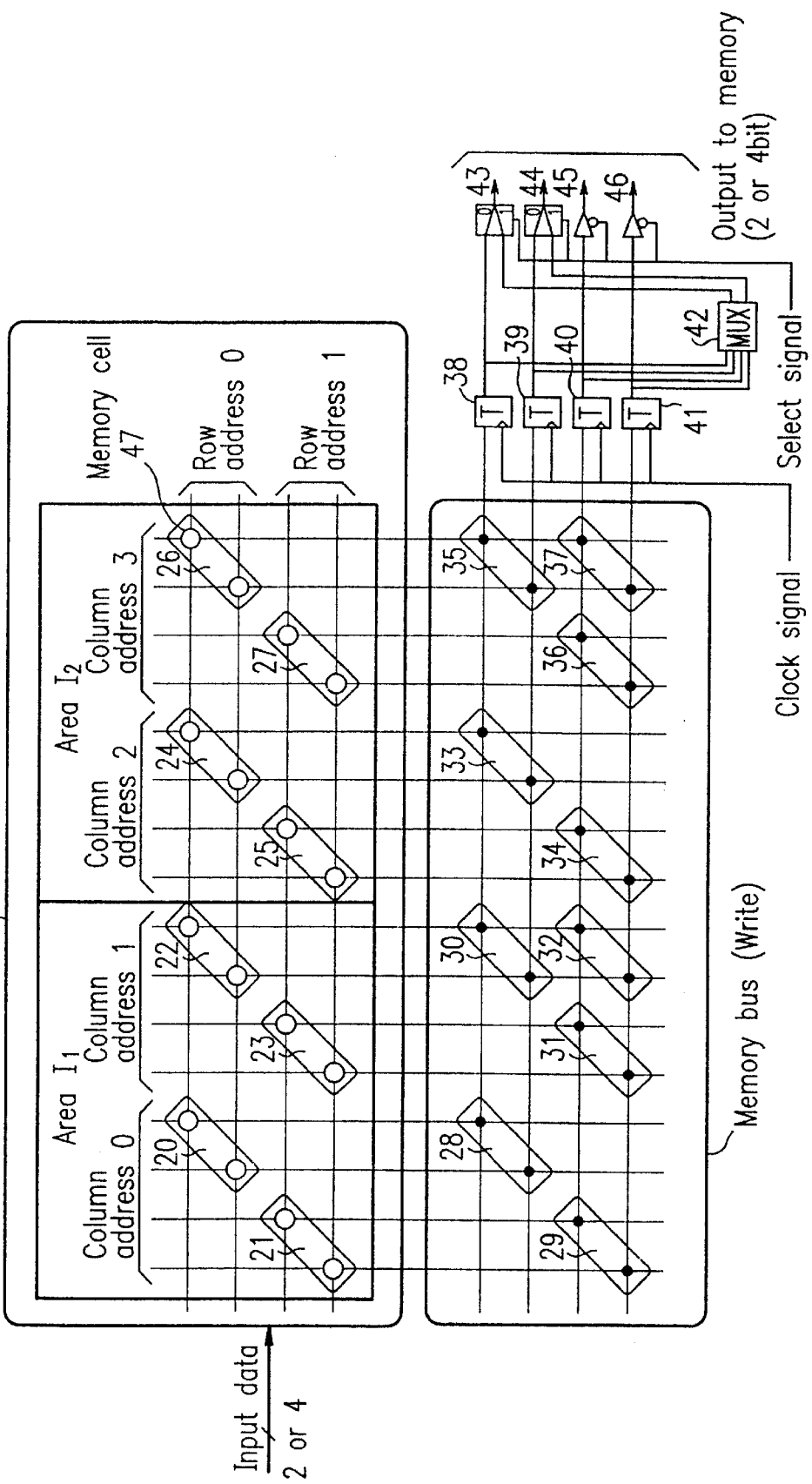
FIG. 10 to a diagram illustrating a memory cell array.

Referring to FIGS. 8 and 10, an operation of the input buffer section 1 will now be described.

Video signals input to the input buffer section 1 are successively written in the input buffer 1c.

FIG. 10 illustrates the input buffer 1c. The input buffer 1c includes a memory cell array 10 including memory cells 47 (each storing one bit of data). Reference numerals 20 to 27 each denote a pair of memory cells (each storing one bit of data). Reference numerals 28 to 37 each denote a wired OR. The input buffer 1c further includes flip flops 38 to 41, a multiplexer 42 for multiplexing data, selectors 43 and 44, and tristate buffers 45 and 46. The tristate buffers 45 and 46 each output the input signal intact when a control signal is at a low level. When the control signal is at a high level, the output impedance of the tristate buffers 45 and 46 becomes high and the tristate buffers 45 and 46 output no signal.

In the present example, the data bit width of the single port memory 6 is four, and one address is provided for every four bits accordingly. Moreover, the memory cell array 10 is divided into two areas $I_1$ (for column addresses 0 and 1) and $I_2$ (for column addresses 2 and 3).

The memory cell array 10 is also divided along the row direction into two sections having row addresses 0 and 1, respectively. The bits of the memory cells at each address are ORed with the corresponding bits of the memory bus. When the input video signal has 4 bits, the signal is written in both of the row addresses 0 and 1. When the input video signal has 2 bits, the signal is written only in the row address 0.

When the input signal is a data string of 2 bits, the first data (2 bits) is stored in the memory cell pair 20 at the address (0 (row), 0 (column)) during one cycle, and the second date (2 bits) is stored in the memory cell pair 22 at (0, 1) during the following cycle. At this point, data is stored in all the memory cell pairs in the row address 1 in the area $I_1$, and the data is read out to the memory bus to start writing the data to the single port memory 6.

Since the memory bus has 4 bits, the data stored in the memory cell pair 20 and the data stored in the memory cell 22 are read out through the wired OR 28 and the wired OR 32, respectively, so as to form and output 4-bit data to the flip flops 38 to 41.

When the single port memory 6 has 4 bits/word, a clock signal having the same frequency as the frequency with which data is written in the single port memory 6 is input to the flip flops 38 to 41. When the select signal is switched to a low level, the selector 43 outputs the signal from the flip flop 38 to the single port memory 6 and the selector 44 outputs the signal from the flip flop 39 to the single port memory 6. Similarly, the tristate buffer 45 outputs the signal from the flip flop 40 to the single port memory 6, and the tristate buffer 46 outputs the signal from the flip flop 41 to the single port memory 6. In this way, the data output from the input buffer 1c has 4 bits, and thus the input buffer 1c can be connected to a single port memory having a bit width of 4 bits.

When the single port memory 6 has 2 bits/word, a clock signal having a frequency which is one half of the frequency with which data is written in the single port memory 6 is input to the flip flops 38 to 41. The multiplexer 42 receives inputs from the flip flops 38 to 41. One of the flip flops 38 and 40 is selected to be the first output of the multiplexer 42. The data from the flip-flop 38 is output when the clock signal is at the high level, and the data from the flip flop 40 is output when the clock signal is at the low level. Similarly, one of the flip flops 39 and 41 is selected to be the second output of the multiplexer 42. The data from the flip flop 39 is output when the clock signal is at the high level, and the data from the flip flop 41 is output when the clock signal is at the low level. Therefore, the multiplexer 42 outputs data at a data rate twice as high as the clock signal.

In response to the selection signal being at the high level, the selector 43 outputs the first output of the multiplexer 42 to the single port memory 6, and the selector 44 outputs the second output of the multiplexer 42 to the single port memory 6. The output impedance of the tristate buffers 45 and 46 becomes high. Therefore, the data output from the input buffer 1c has 2 bits, and the input buffer 1c can be connected to a single port memory having a bit width of 2 bits.

The data output to the single port memory 6 is performed in substantially the same manner also when data is stored in both of the memory cell pairs (24 and 26) in the area $I_2$.

When the input signal is a data string of 4 bits, the first data (4 bits) is stored in the memory cell pairs 20 and 21, and the second data (4 bits) is stored in the memory cell pairs 22 and 23. At this point, data is stored in all the memory cell pairs in the area $I_1$, and the data is read out to the memory bus to start writing the data to the single port memory 6.

Since the memory bus has 4 bits, the data stored in the memory cell pair 20 and the data stored in the memory cell pair 21 are first read out through the wired OR 28 and the wired OR 29, respectively, so as to form 4-bit data. Subsequently, the data stored in the memory cell pair 22 and the data stored in the memory cell pair 23 are read out through the wired OR 30 and the wired OR 31, respectively, so as to form and output 4-bit data to the flip flops 38 to 41.

In this way, either a 2-bit input data or a 4-bit data can be written in the single port memory 6 which has either 2 bits/word or 4 bits/word. This can also apply to the case where the input data is n-bit data (n is a natural number) and the single port memory 6 has m bits/word (m is a natural number). Moreover, the structure of the memory cell array 10 can also be used for the output buffer section 2. Furthermore, the order in which the data is transferred to/from the plurality of areas (e.g., $I_1$ and $I_2$) is not limited to that of the present example, and any other order can be employed as long as all the buffered data can be transferred.

Figure 11:
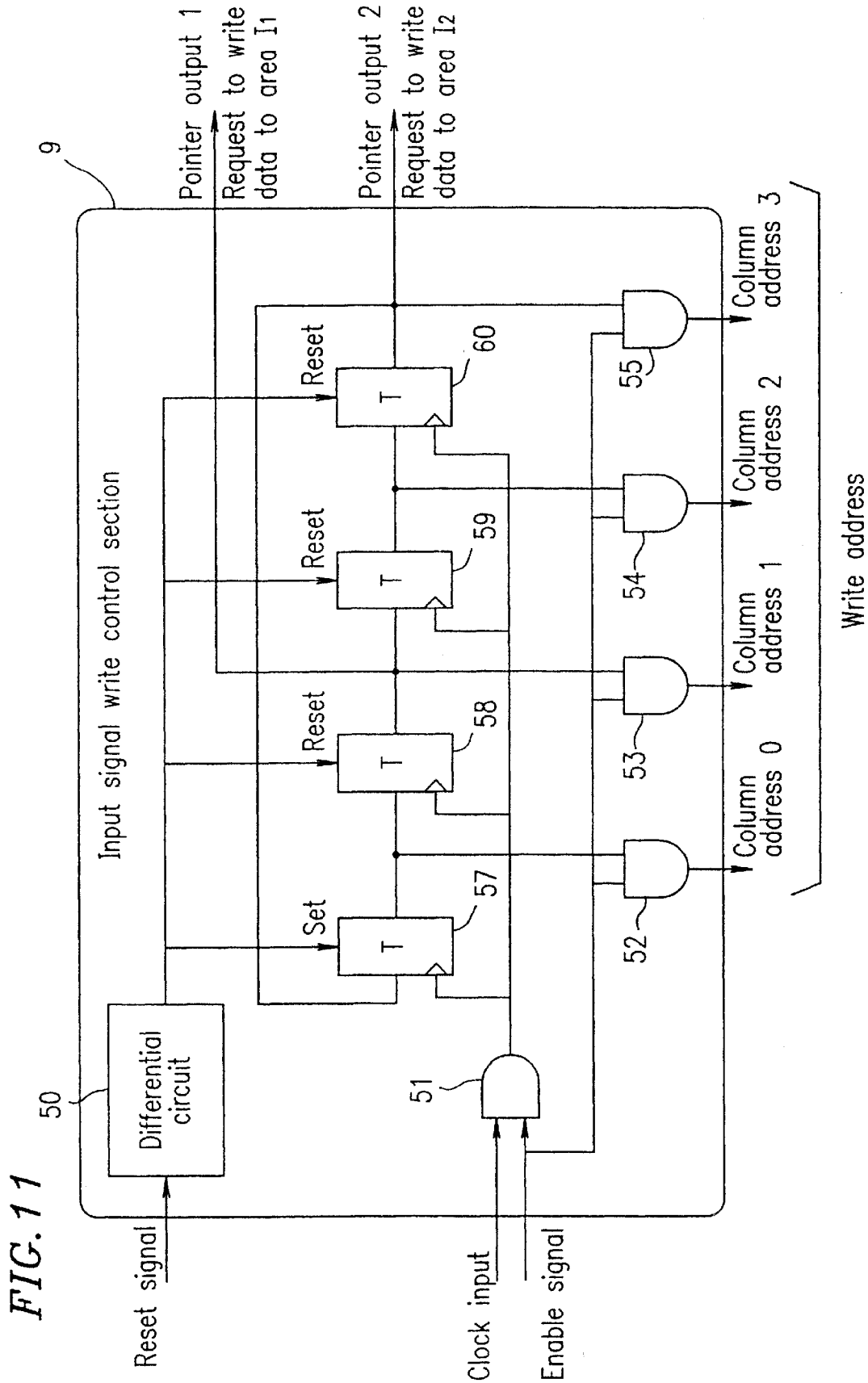
FIG. 11 is a diagram illustrating a write control section.

FIG. 11 illustrates the write control section 9. Referring to FIG. 11, the write control section 9 includes a differential circuit 50, AND gates 51 to 55 and flip flops 57 to 60. The differential circuit 50 receives a reset signal, and outputs a signal having a width substantially equal to one clock. While the output of the differential circuit 50 is at the high level, the flip flop 57 is set to the high level, and the other flip flops 58 to 60 are each reset to the low level. This is the initial state of the write control section 9.

Then, when an enable signal goes high, a clock signal is input to each of the flip flops 57 to 60, thereby shifting the respective values in the flip flops 57 to 60 to the right. Thus, at this point, the output of the flip flop 58 is at the high level, and the outputs of the other flip flops 57, 59 and 60 are at the low level. At the same time, the output of the AND gate 53 is at the high level, and the outputs of the other AND gates 52, 54 and 55 are at the low level. By providing these signals to the word lines for writing data to the memory cells in the memory cell array 10, the input signals are successively stored.

Figure 12:
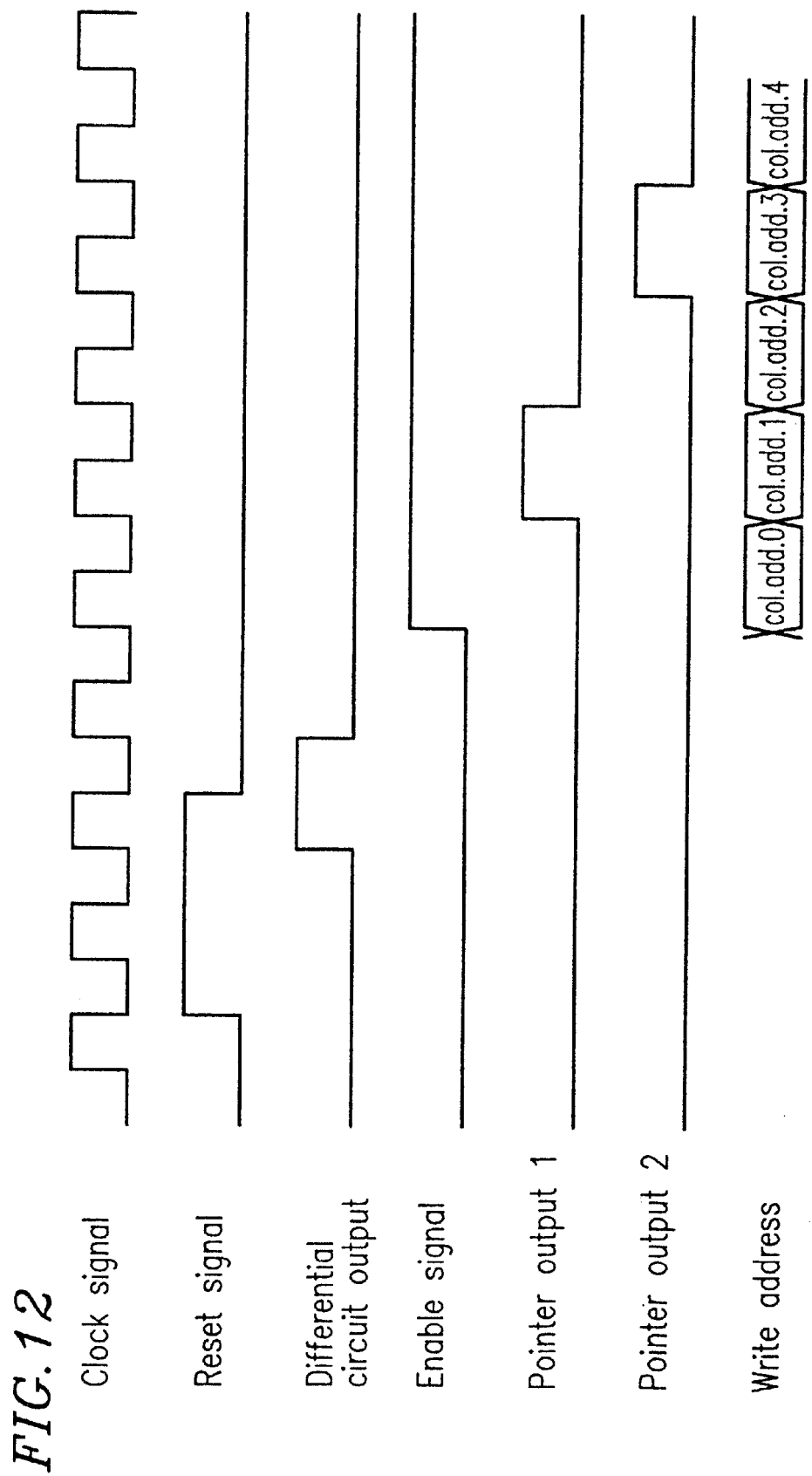
FIG. 12 shows timing diagrams illustrating an operation of a write control section.

FIG. 12 shows timing diagrams illustrating an operation of the write control section 9. The output signals of the flip flops 58 and 60 are represented by pointer outputs 1 and 2. The output of the pointer 1 going high indicates that the area $I_1$ of the input buffer 1c is filled with data, and the output of the pointer 2 going high indicates that the area $I_2$ of the input buffer 1c is filled with data. The pointer output is output to the control section 3 as a request for writing data from the input buffer 1c to the single port memory 6.

Substantially the same design can be used for the output signal read control section 12 of the output buffer 2c, except for the following. The pointer outputs 1 and 2 are each used to indicate that the output buffer 2c has become empty, so that a request is output to the control section 3 for reading out data from the single port memory 6.

Figure 13:
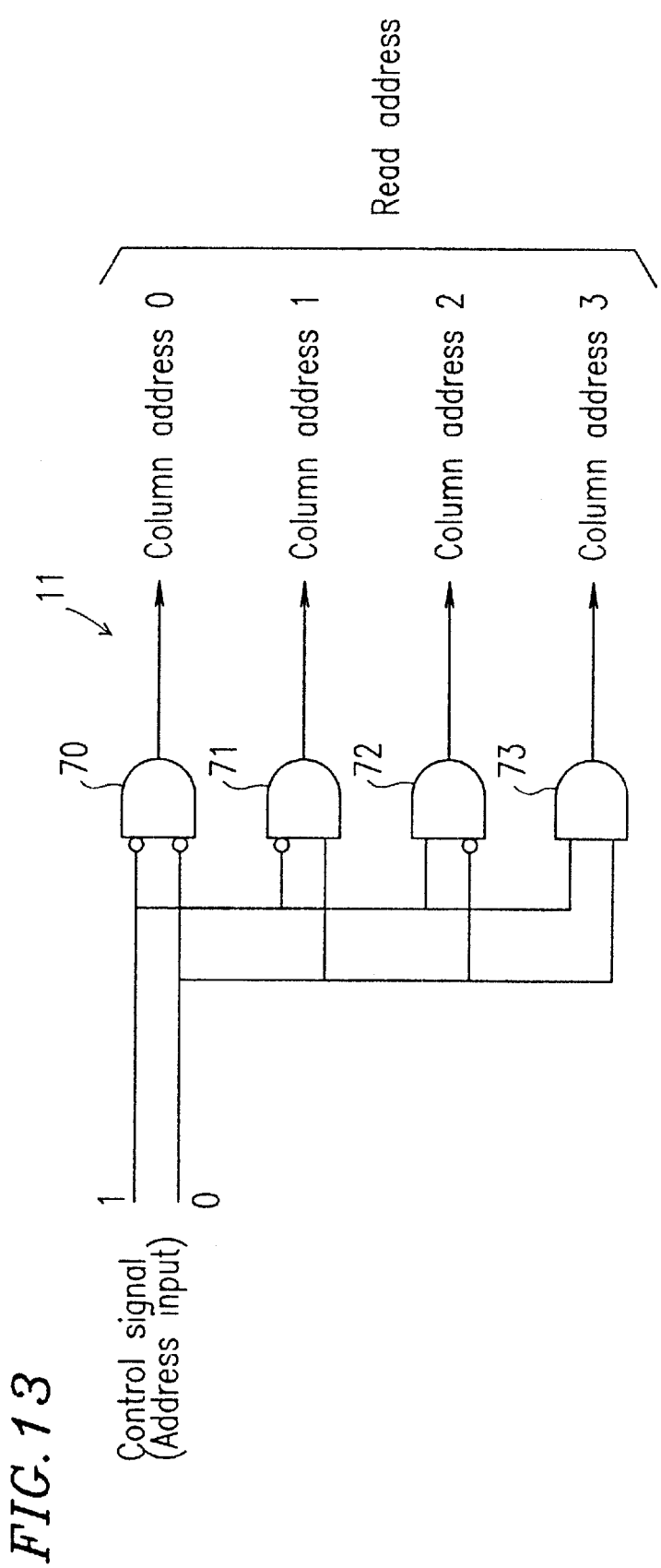
FIG. 13 is a diagram illustrating an input data read control section.

FIG. 13 illustrates the input data read control section 11. Referring to FIG. 13, the read control section 11 includes AND gates 70 to 73. Each of the AND gates 70 to 73 decodes a control signal (address) output from the control section 3 so as to output a signal which indicates the column address of the corresponding area in the memory cell array 10. The structure of the output date write control section 13 may be substantially the same as that described above.

Figure 14:
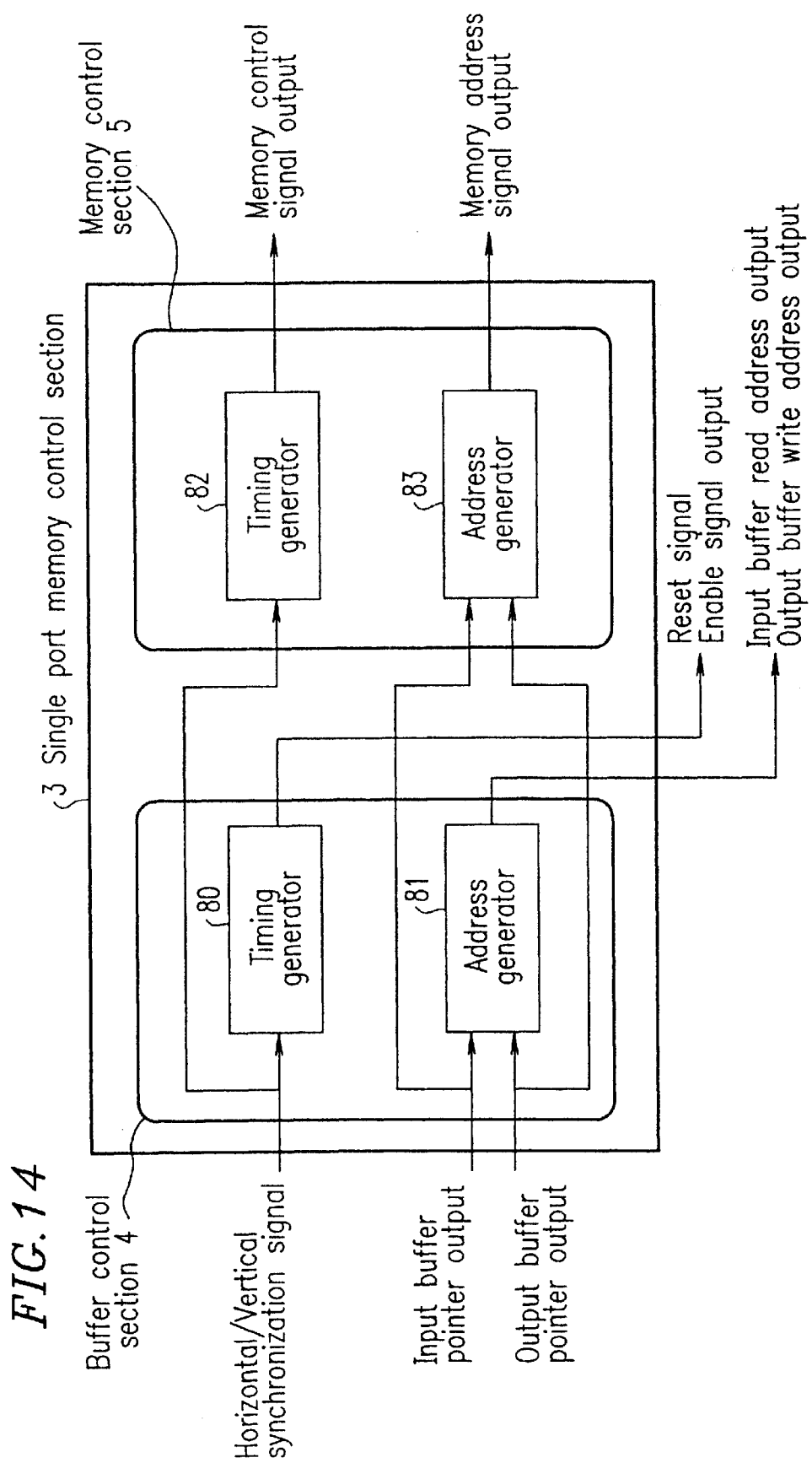
FIG. 14 is a block diagram illustrating a control section.

FIG. 14 illustrates the control section 3. Referring to FIG. 14, the control section 3 includes a buffer control section 4 (including a timing generator 80 and an address generator 81) and a memory control section 5 (including another timing generator 82 and another address generator 83).

FIG. 15A illustrates the timing generator 80. Referring to FIG. 15A, the timing generator 80 includes counters 84 and 87, registers 85 and 88, RS flip flops 86 and 89 and an AND gate 90. In response to an input vertical synchronization signal, a value of the register 85 is loaded to the counter 84. The counter 84 starts counting from the next cycle, and outputs a carry out signal when the counter 84 has counted up to n. The carry out signal is a reset signal to the differential circuit 50 of the write control section 9 (FIG. 11) and a "set" signal to the RS flip flop 86. In response to an input horizontal synchronization signal, a value of the register 88 is loaded to the counter 87, and the RS flip flop 89 is reset. The counter 87 starts counting from the next cycle, and outputs a carry out signal when the counter 87 has counted up to m. The carry out signal is a "set" signal to the RS flip flop 89. An enable signal output from the AND gate 90 is at a high level while the outputs from the RS flip flops 86 and 89 are at a high level.

FIG. 15B illustrates the address generator 81. Referring to FIG. 15B, the address generator 81 includes a counter 91. In response to a pointer signal output from the input signal write control section 9, the counter 91 is reset. The counter 91 starts counting from the next cycle, and the count of the counter 91 is output to the input data read control section 11 as an address. The structure of the timing generator 82 and the structure of the address generator 83 may be substantially the same as the structure of the timing generator 80 and the structure of the address generator 81, respectively.

In the present example, the write control section 9 provides the two pointer outputs 1 and 2 since a buffer is divided into two areas. When a buffer is divided into more areas, more pointer outputs are provided accordingly. When a buffer is divided into L areas (L is a natural number greater than or equal to 2), L pointers are provided accordingly. In the memory cell array 10 illustrated in FIG. 10, the areas $I_1$ and $I_2$ can be further divided into four areas $I_1$, $I_2$, $I_3$ and $I_4$ having column addresses 0 to 4, respectively. In such a case, the outputs of the flip flops 57 to 60 are pointers 1 to 4, respectively.

Figure 21:
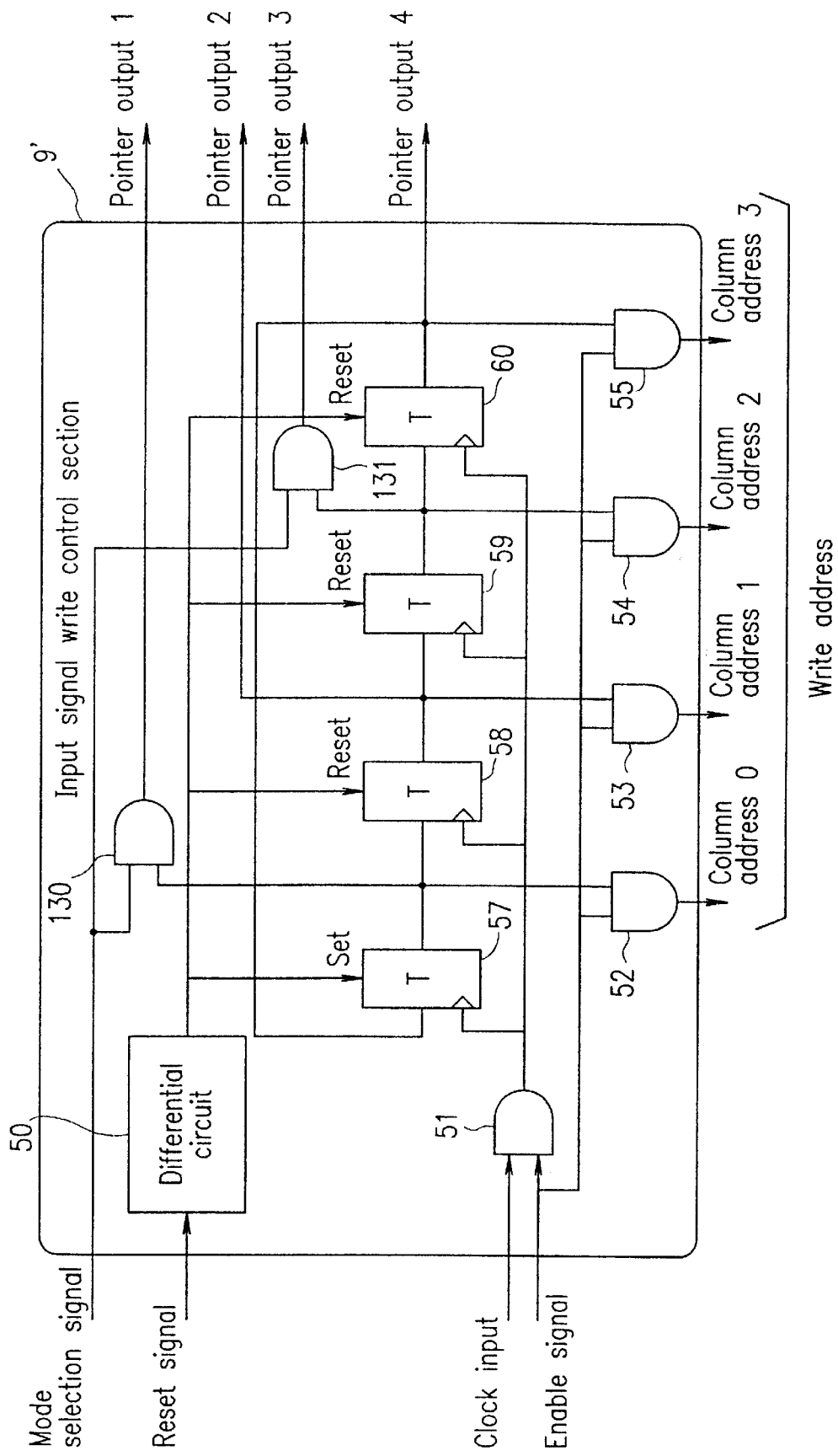
FIG. 21 is a diagram illustrating an input signal write control section.

FIG. 21 illustrates a write control section 9' according to a variation of the present example. The write control section 9' is similar to the write control section 9 but has four pointers 1 to 4. Referring to FIG. 21, the write control section 9' includes the differential circuit 50, the AND gates 51 to 55, additional AND gates 130 and 131 and the flip flops 57 to 60. A mode selection signal is provided to the write control section 9' which is at a low level when the buffer is divided into two areas and at a high level when the buffer is divided into four areas.

In the variation of the present example illustrated in FIG. 21, the output of the AND gate 130 is the pointer 1, the output of the flip flop 58 is the pointer 2, the output of the AND gate 131 is the pointer 3, and the output of the flip flop 60 is the pointer 4. When the buffer is divided into two areas $I_1$ and $I_2$, the pointer 2 indicates that the area $I_1$ is full, and the pointer 4 indicates that the area $I_2$ is full. When the buffer is divided into four areas $I_1$ to $I_4$ the pointers 1 to 4 indicate whether the areas $I_1$ to $I_4$ are full, respectively.

In the write control section 9' illustrated in FIG. 21, the mode selection signal and the additional AND gates 130 and 131 are provided. Therefore, when the buffer is divided into two areas $I_1$ and $I_2$, the mode selection signal is at the low level. Then, the pointer outputs 1 and 3 are always at the low level, thereby not starting a write operation to a memory. The write operation to the memory is initiated when the pointer output 2 or 4 goes high. When the buffer is divided into two areas $I_1$ and $I_2$, the mode selection signal is at the high level. Then, any of the pointer outputs 1 to 4 going high initiates a write operation to the memory. In this way, it is possible to provide a section for selectively controlling a write operation to the single port memory 6 based on the size of the buffer area.

FIGS. 16A and 16B each illustrate a memory map of the single port memory 6 when employing the write control section 9 illustrated in FIG. 11. FIG. 16A illustrates the initial state, FIG. 16B illustrates the single port memory 6 when data has been written in the area $I_1$. Thus, when accessing the memory using the buffer, the minimum accessing unit of the single port memory 6 depends upon the size of the buffer area.

FIGS. 17A to 17D each illustrate a memory map of the single port memory 6 when the buffer is further divided into four areas $I_1$ to $I_4$. FIG. 17A illustrates the initial state. FIG. 17B illustrates the single port memory 6 when data has been written in the area $I_1$. FIGS. 17C and 17D each illustrate the single port memory 6 when data has been written in the area $I_2$. Thus, it is possible to write data in the same memory address as that when the buffer is divided into two areas $I_1$ and $I_2$, (FIG. 16B), as illustrated in FIG. 17C. It is also possible to write data in a different memory address as illustrated in FIG. 17D.

As described above, when the memory interface device is provided with a buffer, the minimum unit by which the memory address can be controlled depends upon the size of each buffer area. Therefore, by providing a section for selectively controlling the size of the buffer area, "fine" or high resolution memory address control can be performed.

Now, a method for processing a plurality of video signals having different video signal rates or different horizontal frequencies will be described.

Figure 18:
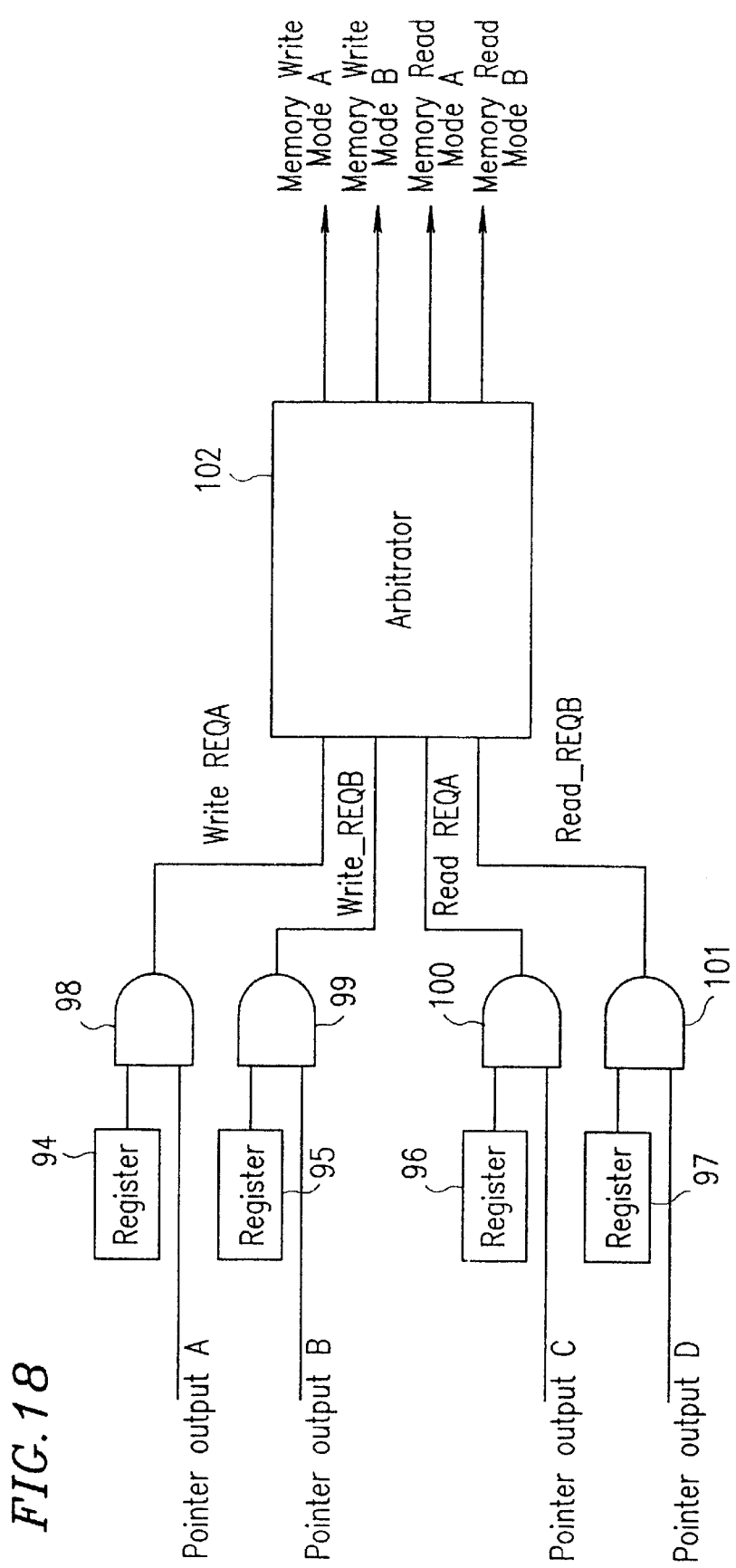
FIG. 18 is a diagram illustrating an arbitration circuit.

FIG. 18 illustrates an arbitration circuit for arbitrating requests for writing data to the single port memory 6 and requests for reading data from the single port memory 6. The arbitration circuit may be included in the control section 3. Referring to FIG. 18, the arbitration circuit includes registers 94 to 97 for user settings, AND gates 98 to 101 and an arbitrator 102.

In the present example, pointer outputs A to D are provided. The pointer output A indicates whether an input signal 1 is stored in the input buffer 1c, thereby filling up the input buffer 1c. The pointer output B indicates whether an input signal 2 is stored in the input buffer 1c, thereby filling up the input buffer 1c. The pointer output C indicates whether an output signal 1 is output from the output buffer 2c, thereby emptying the output buffer 2c. The pointer output D indicates whether an output signal 1 is output from the output buffer 2c, thereby emptying the output buffer 2c.

The requests for writing and reading date to/from the single port memory 6 are prioritized, and the priority of each request is represented by the 2-bit value set in the register. The 2-bit value "11" indicates the first (highest) priority, "10" indicates the second priority, "01" indicates the third (lowest) priority, and "00" indicates "no request". The priority may be represented by any suitable number of bits depending upon the particular application in which the memory interface device is used.

When the input signal 1 fills up the first area $I_1$ of the input buffer 1c, the pointer output A goes high, and the value set in the register 94 is input via the AND gate 98 to the arbitrator 102 as a write request signal Write REQA. Similarly, when the input signal 2 fills up the second area $I_2$ of the input buffer 1c, the value set in the register 95 is input to the arbitrator 102 as a write request signal Write REQB. When the output signal 1 empties the first area $I_1$ of the output buffer 2c, the value set in the register 96 is input to the arbitrator 102 as a read request signal Read REQA. When the output signal 2 empties the second area I₂ of the output buffer 2c, the value set in the register 97 is input to the arbitrator 102 as a read request signal Read REQB.

The arbitrator 102 has a preset priority sequence inherent within the particular arbitrator 102 hardware. Therefore, when more than one write requests or read request is issued, the requests are processed in accordance with the priority sequence. In the present example, the signal Write REQA has the first (highest) priority, the signal Write REQB has the second priority, the signal Read REQA has the third priority, and the signal Read REQB has the fourth (lowest) priority. Any other priority sequence can be applied by the user of the memory interface device by setting appropriate values in the registers 94 to 97. For example, "11" can be set in the register 97 to give the signal Read REQB the highest priority.

FIG. 19 is a chart illustrating various values output from the arbitrator 102 for various register settings.

Referring to FIG. 19, the first row (Row No. 1) represents a case where "11" is set in the register 94, and the pointer output A is accordingly at the high level. In this case, as shown under "Mode Output" in the right-hand side of the chart, a signal Write Mode A of the single port memory 6 is always at the high level regardless of the other write and read requests being issued or the register settings. Thus, the arbitrator 102 processes the request from the pointer output A by the highest priority.

Where the memory cell array of the input buffer 1c is arranged as illustrated in FIG. 10, and the input signal 1 is stored in the row address 0, when the signal Write Mode A goes high, the read control section 11 of the input buffer to processes the request for reading out data from the single port memory 6 by reading out data from the addresses (0, 0) and (0, 1). Then, the pointer output A returns to the low level.

The second row (Row No. 2) of FIG. 19 represents a case where "10" or a lower priority value is set in the register 94 while "11" is set in the register 95. In this case, a signal Write Mode B of the single port memory 6 is always at the high level regardless of the other write and read requests being issued or the register settings. Thus, the arbitrator 102 processes the request from the pointer output B as having the highest priority. In this case, the priority of the pointer output A is set to be "second" by setting "10" in the register 94, while the priority of the pointer output B is set to be "first" by setting "11" in the register 95. The other rows (Row Nos. 3 to 12) of FIG. 19 show the same processing principle for different settings.

EXAMPLE 2

Now, a method for outputting an input signal with a delay by using the input buffer 1c and the output buffer 2c according to Example 2 of the present invention will be described.

Figure 20:
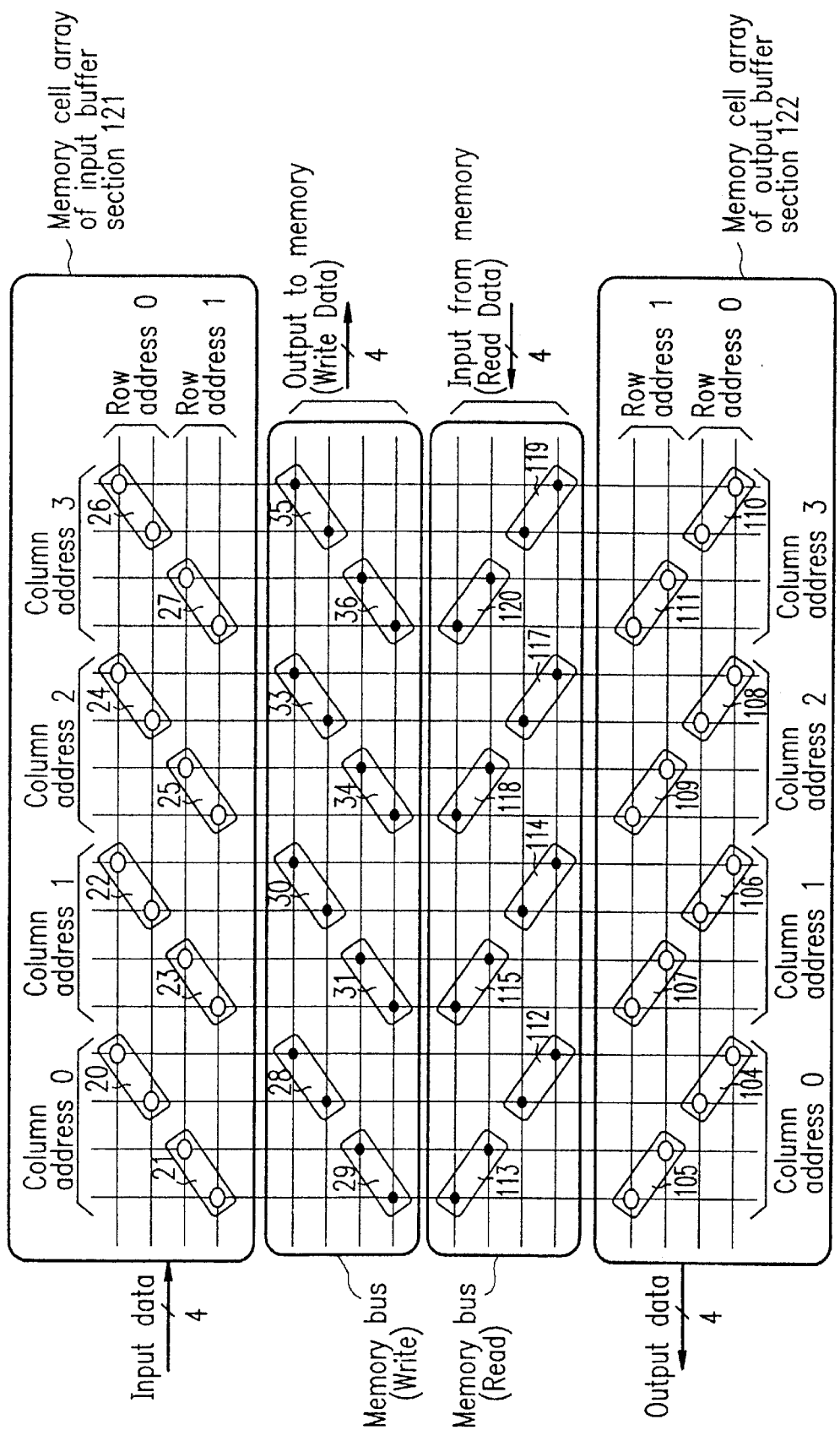
FIG. 20 is a diagram illustrating memory cell arrays of an input buffer and an output buffer.

FIG. 20 illustrates a memory cell array 121 of the input buffer section 1, a write bus to the single port memory 6, a memory cell array 122 of the output buffer section 2, and a read bus from the single port memory 6. Referring to FIG. 20, reference numerals 20 to 27 and 104 to 111 each denote a pair of memory cells. Reference numerals 28 to 36 and 112 to 120 each denote a pair of wired ORs. It is assumed in the present example that each word of the single port memory 6 has 4 bits.

When the memory cell array 121 of the input buffer section 1 is filled with data, the data is normally output through the wired ORs 28 to 36 to the single port memory 6. Since a write bit line of the write memory bus and a read bit line of the read memory bus are connected together, it is possible to write data in the memory cell array 121 of the input buffer section 1 directly to the memory cell array 122 of the output buffer section 2. For example, when reading out data in the memory cell pair 20 through the wired OR 28, if the wired OR 112 is turned on, the data can be written in the memory cell pair 104.

In this way, an input signal can be output with a delay using the input buffer 1c and the output buffer 2c. In the illustrated example, an input signal is delayed by 4 to 8 clocks.

The number of bits or the number of words of the buffer of the present invention is not limited to those described above.

EXAMPLE 3

Figure 22:
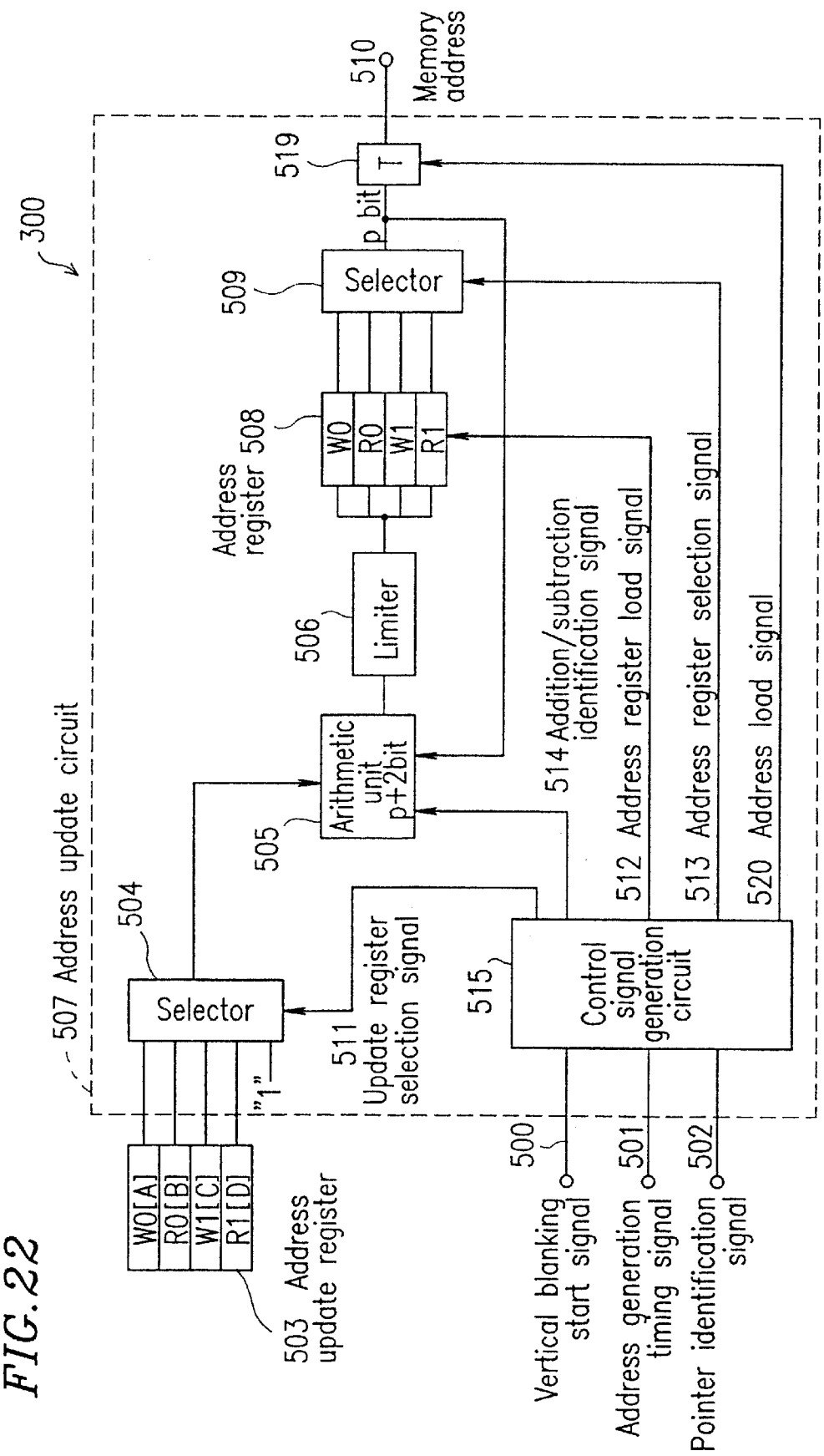
FIG. 22 is a block diagram illustrating a memory address generation device according to Example 3 of the present invention.

FIG. 22 illustrates a memory address generation device 300 according to Example 3 of the present invention. The memory address generation device 300 of this example is designed to generate addresses in a memory to/from which a digital video signal is written and read out. The memory address generation device 300 updates a plurality of addresses for each field based on respective offset values thereof.

Referring to FIG. 22, the memory address generation device 300 includes an input terminal 500 through which a register update start signal (a vertical blanking start signal) is input, an input terminal 501 through which an address generation timing signal is input, an input terminal 502 through which a pointer identification signal is input, and an address update register 503. A selector 504 selectively outputs one of values A, B, C and D in the address update register 503 and a fixed value "1". An arithmetic unit 505 calculates an address. A limiter 506 limits the address calculated by the arithmetic unit 505 to be an address within the memory space. Reference numeral 507 denotes an address update circuit. An address register 508 stores memory addresses corresponding to address pointers, respectively. A selector 509 selectively outputs one of the memory addresses stored in the address register 508. Reference numeral 510 denotes an output terminal through which a memory address is output. A latch 519 latches the output from the selector 509. A control signal generation circuit 515 generates signals for controlling the arithmetic unit 505, the selectors 504 and 509, the address register 508 and the latch 519. An update register selection signal 511 controls the selector 504. An address register load signal 512 controls the address register 508. An address register selection signal 513 controls the selector 509. An address load signal 520 indicates a timing at which an address should be loaded to the selector 509. An addition/subtraction identification signal 514 indicates a type of calculation to be performed by the arithmetic unit 505.

In the present example, as exemplary digital signals, a luminance signal Y and a color difference signal C are written to and read out from a memory (not shown). The luminance signal Y and the color difference signal C are delayed by one field while the signals are written to and read out from the memory. In the figure, W0 and W1 denote address pointers in the memory to which the luminance signal Y and the color difference signal C are written, respectively, and R0 and R1 denote address pointers in the memory from which the luminance signal Y and the color difference signal C are read out, respectively.

The address update register 503 stores offset values A, B, C and D corresponding to the address pointers W0, R0, W1 and R1, respectively.

By incrementing (or decrementing) an address, an access is made to a video data area in the memory where the luminance signal Y and the color difference signal C are stored. This operation will now be described.

Upon receiving the pointer identification signal through the input terminal 502, the control signal generation circuit 515 outputs to the selector 509 the address register selection signal 513 corresponding to the pointer identification signal. The address register 508 stores addresses corresponding to the address pointers W0, R0, W1 and R1, respectively. The selector 509 selects one of the address pointers W0, R0, W1 and R1 as indicated by the address register selection signal 513, and reads out an address corresponding to the selected address pointer.

Upon receiving the address generation timing signal through the input terminal 501, the control signal generation circuit 515 generates and outputs the address load signal 520 corresponding to the address generation timing signal to the latch 519. In response to the address load signal 520, the latch 519 latches the address received from the selector 509. The address stored in the latch 519 is output as an address in the memory which corresponds to one of the address pointers W0, R0, W1 and R1. The memory is accessed based on the address.

The address output from the selector 509 is also provided to the arithmetic unit 505. At this point, the control signal generation circuit 515 provides the update register selection signal 511 indicating the fixed value "1" to the selector 504. In response to this, the selector 504 outputs the fixed value "1" to the arithmetic unit 505. The control signal generation circuit 515 outputs to the arithmetic unit 505 the addition/subtraction identification signal 514 indicating an addition. In response to the addition/subtraction identification signal 514, the arithmetic unit 505 adds the fixed value "1" to the address received from the selector 509, thereby updating the address. The updated address is returned to the address register 508 via the limiter 506. In response to the address register load signal 512 from the control signal generation circuit 515, an address in the address register 508 is replaced by the updated address.

For example, where the memory is accessed based on the address pointer W0, an address in the address reregister 508 corresponding to the address pointer W0 is selected and output via the latch 519. The fixed value "1" is added to the address, thereby updating the address. The updated address is written in the address register 508 as an address corresponding to the address pointer W0. Substantially the same operation is repeated for each of the other address pointers R0, W1 and R1, thereby incrementing the address pointers W0, R0, W1 and R1.

Figures 23A, 23B, 23C:
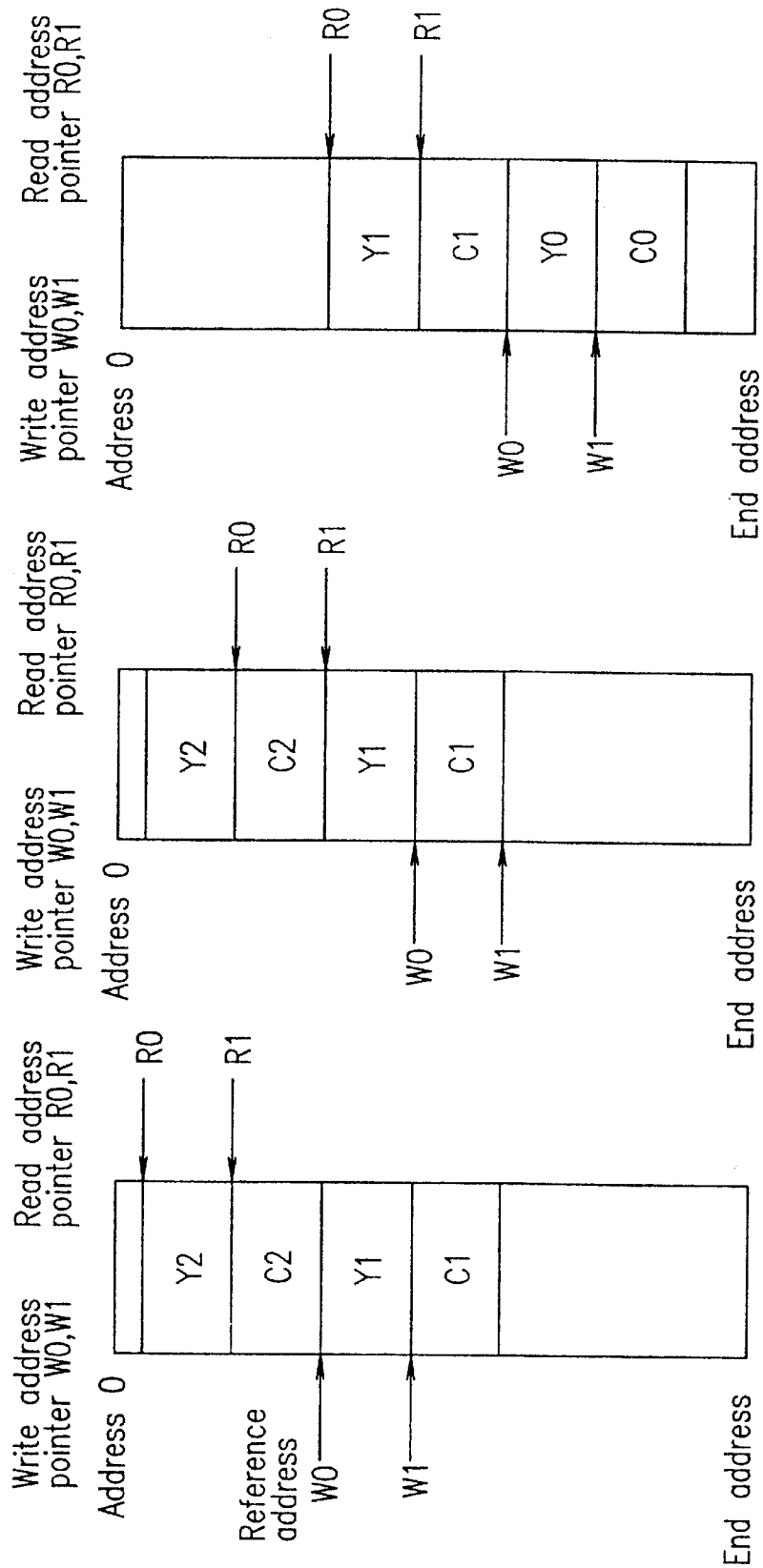
FIGS. 23A, 23B and 23C illustrate an address update operation according to Example 3 of the present invention.

FIGS. 23A, 23B and 23C each illustrate a memory area in a memory corresponding to a plurality of fields, each storing one luminance signal Y and one color difference signal C. One field stores a luminance signal Y2 and a color difference signal C2, the next field stores another luminance signal Y1 and another color difference signal C1, and the next field stores another luminance signal Y0 and another color difference signal C0.

FIG. 23A illustrates the memory areas along with address pointers W0, R0, W1 and R1 before starting a read operation for one field and a write operation for another field. At this point, the address register 508 stores addresses corresponding to the address pointers W0, R0, W1 and R1, respectively, as illustrated in FIG. 23A. As described above, each of the address pointers W0, R0, W1 and R1 is incremented each time the address pointer is selected. Thus, after the read and write operations, the address pointers W0, R0, W1 and R1 are incremented as illustrated in FIG. 23B.

Before starting the next read and write operations for the following two fields, the address pointers W0, R0, W1 and R1 are updated as illustrated in FIG. 23C. The update is performed by using the address update register 503 as follows.

While the address register 508 needs to be updated once for each field, this update should typically be performed while the memory is not being accessed. In the present example, the register update start signal input through the input terminal 500 is a vertical blanking start signal (a signal indicating the start of vertical blanking), and the address register 508 is updated in response to the start of vertical blanking.

Upon receiving the vertical blanking start signal, the control signal generation circuit 515 outputs, for example, the update register selection signal 511 indicating the address pointer W0 to the selector 504, the address register selection signal 513 indicating the address pointer W0 to the selector 509 and the addition/subtraction identification signal 514 indicating an addition to the arithmetic unit 505. In response to the update register selection signal 511, the selector 504 selects the offset value A corresponding to the address pointer W0 from the address update register 503, and outputs the offset value A to the arithmetic unit 505. In response to the address register selection signal 513, the selector 509 selects an address corresponding to the address pointer W0 from the address register 508, and outputs the address to the arithmetic unit 505.

The arithmetic unit 505 adds the offset value A corresponding to the address pointer W0 to the address corresponding to the address pointer W0, thereby updating the address. The updated address is returned to the address register 508 via the limiter 506. In response to the address register load signal 512 from the control signal generation circuit 515, the old address in the address register 508 corresponding to address pointer W0 is replaced by the updated address. Thus, the address pointer W0 is updated as illustrated in FIGS. 23B and 23C.

The address pointer W1 is updated as follows. The addition/subtraction identification signal 514 indicating an addition is provided to the arithmetic unit 505. The offset value C corresponding to the address pointer W1 is read out from the address update register 503, and the updated address corresponding to the address pointer W0 is read out from the address register 508. The offset value C is added to the updated address, and the sum is written in the address register 508 as an updated address corresponding to the address pointer W1.

The address pointer R0 is updated as follows. The addition/subtraction identification signal 514 indicating a subtraction is provided to the arithmetic unit 505. The offset value B corresponding to the address pointer R0 is read out from the address update register 503, and the updated address corresponding to the address pointer W0 is read out from the address register 508. The offset value B is subtracted from the updated address, and the difference is written in the address register 508 as an updated address corresponding to the address pointer R0.

In this way, the address pointers W0, R0, W1 and R1 are updated as illustrated in FIGS. 23B and 23C.

Whether, an addition or a subtraction is to be performed is predetermined for each of the offset values A, B, C and D of the address update register 503. Therefore, the control signal generation circuit 515 is provided with register storing values (each indicating either an addition or a subtraction) for the offset values A, B, C and D of the address update register 503. Thus, when the control signal generation circuit 515 outputs the address register selection signal 513 indicating one of the address pointers, the control signal generation circuit 515 can refer to the register provided therein to determine either an addition or a subtraction is to be performed with the offset value corresponding to the one of the address pointers and to output the addition/subtraction identification signal 514 indicating either an addition or a subtraction.

Figure 24A:
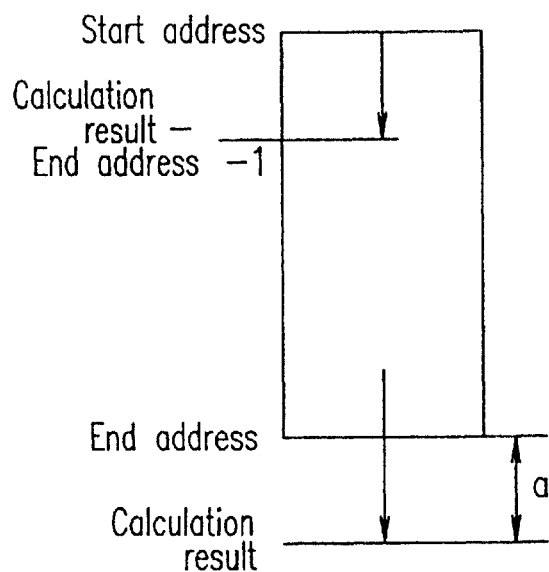
FIGS. 24A and 24B illustrate an operation of a limiter according to Example 3 of the present invention.
Figure 24B:
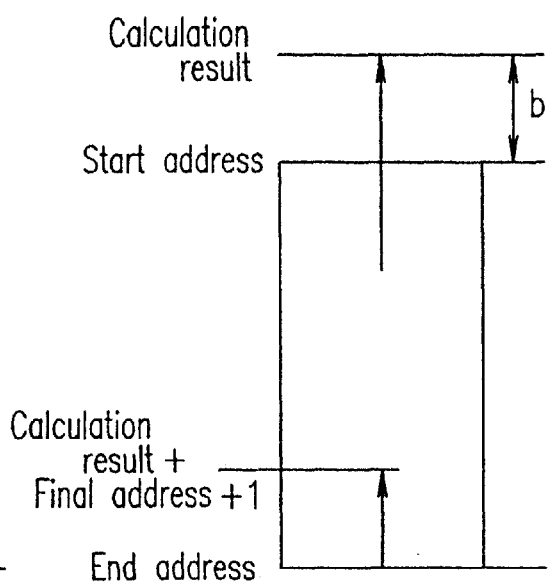

Referring to FIGS. 24A and 24B, an operation of the limiter 506 in connection with the address space of the memory will now be described.

Consider a memory which has a p-bit-address memory space (a memory space represented by p-bit addresses). The memory space exists in a range from a p-bit start address to a p-bit end address. When a p-bit address is output from the address register 508, the arithmetic unit 505 adds or subtracts an offset value to/from the p-bit address, thereby outputting "p+2"-bit. The p+1 bits of the p+2 bits correspond to "p bits+p bits (p denotes the number of bits included in an address). A sign bit (a bit in an address indicating whether the address value is positive or negative) is added to the "p+1"-bit address, thereby providing a "p+2"-bit address.

FIG. 24A illustrates an operation of the limiter 506 when the "p+1"-bit address output from the arithmetic unit 505 is larger than the end address by a value "a". In such a case, the limiter 506 calculates the value {"p+1"-bit address (from the arithmetic unit 505)−final address−1}, and outputs the calculated value as an updated address, which is within the address space. The limiter 506 outputs the updated address which has p bits.

FIG. 24B illustrates an operation of the limiter 506 when the "p+1"-bit address output from the arithmetic unit 505 is smaller than the end address by a value "b". In such a case, the limiter 506 calculates the value {"p+1"-bit address (from the arithmetic unit 505)+final address+1}, and outputs the calculated value as an updated address, which is within the address space. The limiter 506 outputs the updated address which has p bits.

As described above, in the present example, the address pointers and the corresponding addresses are each updated through a relative calculation based on a reference address. Thus, it is possible to allocate the address pointers within the memory space while maintaining the relationship of the address pointers with respect to one another.

In the present example, one address is used as a reference address while the other addresses are obtained with respect to the reference address. However, the number of reference addresses is not limited to one, but a plurality of reference addresses may alternatively be used.

Moreover, the number of the offset values stored in the address update register 503 may alternatively be different from the number of the addresses stored in the address register 508.

In the present example, the arithmetic unit 505 is controlled by the addition/subtraction identification signal 514. Alternatively, the arithmetic unit 505 may simply be an adder, while storing in the address update register 503 a value obtained based on a two's complement.

Moreover, the address does not have to be incremented by one at a time, but may alternatively be incremented by any other number. The address may alternatively be decremented.

Furthermore, in the present example, a plurality of addresses are updated using one arithmetic unit 505 in combination with the selectors 504 and 509. Alternatively, a plurality of arithmetic units may be provided for updating the respective addresses.

EXAMPLE 4

Figure 25:
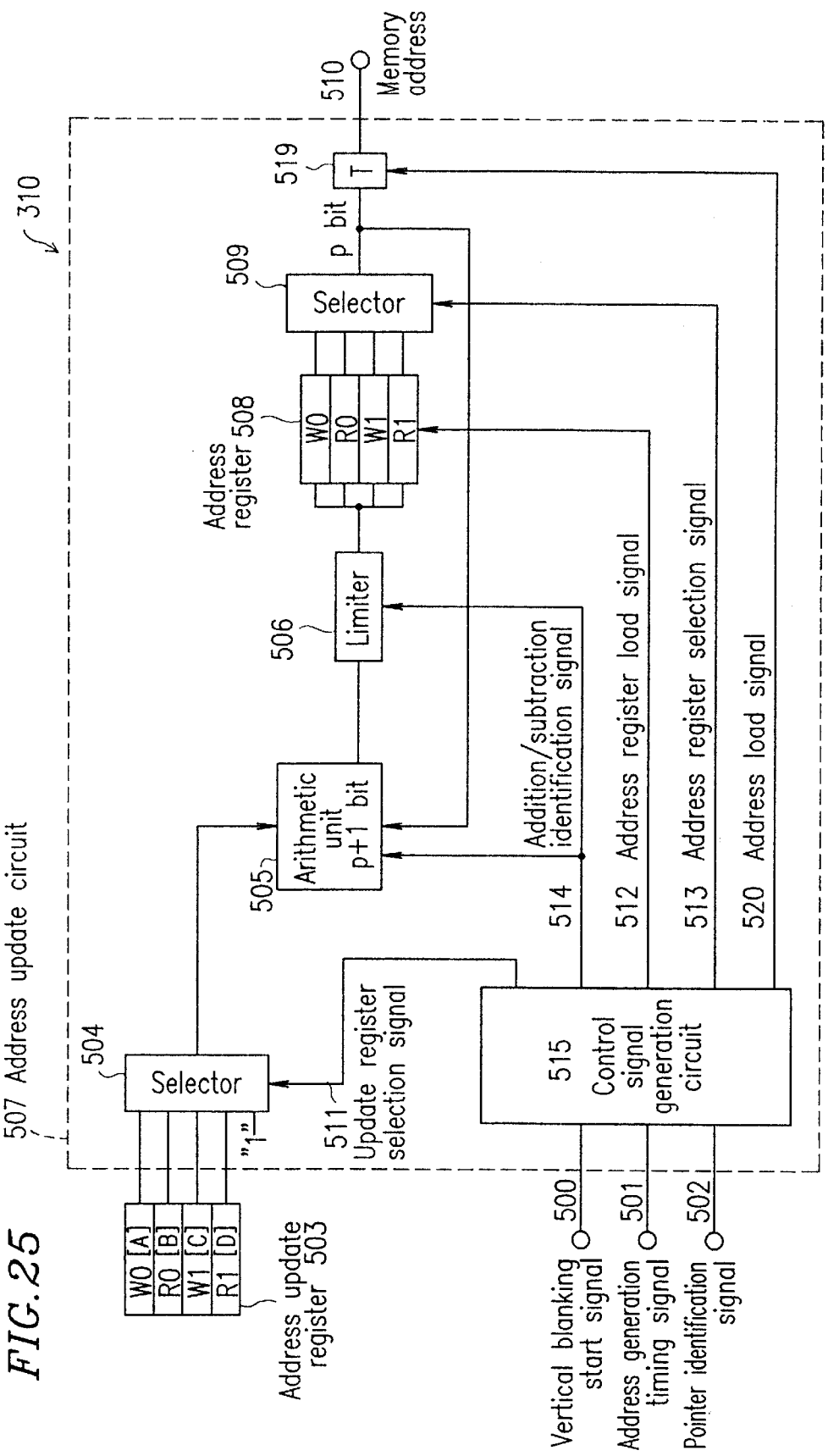
FIG. 25 is a block diagram illustrating a memory address generation device according to Example 4 of the present invention.

FIG. 25 illustrates a memory address generation device 310 according to Example 4 of the present invention. In Example 4, the control signal generation circuit 515 provides the addition/subtraction identification signal 514 to the limiter 506, and the address output from the arithmetic unit 505 to the limiter 506 has p+1 bits. As compared to Example 3 where the address output from the arithmetic unit 505 has p+2 bits, the sign bit is eliminated, thereby providing a "p+1"-bit address.

Referring to FIG. 25, the memory address generation device 310 includes the input terminal 500 through which a register update start signal (a vertical blanking start signal) is input, the input terminal 501 through which an address generation timing signal is input, the input terminal 502 through which a pointer identification signal is input, and the address update register 503. The selector 504 selectively outputs one of values A, B, C and D in the address update register 503 and a fixed value "1". The arithmetic unit 505 calculates an address. The limiter 506 limits the address calculated by the arithmetic unit 505 to be an address within the memory space. Reference numeral 507 denotes the address update circuit. The address register 508 stores memory addresses corresponding to address pointers, respectively. The selector 509 selectively outputs one of the memory addresses stored in the address register 508. Reference numeral 510 denotes the output terminal through which a memory address is output. The latch 519 latches the output from the selector 509. The control signal generation circuit 515 generates signals for controlling the arithmetic unit 505, the selectors 504 and 509, the address register 508 and the latch 519. The update register selection signal 511 controls the selector 504. The address register load signal 512 controls the address register 508. The address register selection signal 513 controls the selector 509. The address load signal 520 indicates a timing at which an address should be loaded to the selector 509. The addition/subtraction identification signal 514 indicates a type of calculation to be performed by the arithmetic unit 505.

In the present example, as exemplary digital signals, a luminance signal Y and a color difference signal C are written to and read out from a memory (not shown). The luminance signal Y and the color difference signal C are delayed by one field while the signals are written to and read out from the memory. In the figure, W0 and W1 denote address pointers in the memory to which the luminance signal Y and the color difference signal C are written, respectively, and R0 and R1 denote address pointers in the memory from which the luminance signal Y and the color difference signal C are read out, respectively.

The address update register 503 stores offset values A, B, C and D corresponding to the address pointers W0, R0, W1 and R1, respectively.

An access to the memory is made by incrementing each of the addresses stored in the address register 508. This is performed in substantially the same manner as that described in Example 3, and will not be further described below.

Figures 26A, 26B, 26C:
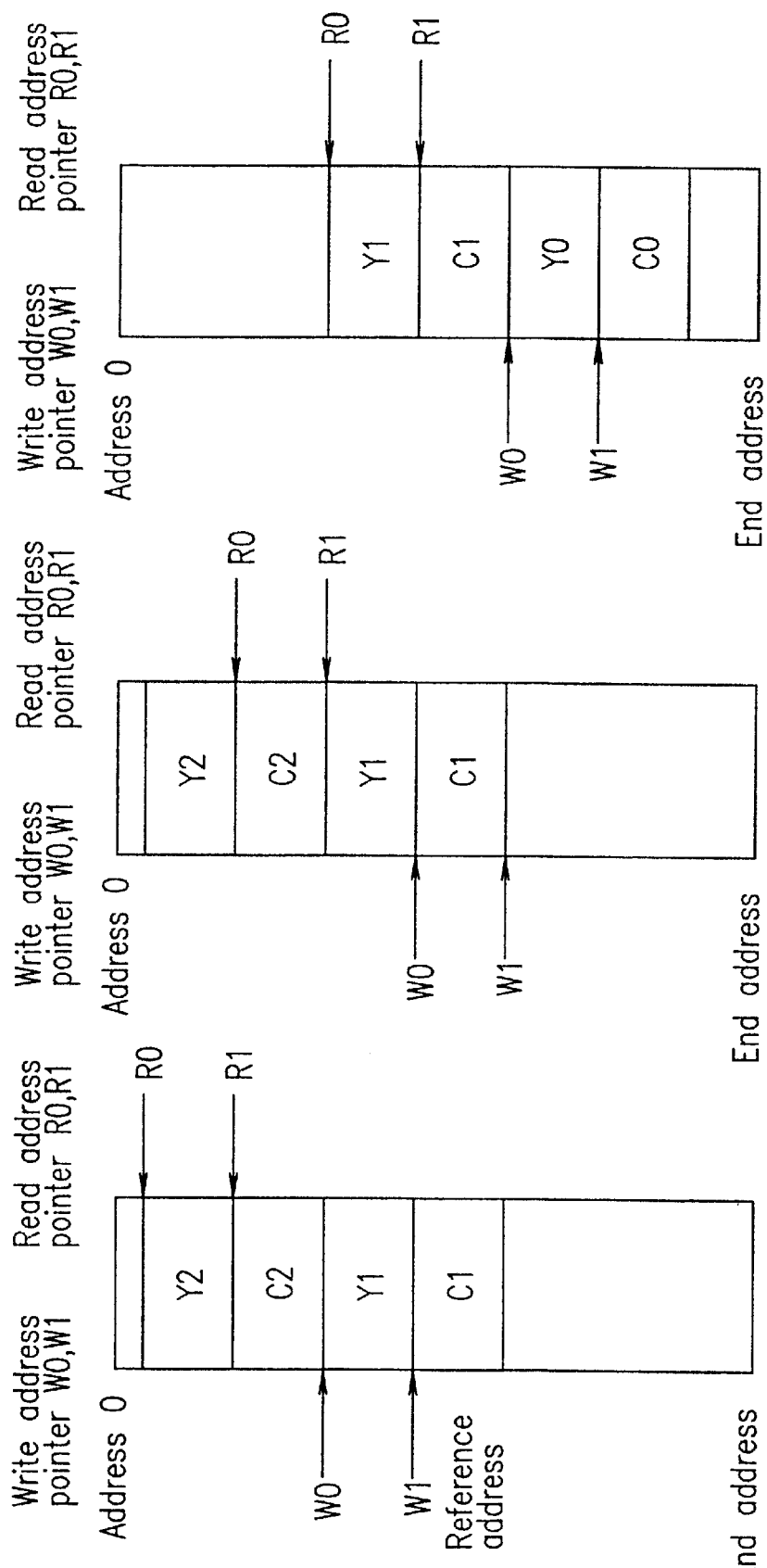
FIGS. 26A, 26B and 26C illustrate an address update operation according to Example 4 of the present invention.

FIGS. 26A, 26B and 26C each illustrate a memory area in a memory corresponding to a plurality of fields, each storing one luminance signal Y and one color difference signal C. One field stores a luminance signal Y2 and a color difference signal C2, the next field stores another luminance signal Y1 and another color difference signal C1, and the next field stores another luminance signal Y0 and another color difference signal C0.

FIG. 26A illustrates the memory areas along with address pointers W0, R0, W1 and R1 before starting a read operation for one field and a write operation for another field. At this point, the address register 508 stores addresses corresponding to the address pointers W0, R0, W1 and R1, respectively, as illustrated in FIG. 26A. As described above, each of the address pointers W0, R0, W1 and R1 is incremented each time the address pointer is selected. Thus, after the read and write operations, the address pointers W0, R0, W1 and R1 are incremented as illustrated in FIG. 26B.

Before starting the next read and write operations for the following two fields, the address pointers W0, R0, W1 and R1 are updated as illustrated in FIG. 26C. The update is performed by using the address update register 503 as follows.

While the address register 508 needs to be updated once for each field, this update should typically be performed while the memory is not being accessed. In the present example, the register update start signal input through the input terminal 500 is a vertical blanking start signal (a signal indicating the start of vertical blanking), and the address register 508 is updated in response to the start of vertical blanking.

Upon receiving the vertical blanking start signal, the control signal generation circuit 515 outputs, for example, the update register selection signal 511 indicating the address pointer W1 to the selector 504, the address register selection signal 513 indicating the address pointer W1 to the selector 509 and the addition/subtraction identification signal 514 indicating an addition to the arithmetic unit 505. In response to the update register selection signal 511, the selector 504 selects the offset value C corresponding to the address pointer W1 from the address update register 503, and outputs the offset value C to the arithmetic unit 505. In response to the address register selection signal 513, the selector 509 selects an address corresponding to the address pointer W1 from the address register 508, and outputs the address to the arithmetic unit 505.

The arithmetic unit 505 adds the offset value C corresponding to the address pointer W1 to the address corresponding to the address pointer W1, thereby updating the address. The updated address is returned to the address register 508 via the limiter 506. In response to the address register load signal 512 from the control signal generation circuit 515, the old address in the address register 508 corresponding to address pointer W1 is replaced by the updated address. Thus, the address pointer W1 is updated as illustrated in FIGS. 26B and 26C.

The other address pointers R0, W0 and R1 are updated by subtracting the corresponding offset value from the updated address corresponding to the address pointer W1 as a reference address.

For example, the address pointer W1 is updated as follows. The addition/subtraction identification signal 514 indicating a subtraction is provided to the arithmetic unit 505. The offset value A corresponding to the address pointer W0 is read out from the address update register 503, and the updated address corresponding to the address pointer W1 is read out from the address register 508. The offset value A is subtracted from the updated address, and the difference is written in the address register 508 as an updated address corresponding to the address pointer W0.

Similarly, the address pointer R0 is updated by subtracting the offset value B from the updated address corresponding to the address pointer W1. The address pointer R1 is updated by subtracting the offset value D from the updated address corresponding to the address pointer W1.

As described above, in the present example, only the address pointer W1 is updated by an addition (using the offset value C), and the other address pointers R0, W0 and R1 are updated by a subtraction (using the offset values B, A and D, respectively).

In this way, the address pointers W0, R0, W1 and R1 are updated as illustrated in FIGS. 26B and 26C.

Whether the offset value is to be added or subtracted can be dictated from the value of the update register selection signal 511. Therefore, the value of the addition/subtraction identification signal 514 is determined based on the value of the update register selection signal 511.

Figure 27A:
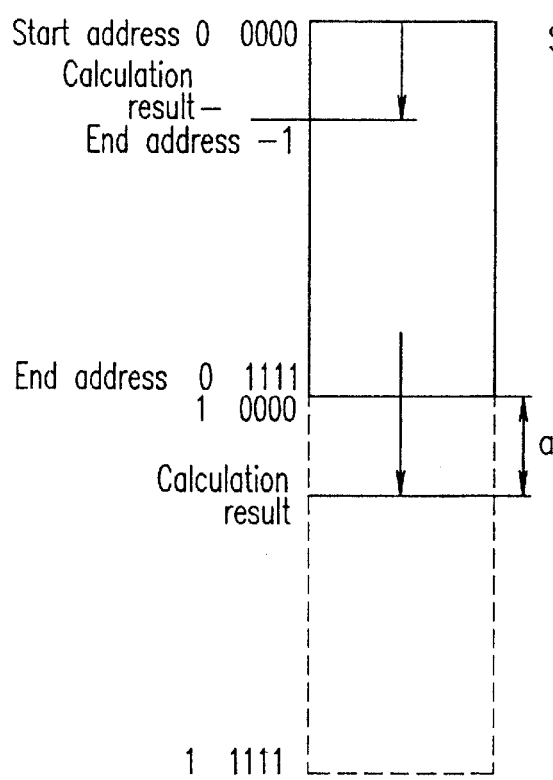
FIGS. 27A and 27B illustrate an operation of a limiter according to Example 4 of the present invention.
Figure 27B:
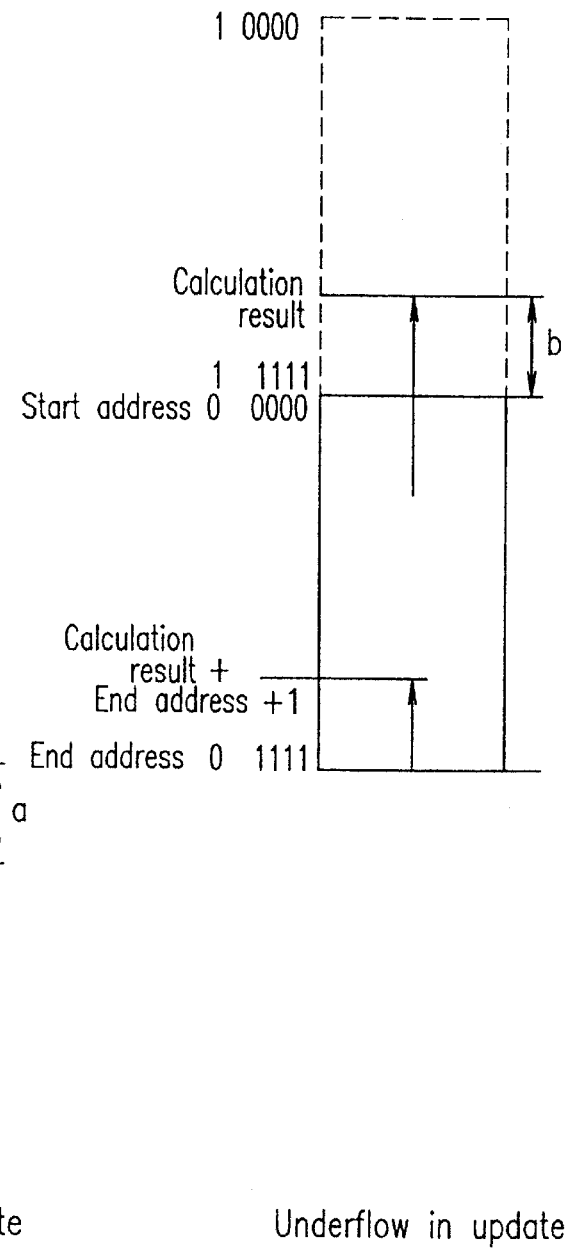

Referring to FIGS. 27A and 27B, an operation of the limiter 506 in connection with the address space of the memory will now be described.

Consider a case where the memory has a memory space with 4-bit addresses. The memory space exists in a range from a 4-bit start address to a 4-bit end address. When a 4-bit address is output from the address register 508, the arithmetic unit 505 adds or subtracts an offset value to/from the 4-bit address, thereby outputting 5-bit address. In this case, the address does not have the sign bit.

FIG. 27A illustrates an operation of the limiter 506 when the 5-bit address output from the arithmetic unit 505 is larger than the end address by the value "a". FIG. 27B illustrates an operation of the limiter 506 when the 5-bit address output from the arithmetic unit 505 is smaller than the end address by the value "b".

As described above, the 5-bit address output from the arithmetic unit 505 does not have the sign bit. Therefore, the "overflow" state as illustrated in FIG. 27A and the "underflow" state as illustrated in FIG. 27B cannot be distinguished from each other only by the 5-bit address.

Thus, the limiter 506 receives the addition/subtraction identification signal 514, and identifies the "overflow" state (FIG. 27A) if the signal 514 indicates an addition and the "underflow" state (FIG. 27B) if the signal 514 indicates a subtraction.

When the limiter 506 receives the addition/subtraction identification signal 514 indicating an addition, the limiter 506 calculates the value {5-bit address (from the arithmetic unit 505)–final address ("1111")–1}, and outputs the calculated value as an updated address, as illustrated in FIG. 27A.

Similarly, when the limiter 506 receives the addition/subtraction identification signal 514 indicating a subtraction, the limiter 506 calculates the value {5-bit address (from the arithmetic unit 505)+final address ("1111")+1}, and outputs the calculated value as an updated address, as illustrated in FIG. 27B.

In other words, when the 5-bit address obtained by an addition exceeds the address space, a limit process as illustrated in FIG. 27A is performed. When the 5-bit address obtained by a subtraction exceeds the address space, a limit process as illustrated in FIG. 27B is performed. Thus, substantially the same operation as that described in Example 3 is achieved while reducing the number of bits output from the arithmetic unit 505 by one bit.

As described above, in the present example, the address pointers and the corresponding addresses are each updated through a relative calculation based on a reference address. Thus, it is possible to allocate the address pointers within the memory space while maintaining the relationship of the address pointers with respect to one another.

Moreover, the sign bit is eliminated by employing opposite update directions for the reference address (positive update direction or addition) and the other addresses (negative update direction or subtraction). Thus, it is not necessary to store such an additional bit in the control signal generation circuit 515 or in the address update register 503, thereby reducing the number of bits provided in the register.

Furthermore, the number of bits of the address output from the arithmetic unit 505 is reduced by inputting the addition/subtraction identification signal 514 to the limiter 506.

In the present example, one address is used as a reference address while the other addresses are obtained with respect to the reference address. However, the number of reference addresses is not limited to one, but a plurality of reference addresses may alternatively be used.

Moreover, the number of the offset values stored in the address update register 503 may alternatively be different from the number of the addresses stored in the address register 508.

In the present example, the arithmetic unit 505 is controlled by the addition/subtraction identification signal 514. Alternatively, the arithmetic unit 505 may simply be an adder, while storing in the-address update register 503 a value obtained based on a two's complement.

The update direction of the reference address and that of the other addresses are not limited to those described above.

Moreover, the address does not have to be incremented by one at a time, but may alternatively be incremented by any other number. The address may alternatively be decremented.

Furthermore, in the present example, a plurality of addresses are updated using one arithmetic unit 505 in combination with the selectors 504 and 509. Alternatively, a plurality of arithmetic units may be provided for updating the respective addresses.

EXAMPLE 5

Figure 28:
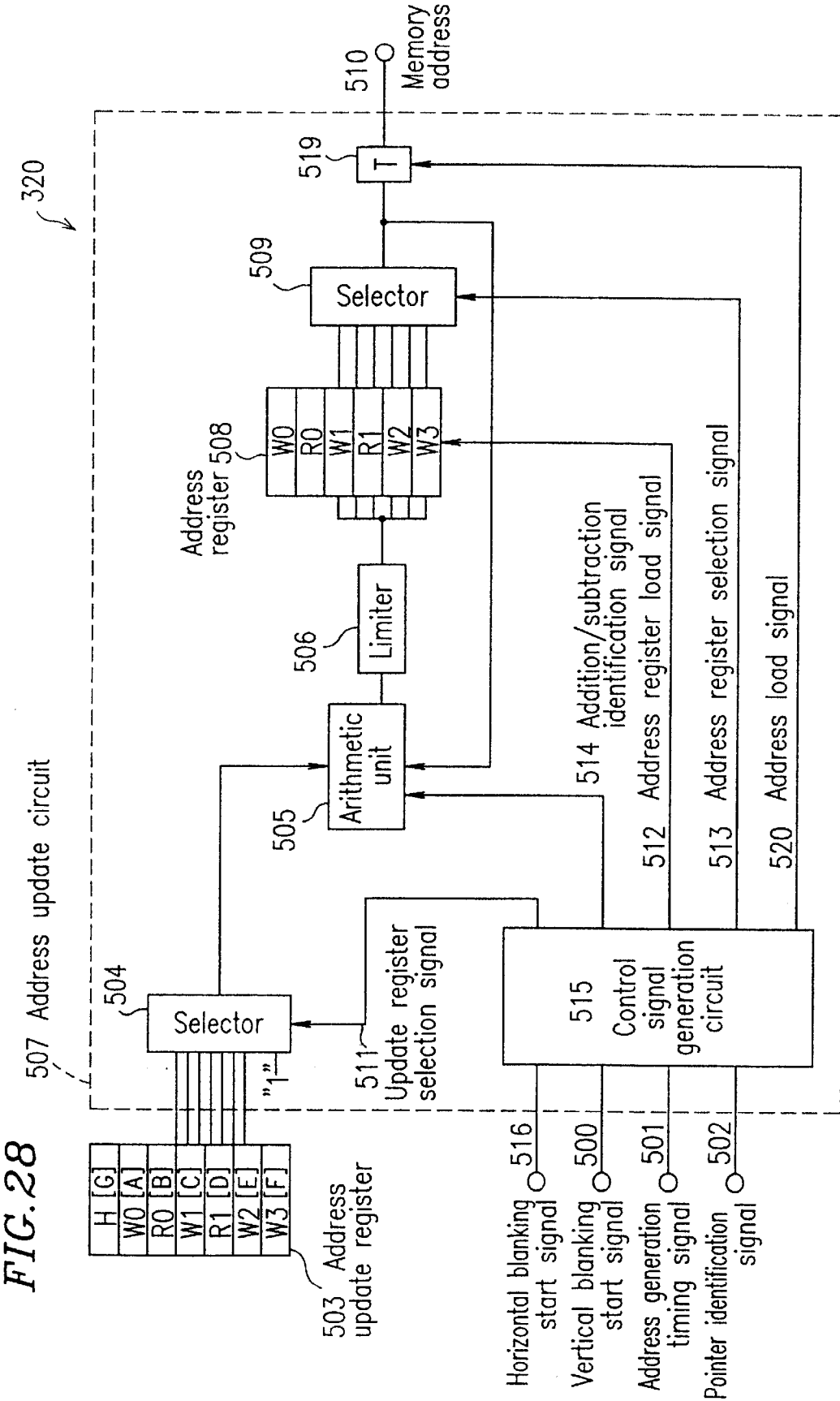
FIG. 28 is a block diagram illustrating a memory address generation device according to Example 5 of the present invention.

FIG. 28 illustrates a memory address generation device 320 according to Example 5 of the present invention. In Example 5, more address pointers H, W0, R0, W1, R1, W2, W3 are used. The address pointers are updated in response to a first register update start signal (a vertical blanking start signal) and a second register update start signal (a horizontal blanking start signal, or a signal indicating the start of horizontal blanking).

Referring to FIG. 28, the memory address generation device 320 includes an input terminal 500 through which a first register update start signal (a vertical blanking start signal) is input, an input terminal 516 through which a second register update start signal (a horizontal blanking start signal) is input, the input terminal 501 through which an address generation timing signal is input, the input terminal 502 through which a pointer identification signal is input, and the address update register 503. The selector 504 selectively outputs one of values A, B, C, D, E and F in the address update register 503 and a fixed value "1". The arithmetic unit 505 calculates an address. The limiter 506 limits the address calculated by the arithmetic unit 505 to be an address within the memory space. Reference numeral 507 denotes the address update circuit. The address register 508 stores memory addresses corresponding to address pointers, respectively. The selector 509 selectively outputs one of the memory addresses stored in the address register 508. Reference numeral 510 denotes the output terminal through which a memory address is output. The latch 519 latches the output from the selector 509. The control signal generation circuit 515 generates signals for controlling the arithmetic unit 505, the selectors 504 and 509, the address register 508 and the latch 519. The update register selection signal 511 controls the selector 504. The address register load signal 512 controls the address register 508. The address register selection signal 513 controls the selector 509. The address load signal 520 indicates a timing at which an address should be loaded to the selector 509. The addition/subtraction identification signal 514 indicates a type of calculation to be performed by the arithmetic unit 505.

In the present example, the luminance signal Y and the color difference signal C for a main screen are first written in the memory. A luminance signal SY and a color difference signal SC of a sub-screen are overwritten on a portion of the main screen. The main screen is delayed by one field with respect to the sub-screen. Thus, data of the main screen (which is delayed by two fields from the data input) and data of the sub-screen (which is delayed by one field from the data input) are read out together. In the present example, W0 and W2 denote address pointers in the memory to which the luminance signal Y and the color difference signal C are written, respectively, and R0 and R2 denote address pointers in the memory from which the luminance signal Y and the color difference signal C are read out, respectively. Similarly, W1 and W3 denote address pointers in the memory to which the luminance signal SY and the color difference signal SC are written, respectively, and R1 and R3 denote address pointers in the memory from which the luminance signal SY and the color difference signal SC are read out, respectively.

The address update register 503 stores the offset values A, B, C, D, E and F corresponding to the address pointers W0, R0, W1, R1, W2 and W3, respectively. The address update register 503 also stores the offset value G which is used in connection with the address pointers W1 and W3.

The address register 508 stores addresses corresponding to the address pointers W0, R0, W1, R1, W2 and W3, respectively.

An access to the memory is made by incrementing each of the addresses stored in the address register 508. This is performed in substantially the same manner as that described in Example 3, and will not be further described below.

Figures 29A, 29B, 29C:
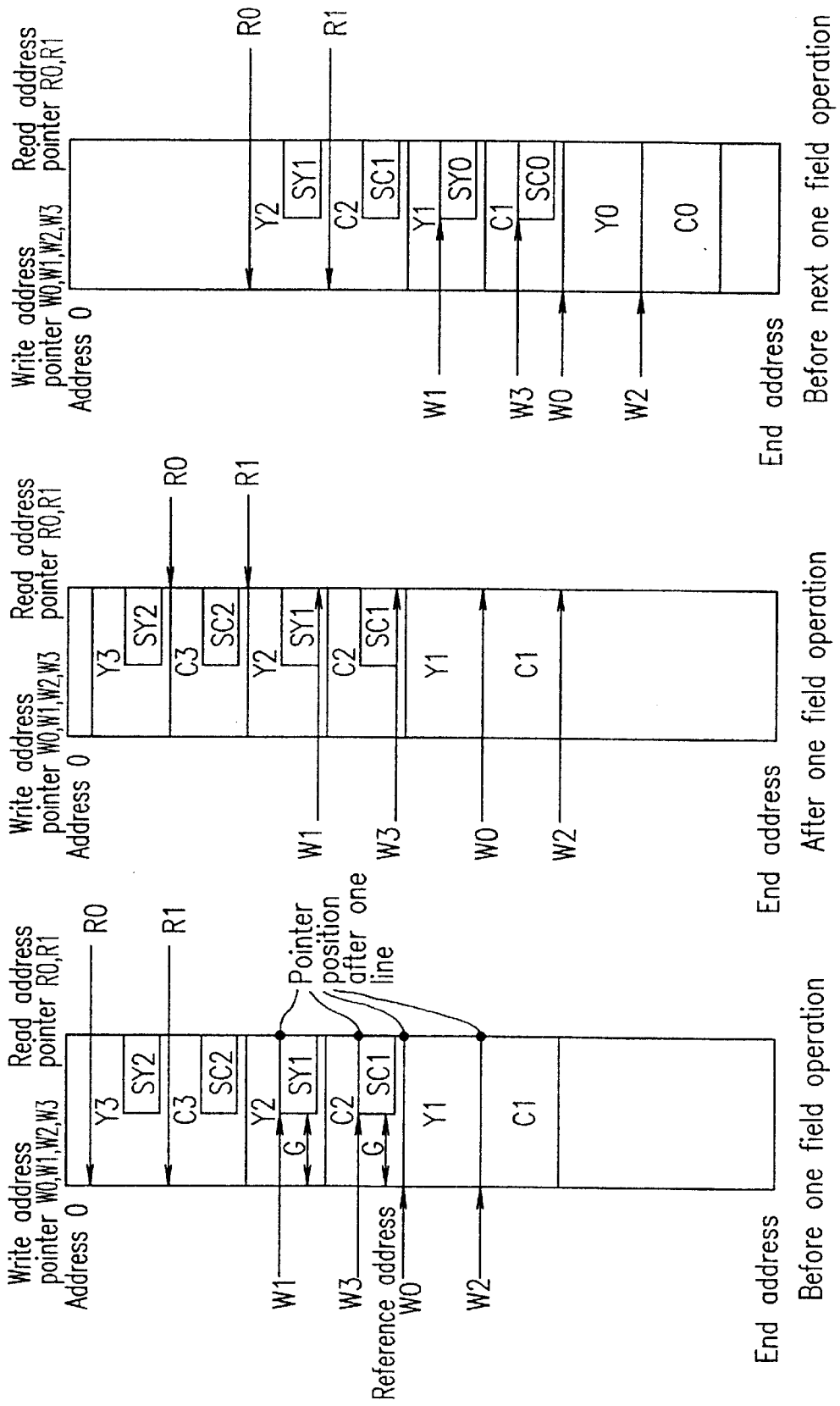
FIGS. 29A, 29B and 29C illustrate an address update operation according to Example 5 of the present invention.

FIGS. 29A, 29B and 29C each illustrate a memory area in the memory corresponding to a plurality of fields, each storing one luminance signal Y and one color difference signal C. One field stores a luminance signal Y3 and a color difference signal C3, the next field stores another luminance signal Y2 and another color difference signal C2, the next field stores another luminance signal Y1 and another color difference signal C1, and the next field stores another luminance signal Y0 and another color difference signal C0.

For each field, a portion of the main screen luminance signal Y is replaced by the sub-screen luminance signal SY, and a portion of the main screen color difference signal C is replaced by the sub-screen color difference signal SC. The positional relationship of the main screen with respect to the sub-screen in the entire display screen is represented by the positional relationship of the memory area of the luminance signal Y and the memory area of the color difference signal C with respect to the memory area of the luminance signal SY and the memory area of the color difference signal SC, respectively.

FIG. 29A illustrates the memory areas along with address pointers W0, R0, W1, R1, W2 and W3 before starting a read operation for one field and a write operation for another field. At this point, the address register 508 stores addresses corresponding to the address pointers W0, R0, W1, R1, W2 and W3, respectively, as illustrated in FIG. 29A. As described above, each of the address pointers W0, R0, W1, R1, W2 and W3 is incremented each time the address pointer is selected.

After one horizontal scanning operation, the address pointers W0, W1, W2 and W3 for write operations are moved to the respective positions indicated by black dots in FIG. 29A. The address pointers W0 and W2 which are used for the main screen are incremented as described in Examples 3 and 4. For the address pointers W1 and W3 which are used for the sub-screen, on the other hand, the following process is performed in order to access only the memory area where the color difference signal SC is stored.

Upon receiving the horizontal blanking start signal, the control signal generation circuit 515 outputs, for example, the update register selection signal 511 indicating the address pointer W1 to the selector 504, the address register selection signal 513 indicating the address pointer W1 to the selector 509 and the addition/subtraction identification signal 514 indicating an addition to the arithmetic unit 505. In response to the update register selection signal 511, the selector 504 selects the offset value G from the address update register 503, and outputs the offset value G to the arithmetic unit 505. In response to the address register selection signal 513, the selector 509 selects an address corresponding to the address pointer W1 from the address register 508, and outputs the address to the arithmetic unit 505.

The arithmetic unit 505 adds the offset value G to the address corresponding to the address pointer W1, thereby updating the address. The updated address is returned to the address register 508 via the limiter 506. In response to the, address register load signal 512 from the control signal generation circuit 515, the old address in the address register 508 corresponding to address pointer W1 is replaced by the updated address. Then, the address pointer W1 indicates the start address of the memory area where the luminance signal BY is stored.

Thereafter, the address stored in the address register 508 corresponding to the address pointer W1 is incremented. When the next horizontal blanking start signal is input, the same operation is repeated.

The address pointer W3 is moved in substantially the same manner. When the horizontal blanking start signal is input, the offset value G is added to the address corresponding to the address pointer W3, thereby updating the address. The updated address is returned to the address register 508, and then the address stored in the address register 508 corresponding to the address pointer W3 is incremented. When the next horizontal blanking start signal is input, the same operation is repeated.

After completing the read and write operations for the fields, the address pointers W0, R0, W1, R1, W2 and W3 are positioned as illustrated in FIG. 29B.

Before starting the next read and write operations for the following two fields, the address pointers W0, R0, W1, R1, W2 and W3 are updated as illustrated in FIG. 29C. The update is performed by using the address update register 503 as follows.

Upon receiving the vertical blanking start signal, the control signal generation circuit 515 outputs, for example, the update register selection signal 511 indicating the address pointer W0 to the selector 504, the address register selection signal 513 indicating the address pointer W0 to the selector 509 and the addition/subtraction identification signal 514 indicating an addition to the arithmetic unit 505. In response to the update register selection signal 511, the selector 504 selects the offset value A corresponding to the address pointer W0 from the address update register 503, and outputs the offset value A to the arithmetic unit 505. In response to the address register selection signal 513, the selector 509 selects an address corresponding to the address pointer W0 from the address register 508, and outputs the address to the arithmetic unit 505.

The arithmetic unit 505 adds the offset value A corresponding to the address pointer W0 to the address corresponding to the address pointer W0, thereby updating the address. The updated address is returned to the address register 508 via the limiter 506. In response to the address register load signal 512 from the control signal generation circuit 515, the old address in the address register 508 corresponding to the address pointer W0 is replaced by the updated address. Thus, the address pointer W0 is updated as illustrated in FIGS. 29B and 29C.

The address pointer W2 is updated as follows. The addition/subtraction identification signal 514 indicating an addition is provided to the arithmetic unit 505. The offset value E corresponding to the address pointer W2 is read out from the address update register 503, and the updated address corresponding to the address pointer W0 is read out from the address register 508. The offset value E is added to the updated address, and the sum is written in the address register 508 as an updated address corresponding to the address pointer W2.

The address pointer R0 is updated as follows. The addition/subtraction identification signal 514 indicating a subtraction is provided to the arithmetic unit 505. The offset value B is subtracted from the updated address, and the difference is written in the address register 508 as an updated address corresponding to the address pointer R0. The address pointer R1 is updated by subtracting the offset value D from the updated address corresponding to the address pointer W0.

Similarly, the address pointers W1 and W3 are updated as follows. The addition/subtraction identification signal 514 indicating a subtraction is provided to the arithmetic unit 505. The offset values C and F are each subtracted from the updated address corresponding to the address pointer W0. The differences are written in the address register 508.

In this way, the address pointers W0, R0, W1, R1, W2 and W3 are updated as illustrated in FIGS. 29B and 29C.

Whether an addition or a subtraction is to be performed is predetermined for each of the offset values of the address update register 503. Therefore, the control signal generation circuit 515 is provided with a register storing values (each indicating either an addition or a subtraction) for the offset values of the address update register 503. Thus, when the control signal generation circuit 515 outputs the address register selection signal 513 indicating one of the address pointers, the control signal generation circuit 515 can refer to the register provided therein to determine whether either an addition or a subtraction is to be performed with the offset value corresponding to the one of the address pointers and to output the addition/subtraction identification signal 514 indicating either an addition or a subtraction.

The operation of the limiter 506 may be substantially the same as those described in Examples 3 and 4, and thus will not be further described in this example.

As described above, in the present example, the address pointers and the corresponding addresses are each updated through a relative calculation based on a reference address. Thus, it is possible to allocate the address pointers within the memory space while maintaining the relationship of the address pointers with respect to one another. Some of the address pointers are updated, using the horizontal offset value G, each time the horizontal blanking start signal is input.

In the present example, the address pointers are each updated by adding or subtracting an offset value to/from the address pointer as in Example 3. Alternatively, the address pointers may be updated in a manner as described in Example 4, that is, by adding an offset value only to the address pointer W2 (reference address pointer) while subtracting the respective offset values from the other address pointers.

Moreover, a plurality of address update registers 503 may alternatively be used.

In the present example, one address is used as a reference address while the other addresses are obtained with respect to the reference address. However, the number of reference addresses is not limited to one, but a plurality of reference addresses may alternatively be used.

Furthermore, the number of the offset values stored in the address update register 503 may alternatively be different from the number of the addresses stored in the address register 508.

In the present example, the arithmetic unit 505 is controlled by the addition/subtraction identification signal 514. Alternatively, the arithmetic unit 505 may simply be an adder, while storing in the address update register 503 a value obtained based on a two's complement.

The update direction of the reference address and that of the other addresses are not limited to those described above.

Moreover, the address does not have to be incremented by one at a time, but may alternatively be incremented by any other number. The address may alternatively be decremented.

Furthermore, in the present example, a plurality of addresses are updated using one arithmetic unit 505 in combination with the selectors 504 and 509, Alternatively, a plurality of arithmetic units may be provided for updating the respective addresses.

EXAMPLE 6

Figure 30:
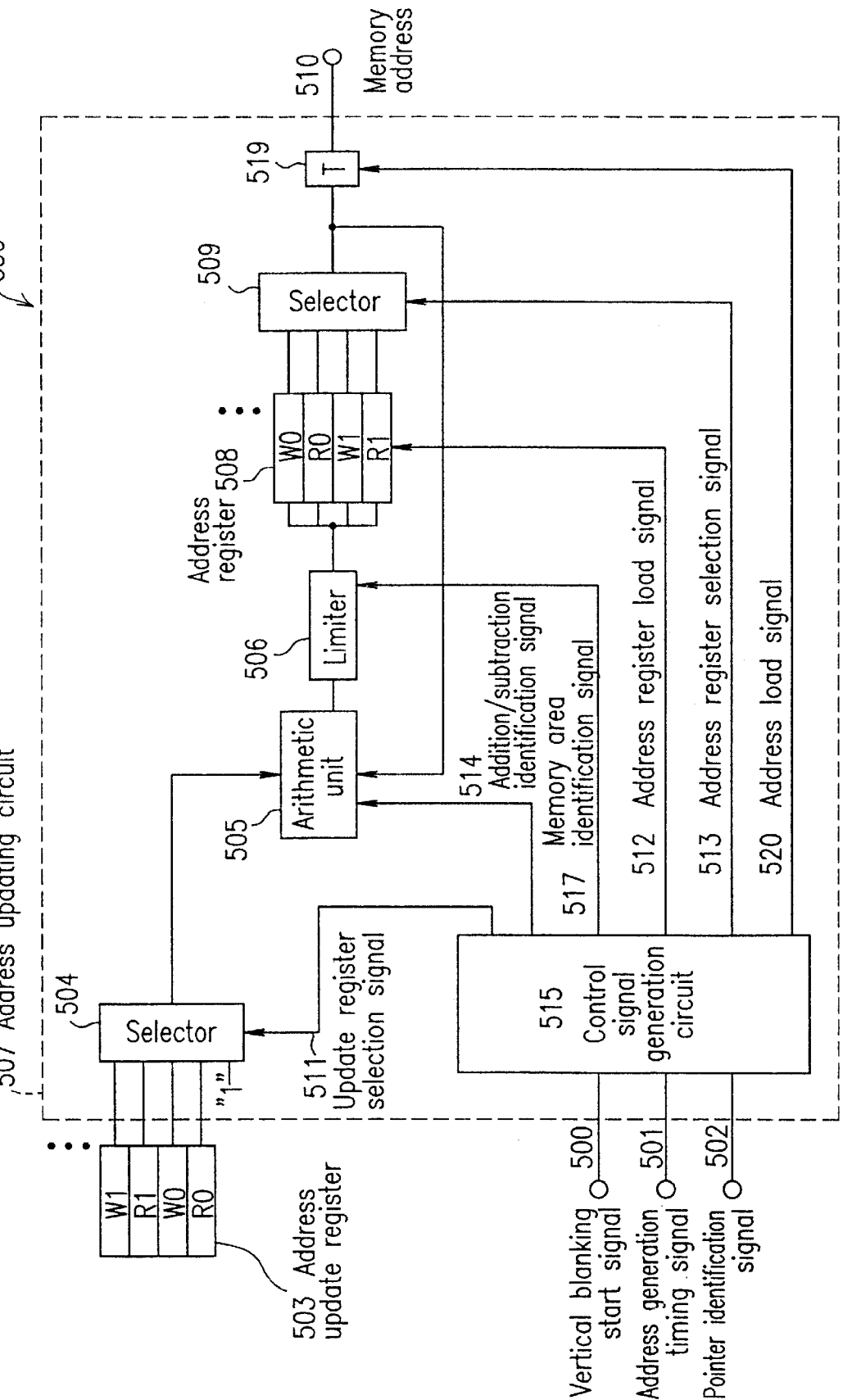
FIG. 30 is a block diagram illustrating a memory address generation device according to Example 6 of the present invention.

FIG. 30 illustrates a memory address generation device 330 according to Example 6 of the present invention. In Example 6, the address space in the memory is logically divided into two areas. The two memory areas are accessed using only the address pointers W0, R0, W1 and R1. In order to achieve this, a memory area identification signal 517 is sent from the control signal generation circuit 515 to the limiter 506.

Referring to FIG. 30, the memory address generation device 330 includes an input terminal 500 through which a register update start signal (a vertical blanking start signal) is input, the input terminal 501 through which an address generation timing signal is input, the input terminal 502 through which a pointer identification signal is input, and the address update register 503. The selector 504 selectively outputs one of values A, B, C and D in the address update register 503 and a fixed value "1". The arithmetic unit 505, calculates an address. The limiter 506 limits the address calculated by the arithmetic unit 505 to be an address within the memory space. Reference numeral 507 denotes the address update circuit. The address register 508 stores memory addresses corresponding to address pointers, respectively. The selector 509 selectively outputs one of the memory addresses stored in the address register 508. Reference numeral 510 denotes the output terminal through which a memory address is output. The latch 519 latches the output from the selector 509. The control signal generation circuit 515 generates signals for controlling the arithmetic unit 505, the selectors 504 and 509, the address register 508 and the latch 519. The update register selection signal 511 controls the selector 504. The address register load signal 512 controls the address register 508. The address register selection signal 513 controls the selector 509. The addition/subtraction identification signal 514 indicates a type of calculation to be performed by the arithmetic unit 505. The address load signal 520 indicates a timing at which an address should be loaded to the selector 509. The memory area identification signal 517 indicates one of the memory areas to be accessed.

Except for the memory area identification signal 517 and the limiter 506, the operation of the present example (including the generation and update of the address pointers W0, R0, W1 and R1) is substantially the same as that of Example 3, and thus will not be further described below.

Figure 31:
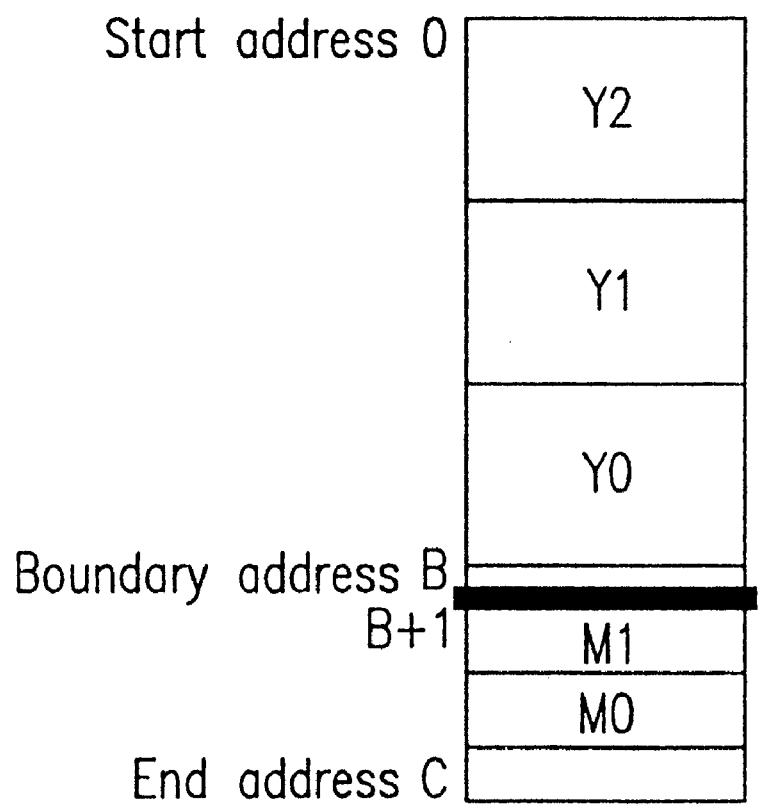
FIG. 31 illustrates an address space according to Example 6 of the present invention.

FIG. 31 illustrates a memory space which is divided into a 3-field memory area for storing the luminance signal Y and a 2-field memory area for storing a motion signal M. The boundary between the two areas has an address B.

An operation of the limiter 506 will now be described. The limiter 506 receives from the control signal generation circuit 515 the memory area identification signal 517 indicating either the memory area for the luminance signal Y or the memory area for the motion signal M. The limiter 506 performs one of two operations based on the memory area identification signal 517.

Figure 32A:
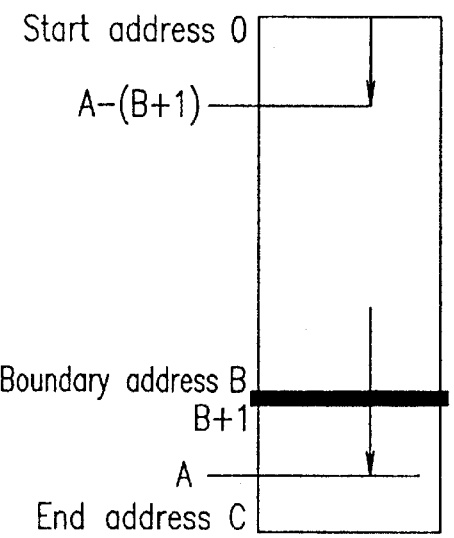
FIGS. 32A and 32B illustrate an operation of a limiter according to Example 6 of the present invention.
Figure 32B:
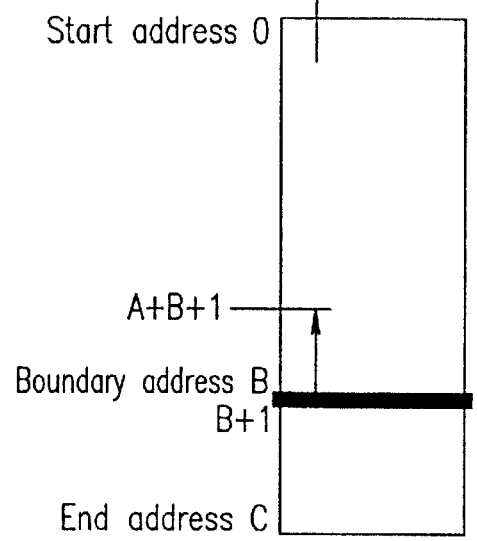

FIGS. 32A and 32B illustrate an operation of the limiter 506 for accessing the memory area for the luminance signal Y which includes the start address of the memory space.

FIG. 32A illustrates a case where the offset value is added to the address pointer to update the address, and the updated address A exceeds the boundary address B. In such a case, the limiter 506 outputs the value {the address A−(B+1)} instead of the address A. FIG. 32B illustrates a case where the offset value is subtracted from the address pointer to update the address, and the updated address A is smaller than the boundary address B. In such a case, the limiter 506 outputs the value (the address A+B+1) instead of the address A.

Figure 33A:
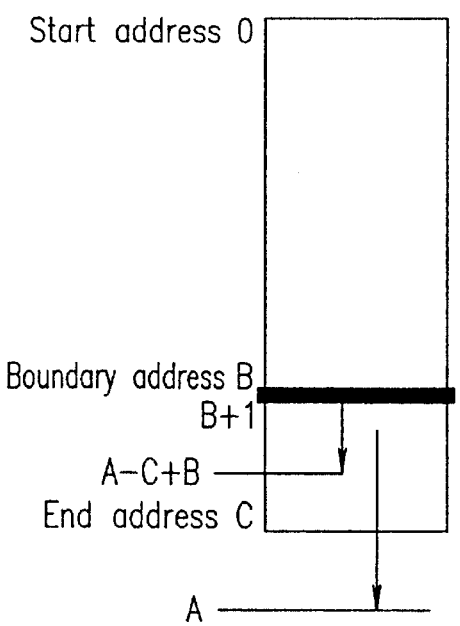
FIGS. 33A and 33B illustrate an operation of a limiter according to Example 6 of the present invention.
Figure 33B:
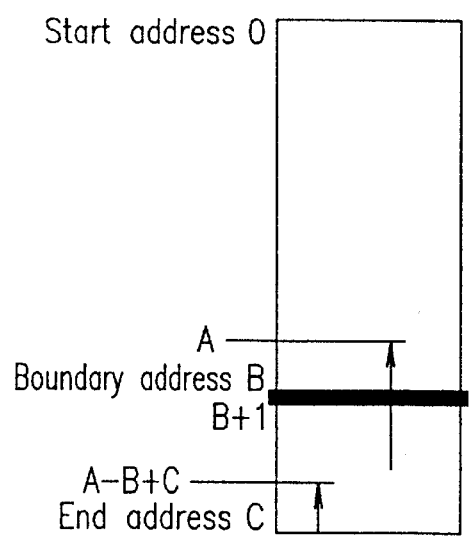

FIGS. 33A and 33B illustrate an operation of the limiter 506 for accessing the memory area for the motion signal M which includes an end address C of the memory space.

FIG. 33A illustrates a case where the offset value is added to the address pointer to update the address, and the updated address A exceeds the end address C. In such a case, the limiter 506 outputs the value (the address A−C+B) instead of the address A. FIG. 33B illustrates a case where the offset value is subtracted from the address pointer to update the address, and the updated address A is smaller than the address B+1. In such a case, the limiter 506 outputs the value (the address A+B+C) instead of the address A.

In this way, it is possible to cyclically increment the address pointer either in the memory area for the luminance signal Y or in the memory area for the motion signal M.

Thus, in the present example, signals having different numbers of bits or different numbers of fields, such as the luminance signal Y and the motion signal M, can be allocated in the respective memory areas in the same memory space. Moreover, two or more address pointers can be incremented at different rates in the respective memory areas, thereby effectively utilizing the memory space.

Although the memory space is divided into two memory areas in the present example, the memory space may alternatively be divided into any other number of areas.

Moreover, the number of reference addresses is not limited to one, but a plurality of reference addresses may alternatively be used.

Furthermore, the operation of the limiter 506 of the present example may also be applied to Examples 4 and 5.

EXAMPLE 7

Figure 34:
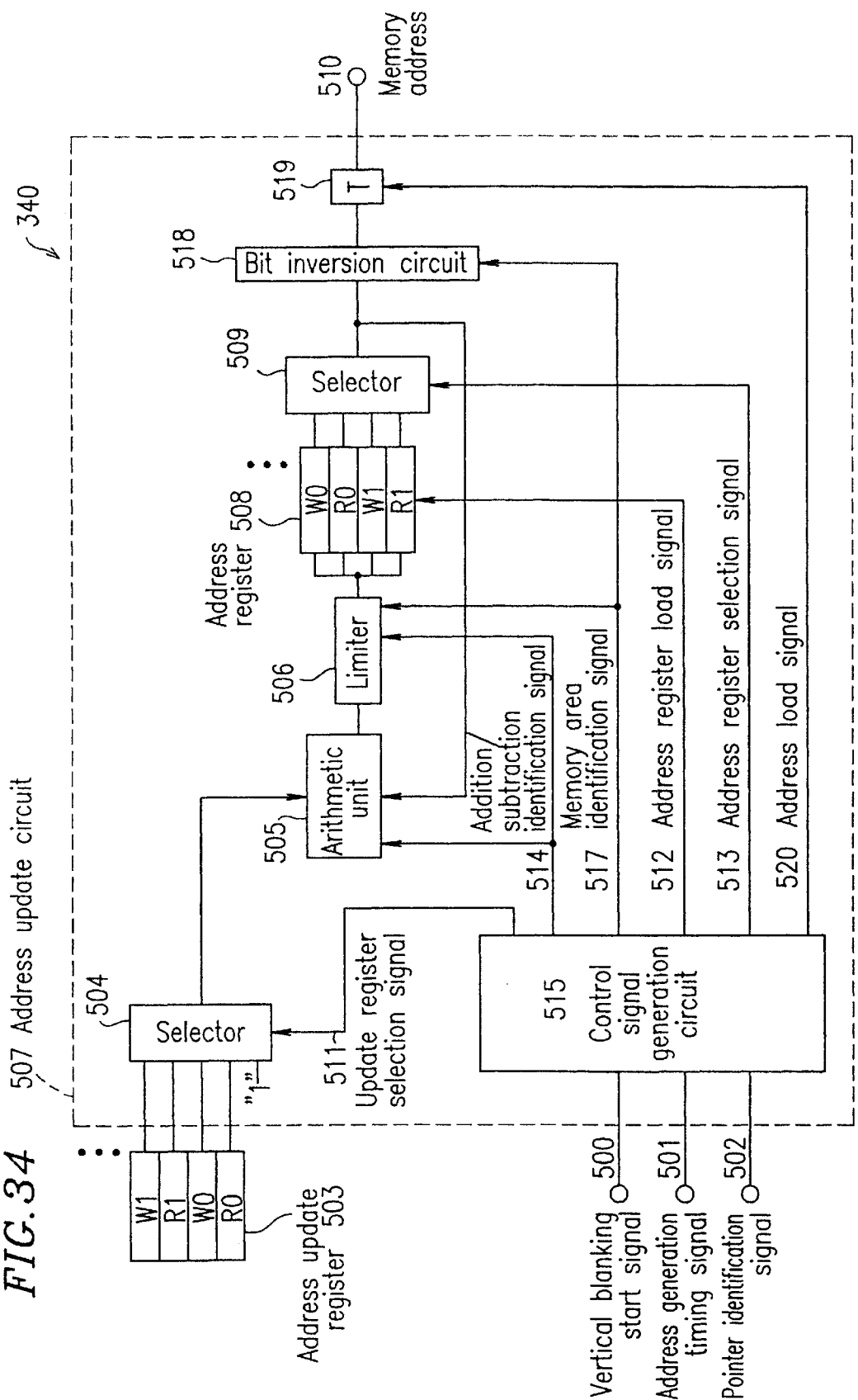
FIG. 34 is a block diagram illustrating a memory address generation device according to Example 7 of the present invention.

FIG. 34 illustrates a memory address generation device 340 according to Example 7 of the present invention. In Example 7, the address space in the memory is logically divided into two areas. When accessing the two divided memory areas, addresses are determined based on the start address 0 in both memory areas. In order to realize this, a bit inversion circuit 518 is provided between the selector 509 and the latch 519, the addition/subtraction identification signal 514 is provided to the limiter 506 as well as the arithmetic unit 505, and the memory area identification signal 517 is provided to the limiter 506 and the bit inversion circuit 518.

Referring to FIG. 34, the memory address generation device 340 includes an input terminal 500 through which a register update start signal (a vertical blanking start signal) is input, the input terminal 501 through which an address generation timing signal is input, the input terminal 502 through which a pointer identification signal is input, and the address update register 503. The selector 504 selectively outputs one of values A, B, C and D in the address update register 503 and a fixed value "1". The arithmetic unit 505 calculates an address. The limiter 506 limits the address calculated by the arithmetic unit 505 to be an address within the memory space. Reference numeral 507 denotes the address update circuit. The address register 508 stores memory addresses corresponding to address pointers, respectively. The selector 509 selectively outputs one of the memory addresses stored in the address register 508. The bit inversion circuit 518 receives an output signal from the selector 509, and selectively outputs either the output signal intact or the inverted signal (a signal obtained by inverting each-bit of the received output). Reference numeral 510 denotes the output terminal through which a memory address is output. The latch 519 latches the output from the bit inversion circuit 518. The control signal generation circuit 515 generates signals for controlling the arithmetic unit 505, the selectors 504 and 509, the limiter 506, the address register 508, the bit inversion circuit 518 and the latch 519. The update register selection signal 511 controls the selector 504. The address register load signal 512 controls the address register 508. The address register selection signal 513 controls the selector 509. The address load signal 520 indicates a timing at which an address should be loaded to the selector 509. The addition/subtraction identification signal 514 indicates a type of calculation to be performed by the arithmetic unit 505. The memory area identification signal 517 indicates one of the memory areas to be accessed.

Except for the memory area identification signal 517, the limiter 506 and the bit inversion circuit 518, the operation of the present example (including the generation and update of the address pointers) is substantially the same as that of Example 3, and thus will not be further described below.

Figure 35:
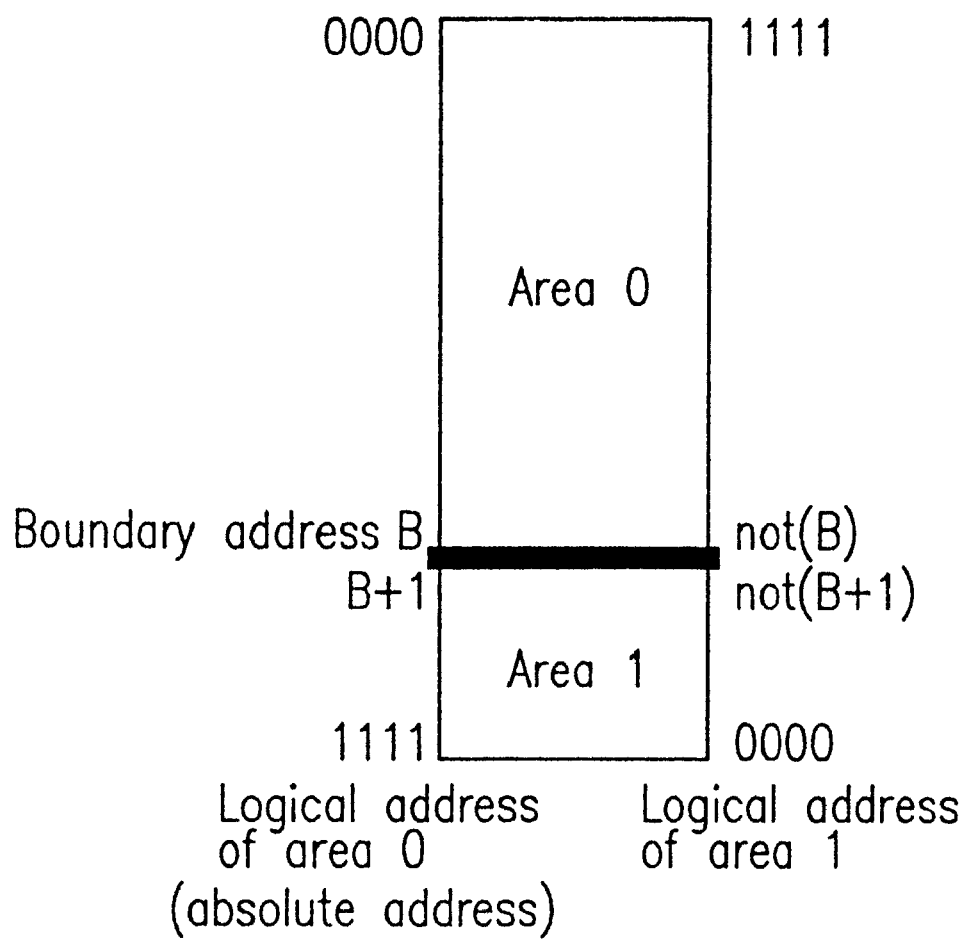
FIG. 35 illustrates an address space according to Example 7 of the present invention.

FIG. 35 illustrates a memory space with 4-bit addresses, which is divided by the boundary address B into a memory area 0 including the start address "0000" and a memory area 1 including the end address "1111".

While the memory space is divided into two memory areas, an address in either area is updated based on the address "0000". As illustrated in FIG. 35, an absolute address is used in the memory area 0, and a logical address (obtained by inverting each bit of the absolute address) is used in the memory area 1. The logical address "0000" obtained by inverting each bit of the absolute address "1111" is assumed as the reference address.

An operation of the bit inversion circuit 518 will now be described. First, the memory area identification signal 517 is input to the limiter 506, determining whether the memory area 0 or the memory area 1 is to be accessed. As can be seen from the description in Example 6, the address calculated by the arithmetic unit 505 is input to the bit inversion circuit 518 via the limiter 506, the address register 508 and the selector 509. The bit inversion circuit 518 receives the memory area identification signal 517, and the bit inversion circuit 518 outputs the-address intact when the memory area identification signal 517 indicates the memory area 0 and outputs the inverted address (an address obtained by inverting each bit of the calculated address) when the memory area identification signal 517 indicates the memory area 1. The address is output via the latch 519 and through the output terminal 510 at a predetermined timing. In this way, the address pointers can be allocated in the memory areas 0 and 1.

An operation of the limiter 506 will now be described. FIGS. 36A and 36B illustrate an operation of the limiter 506 for accessing the memory area 0 including the absolute address "0000".

FIG. 36A illustrates a case where the offset value is added to the address pointer to update the address, and the updated address A exceeds the boundary address B. In such a case, the limiter 506 outputs the value {the address A–(B+1)}={A+not(B)} instead of the address A, where "not( )" indicates an address obtained by inverting each bit of the address. FIG. 36B illustrates a case where the offset value is subtracted from the address pointer to update the address, and the updated address A is smaller than the absolute address "0000". In such a case, the limiter 506 outputs the value (the address A+B+1) instead of the address A.

Figure 37A:
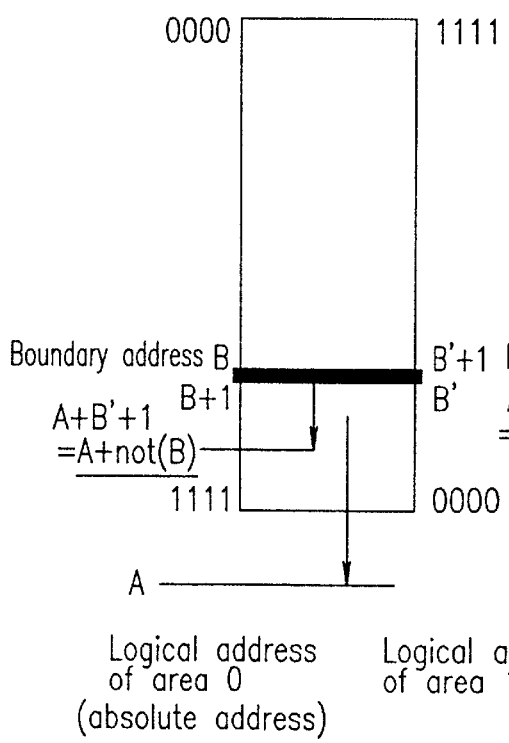
FIGS. 37A and 37B illustrate another operation of a limiter according to Example 7 of the present invention.
Figure 37B:
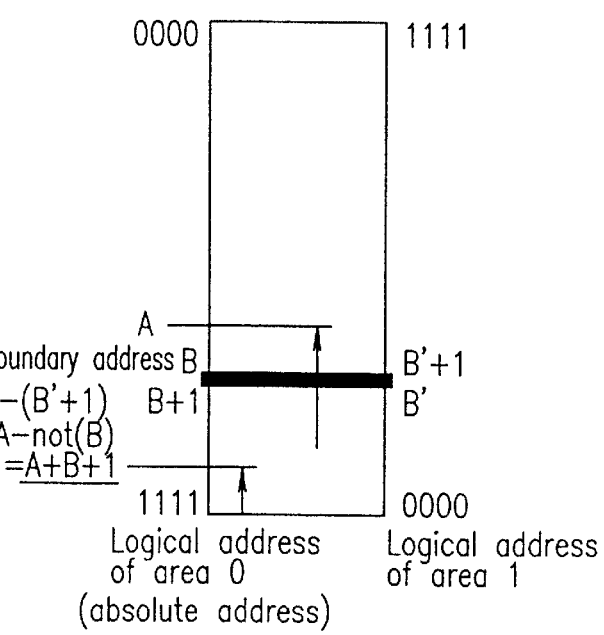

FIGS. 37A and 37B illustrate an operation of the limiter 506 for accessing the memory area 1 including the absolute address "1111".

FIG. 37A illustrates a case where the offset value is added to the address pointer to update the address, and the updated address A is smaller than the logical address "0000". In such a case, the limiter 506 outputs the value (the address A+B'+1)={A+not (B)} instead of the address A, where the address B' is the boundary address within the memory area 1 and equals the value {not(B)–1}. FIG. 37B illustrates a case where the offset value is subtracted from the address pointer to update the address, and the updated address A exceeds the logical address B'. In such a case, the limiter 506 outputs the value {the address A–(B'+1)}={A–not(B)}=(A+B+1) instead of the address A.

In this way, each of the memory areas 0 and 1 can start from the address "0000", and the address "0000" can be used as a reference address in either one of the memory areas 0 and 1. Moreover, since the output of the limiter 506 is limited to either (A+B+1) or {A+not(B)}, the limiter 506 can be implemented by a simple circuit structure.

As described above, by using logical addresses where a memory space is divided into two memory areas by a single boundary, the two memory areas can be accessed in substantially the same manner. Moreover, substantial complication or expansion of the limiter circuit is avoided.

Furthermore, the number of reference addresses is not limited to one, but a plurality of reference addresses may alternatively be used.

The operation of the limiter of the present example may be used in Examples 4 and 5.

Moreover, any other circuit structure can be used for dividing the single memory space.

EXAMPLE 8

Figure 38:
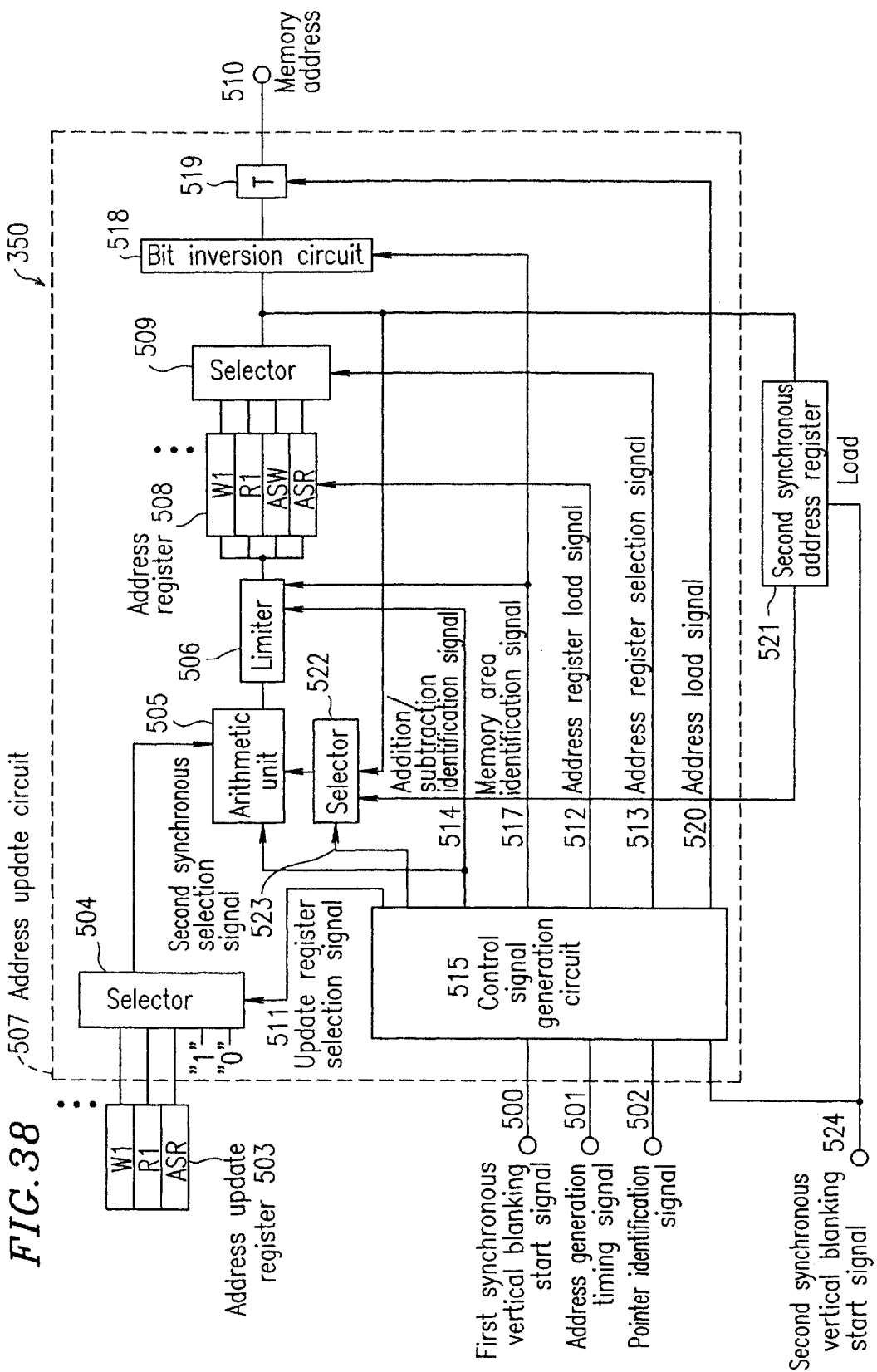
FIG. 38 is a block diagram illustrating a memory address generation device according to Example 8 of the present invention.

FIG. 38 illustrates a memory address generation device 350 according to Example 8 of the present invention. In Example 8, a plurality of non-synchronous signals are written to and read from a single memory. In order to realize this, the bit inversion circuit 518 is provided between the selector 509 and the latch 519, and a second synchronous system address register 521 and the selector 522 are provided.

Referring to FIG. 38, the memory address generation device 350 includes an input terminal 500 through which a register update start signal (a first synchronous system vertical blanking start signal) is input, the input terminal 501 through which an address generation timing signal is input, the input terminal 502 through which a pointer identification signal is input, and the address update register 503. The selector 504 selectively outputs one of the values stored in the address update register 503 and fixed values "1" and "0". The arithmetic unit 505 calculates an address. The limiter 506 limits the address calculated by the arithmetic unit 505 to be an address within the memory space. Reference numeral 507 denotes the address update circuit. The address register 508 stores memory addresses corresponding to address pointers, respectively. The selector 509 selectively outputs one of the memory addresses stored in the address register 508. The bit inversion circuit 518 receives an output signal from the selector 509, and selectively outputs either the output signal intact or the inverted signal. Reference numeral 510 denotes the output terminal through which a memory address is output. The latch 519 latches the output from the bit inversion circuit 518. The control signal generation circuit 515 generates signals for controlling the arithmetic unit 505, the selectors 504 and 509, the limiter 506, the address register 508, the bit inversion circuit 518 and the latch 519. The update register selection signal 511 controls the selector 504. The address register load signal 512 controls the address register 508. The address register selection signal 513 controls the selector 509. The addition/subtraction identification signal 514 indicates a type of calculation to be performed by the arithmetic unit 505. The memory area identification signal 517 indicates, one of the memory areas to be accessed. The second synchronous system address register 521 stores the address received from the selector 509 in response to a second synchronous system vertical blanking start signal which is provided through an input terminal 524. The selector 522 switches one of the address from the selector 509 and the address from the second synchronous system address register 521 in response to a second synchronous system selection signal 523 from the control signal generation circuit 515. The address load signal 520 indicates a timing at which an address should be loaded to the selector 509. The second synchronous system selection signal 523 is used to operate the selector 522.

In the present example, video signals in a first synchronous system and video signals in a second synchronous system (which is not synchronized with the first synchronous system) are written to or read from the memory.

As in Example 7, the memory space is divided into the memory area 0 and the memory area 1, using absolute addresses in the memory area 0 and logical addresses (obtained by inverting the absolute addresses) in the memory area 1, as illustrated in FIG. 35.

The address update register 503 stores offset values corresponding to the address pointers W1, and R1 in the memory area 0, respectively, and an offset value corresponding a read address pointer ASR in the memory area 1. The address register 508 stores addresses corresponding to the address pointers W1 and R1 in the memory area 0, respectively, and addresses corresponding to address pointers ASW and ASR in the memory area 1.

When a video signal in the first synchronous system is written to or read from the memory, the memory area 0 is used, and the bit inversion circuit 518 does not invert the address from the selector 509. Moreover, the selector 522 selects the address from the selector 509 and provides the address to the arithmetic unit 505. Therefore, the address is incremented and updated in substantially the same manner as that of Example 3. Moreover, the operation of the limiter 506 is substantially the same as that of Example 7.

Write and read operations for a video signal in the second synchronous system will now be described.

First, a method for generating a write address for a video signal in the second synchronous system will be described. Since the address pointer ASW in the second synchronous system moves at a rate different from the rate at which an address pointer in the first synchronous system moves, a special area is allocated in the memory space. In the present example, the memory area 1 is allocated, The address register 508 stores write and read addresses in the second synchronous system corresponding to the address pointers ASW and ASR, respectively.

When the control signal generation circuit 515 determines that an access to the address corresponding to the write address pointer ASW is requested based on the address generation timing signal and the pointer identification signal received from the input terminals 501 and 502, respectively, the control signal generation circuit 515 controls the selector 509, the bit inversion circuit 518, the selector 522 and the limiter 506 so as to generate the address corresponding to the write address pointer ASW. The selector 509 selects the address corresponding to the write address pointer ASW.

When signals in the second synchronous system are written to or read from the memory area 1, the limiter 506 performs the operation as illustrated in FIGS. 37A and 37B, and the bit inversion circuit 518 inverts the address from the selector 509. Moreover, the selector 522 selects the address from the selector 509, and the selector 504 selects the value "1". The arithmetic unit 505 increments by "1" the address corresponding to the address pointer ASW.

The timing at which the address pointer ASW is generated is indicated by the address generation timing signal and is in synchronization with a video signal in the second synchronous system.

While the address corresponding to the address pointer ASW is generated, the control signal generation circuit 515 does not update the address corresponding to the address pointer ASW in the address register 508 (using an offset value) even if the vertical blanking start signal is input through the input terminal 500. Thus, the write address of a signal in the second synchronous system is only incremented, and the address pointer cycles in the memory area 1 of the memory space.

Now, an operation for reading out video signals in the second synchronous system stored in the memory area 1 in synchronization with video signals in the first synchronous system will be described.

As described above, a video signal in the second synchronous system and a video signal in the first synchronous system are not in synchronization with each other. In order to substantially synchronize the video signals with each other, one or more frames in the memory area 1 may be selectively skipped or read twice, for example, so as to absorb the frequency difference therebetween.

FIGS. 39A and 39B are timing diagrams illustrating write frames and read frames where a write field frequency and a read field frequency are different from each other. The timing diagrams are illustrated by frames so that the relationship between an even-numbered frame and an odd-numbered frame is properly maintained when applying this operation to interlaced signals.

FIG. 39A illustrates a case where the write field frequency is higher than the read field frequency (the frequency of the second synchronous system is greater than the frequency of the first synchronous system). FIG. 39B shows the opposite case. In either case, a read operation for a frame begins at a timing during a write operation for that frame and from the start address of the frame, thereby performing the write operation and the read operation in parallel with each other.

Referring to FIG. 39A, the frames 0 to 5 are normally written to and read from the memory without skipping any frame. However, a write operation for the field 6 begins before the field 5 has been read out. Therefore, after reading out the field 5, the field 7 is read out, thereby skipping the field 6.

Such an operation is realized as follows. At the beginning of each write operation, the start address of the frame to be written is stored. Then, when a read operation is complete, the stored start address is simply read out and used as the start address for the following read operation. In this way, it is possible to appropriately skip frames, thereby substantially converting a signal in one synchronous system to a signal in a different synchronous system.

FIG. 39B illustrates a case where the write field frequency is lower than the read field frequency. If the above method is used in such a situation, a read operation for one frame may end before a write operation for that frame ends (the read operation "overtakes" the corresponding write operation). Then, the video signal cannot be read out properly. In FIG. 39B, "NG" indicates the frame which is not read out properly.

In order to avoid such an overtake, the vertical blanking start signal in the second synchronous system (for write operations) is provided with a certain width which corresponds to the longest period of time by which the read operation may possibly precede the corresponding write operation. Preferably, the width is set to the difference between the two different field frequencies.

When updating the read start address for the next read operation, if the vertical blanking start signal in the second synchronous system is at a low level, the start address of a frame which has been stored at the beginning of a write operation for that frame is used as the start address for the next read operation. If the vertical blanking start signal in the second synchronous system is at a high level, the start address of the preceding frame is used as the start address for the next read operation.

In this way, it is possible to convert a signal in one synchronous system to a signal in a different synchronous system without any "overtake" even when the write field frequency is lower than the read field frequency, as illustrated in the bottom of FIG. 39B.

The above operations illustrated in FIGS. 39A and 39B are realized as follows.

Upon receiving the second synchronous system vertical blanking start signal through the input terminal 524, the second synchronous system address register 521 stores the address corresponding to the address pointer ASW output from the selector 509 (the start address of the frame to be written).

When updating addresses in the address register 508 in response to the vertical blanking start signal input through the input terminal 500, if the second synchronous system vertical blanking start signal input through the input terminal 524 is at the low level, the selector 522 selects the address from the second synchronous system address register 521 (the start address of the frame to be written), and the selector 504 selects the fixed value "0". As a result, the output from the arithmetic unit 505 is the address from the second synchronous system address register 521.

If the second synchronous system vertical blanking start signal input through the input terminal 524 is at the high level, the selector 522 selects the address from the second synchronous system address register 521 (the start address of the frame to be written), and the selector 504 selects an offset value corresponding to the address pointer ASR from the address update register 503. At this point, the arithmetic unit 505 is instructed to perform a subtraction operation by the addition/subtraction identification signal 514. Thus, the arithmetic unit 505 subtracts the offset value corresponding to the address pointer ASR from the address received from the second synchronous system address register 521, thereby outputting the start address of the preceding frame.

When an address corresponding to the read address pointer ASR is requested in response to the address generation timing signal and the pointer identification signal input through the input terminals 501 and 502, the selector 509 selects the address corresponding to the address pointer ASR from the address register 508. The bit inversion circuit 518 inverts the address from the selector 509 to read out the memory area 1 and outputs the inverted address as a memory address. At this time, the selector 522 selects the address from the selector 509, and the selector 504 selects the fixed value "1". Thus, the arithmetic unit 505 increments the address by "1".

In this way, it is possible to write a second synchronous system video signal to the memory and read out the second synchronous system video signal in synchronization with the first synchronous video signal.

As described above, when the address output from the second synchronous system address register 521 is used intact as an updated address, the fixed value "1" is selected by the selector 504. Alternatively, the address from the second synchronous system address register 521 may be output from the arithmetic unit 505 without performing any calculation by the arithmetic unit 505.

Moreover, the polarity of the second synchronous system vertical blanking start signal and the memory area for storing the second synchronous system video signals are not limited to those described in the present example.

Furthermore, while the present example is based on Example 5, the present example may alternatively be used with a circuit having any other structure, as an address generation method using a memory for synchronizing two video signals having different field frequencies.

As described above, in one embodiment of the present invention, while signals stored in one of a plurality of input areas of an input buffer are transferred to a single port memory, an input signal is stored in another one of the input areas. While signals stored in one of a plurality of output areas of an output buffer are output as an output signal, a signal stored in the single port memory is transferred to another one of the output areas. Thus, it is possible to output a signal which has been read out from the single port memory as an output signal in real time, while writing an input signal to the single port memory. Moreover, by increasing the number of input areas in the input buffer and the number of output areas in the output buffer, the minimum amount of data which is transferred at a time can be reduced. As a result, it is possible to perform "fine" address control.

In one embodiment of the present invention, a bus width conversion circuit is provided for converting an output bus width of the input buffer to an input bus width of the single port memory, and converting an output bus width of the single port memory to an input bus width of the output buffer. Thus, it is possible to realize a system independent of the bus width of the single port memory.

In one embodiment of the present invention, the input buffer is divided along the bit line direction and the word line direction of the input buffer into a plurality of input areas, and the output buffer is divided along the bit line direction and the word line direction of the output buffer into a plurality of output areas. By programmably altering the division along the bit line direction, it is possible to access an intended address in the single port memory for each area regardless of the bit width of the input signal. As a result, the single port memory can be used more effectively. It is also possible to process a plurality of signals in different synchronous systems.

In one embodiment of the present invention, an arbitration circuit is provided for prioritizing access request signals based on a predetermined priority sequence. Thus, when processing a plurality of signals in different synchronous systems, it is possible to preferentially permit one of the signals which has a relatively higher signal rate to access the single port memory. As a result, real time control can be performed successfully.

In one embodiment of the present invention, a circuit is provided for writing a signal from an input buffer directly to an output buffer. Thus, it is possible to output an input signal with a delay using the input buffer and the output buffer.

In one embodiment of the present invention, it is not necessary to provide a number of arithmetic units corresponding to the number of address pointers used. Rather, the address pointers can be updated using only one arithmetic unit, thereby realizing a small-scale memory address generation device.

In one embodiment of the present invention, a plurality of addresses are updated based on a predetermined relationship among the addresses. Thus, it is possible to allocate the addresses within the memory space while maintaining the relationship of the address pointers with respect to one another.

In one embodiment of the present invention, a plurality of addresses are updated through a relative calculation based on a reference address. Therefore, even when a calculation error occurs while updating an address, the address may be back in proper relationship with the others after the address is updated again.

In one embodiment of the present invention, the update direction for the reference address is opposite to the update direction for the other addresses. Thus, it is not necessary to provide an additional bit to indicate the sign of the updated address, thereby reducing the number of bits required for the register. Moreover, the number of bits required for the arithmetic unit is also reduced.

In one embodiment of the present invention, some of the address pointers may be updated each time the horizontal blanking start signal is input, for example, thereby providing the address with a horizontal offset, and thus making it possible to, for example, provide a small screen in the memory.

In one embodiment of the present invention, write and read operations are performed for video signals which are different in the number of bits or the number of fields required. In order to achieve this, a plurality of memory areas are provided in one memory space, and the address pointers are moved at different rates in different memory areas, respectively. Thus, it is possible to effectively utilize the memory space.

In one embodiment of the present invention, the memory space is divided into two memory areas by a single boundary. The two areas can be addressed in substantially the same manner by using logical addresses. Thus, it is possible to reduce the circuit scale of the device.

In one embodiment of the present invention, write and read operations are performed for different video signals which are not synchronized with each other. A signal in a synchronous system can be properly read out in synchronization with a signal in a different synchronous system by using only one memory address generation device for generating addresses and only one memory.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A memory address generation device for generating a plurality of addresses for accessing a memory, the memory address generation device comprising:
   an address update section for updating N addresses (where N is a natural number) at a predetermined timing based on a predetermined relationship among the N addresses, wherein the address update circuit comprises:
   a control signal generation circuit for receiving (i) a pointer identification signal corresponding to one of a plurality of address pointers, and (ii) an address generation timing signal,
   a first selector for receiving an address register selection signal generated by the control signal generation circuit and selecting and outputting one of the N addresses corresponding to the one of the plurality of address pointers signal,
   an address register for receiving the selected address and storing the selected address as a reference address and outputting the address to the memory, and
   an arithmetic unit for receiving the selected address from the selector and adding an increment so as to allow subsequent addresses to be sequentially allocated based on the reference address, thereby updating the address register, wherein:
the predetermined relationship among the N addresses is a relationship between at least one reference address and the other addresses of the N addresses,
the predetermined relationship among the N addresses is represented by K predetermined values (where K is a natural number); and wherein
the address update section further comprises
a second selector for selecting one of the K predetermined values corresponding to one of the N addresses,
the arithmetic unit updates the address of the address register corresponding to the one of the K predetermined values.

2. A memory address generation device according to claim 1, wherein:
the K predetermined values are offset values; and
the arithmetic unit selectively updates the address corresponding to the at least one reference address, and the arithmetic unit updates the other address based on the at least one reference address and one of the offset values.

3. A memory address generation device according to claim 2, wherein
the arithmetic unit updates the one of the N addresses corresponding to the reference address in one direction and updates each of the other of the N addresses in an opposite direction.

4. A memory address generation device for generating a plurality of addresses for accessing a memory, the memory address generation device comprising:
an address update section for updating N addresses (where N is a natural number) at a predetermined timing based on a predetermined relationship among the N addresses, wherein the address update circuit comprises:
a control signal generation circuit for receiving (i) a pointer identification signal corresponding to one of a plurality of address pointers, and (ii) an address generation timing signal,
a first selector for receiving an address register selection signal generated by the control signal generation circuit and selecting and outputting one of the N addresses corresponding to the one of the plurality of address pointers signal,
an address register for receiving the selected address and storing the selected address as a reference address and outputting the address to the memory, and
an arithmetic unit for receiving the selected address from the selector and adding an increment so as to allow subsequent addresses to be sequentially allocated based on the reference address, thereby updating the address register, wherein:
a memory address space of the memory is logically divided into a plurality of areas;
the address update section generates an address by independently incrementing one of the plurality of address pointers in each of the areas;
the memory address space starts from a start address and ends with an end address;
the memory address space is logically divided by a boundary into a first area including the start address and a second area including the end address;
the address update section calculates an address using a logical address based on the start address either in the first area or in the second area; and
the address update section inverts the calculated address for the second area, thereby providing an actual address in the second area.

5. A memory address generation device according to claim 4, wherein:
M first synchronous system signals and K second synchronous system signals which are not synchronized with the M first synchronous signals are provided:
the address update section provides a special memory area in the memory address space for storing the second synchronous system signals; and
the address update section calculates a read address of the second synchronous system signal based on a write address of the second synchronous system signal and the second synchronous system signal.

* * * * *